United States Patent
Park et al.

(10) Patent No.: US 10,469,230 B2
(45) Date of Patent: Nov. 5, 2019

(54) TRANSMISSION/RECEPTION APPARATUS AND METHOD FOR WIRELESS COMMUNICATION SYSTEM

(71) Applicant: LG ELECTRONICS INC., Seoul (KR)

(72) Inventors: Eunsung Park, Seoul (KR); Wookbong Lee, Seoul (KR); Jinsoo Choi, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 15/558,950

(22) PCT Filed: Mar. 14, 2016

(86) PCT No.: PCT/KR2016/002514
§ 371 (c)(1),
(2) Date: Sep. 15, 2017

(87) PCT Pub. No.: WO2016/148462
PCT Pub. Date: Sep. 22, 2016

(65) Prior Publication Data
US 2018/0145811 A1    May 24, 2018

Related U.S. Application Data

(60) Provisional application No. 62/133,971, filed on Mar. 16, 2015, provisional application No. 62/136,618, (Continued)

(51) Int. Cl.
*H04L 5/00* (2006.01)
*H04L 27/26* (2006.01)
(Continued)

(52) U.S. Cl.
CPC ............ *H04L 5/0053* (2013.01); *H04L 5/001* (2013.01); *H04L 5/005* (2013.01); *H04L 5/0051* (2013.01);
(Continued)

(58) Field of Classification Search
CPC ....... H04L 5/00; H04L 5/0053; H04L 5/0044; H04L 27/2663; H04L 27/2627;
(Continued)

(56) References Cited

U.S. PATENT DOCUMENTS

2015/0117433 A1* 4/2015 Zhang ................. H04L 69/22
370/338
2015/0334708 A1* 11/2015 Lee ........................ H04L 1/00
370/329
(Continued)

FOREIGN PATENT DOCUMENTS

KR    10-2011-0093559 A    8/2011
KR    10-2013-0143125 A    12/2013
(Continued)

OTHER PUBLICATIONS

Marvell et al. "HE-SFT Proposal", IEEE 802.11-15/0381r0, Mar. 9, 2015, slides 1-38 (Year: 2015).*
(Continued)

*Primary Examiner* — Robert C Scheibel
(74) *Attorney, Agent, or Firm* — Birch, Stewart, Kolasch & Birch, LLP

(57) ABSTRACT

A method for transmitting a PPDU of an STA device, including generating an HE-STF sequence, generating a PPDU configured on the basis of the HE-STF sequence and including an HE-STF field having periodicity of 1.6 μs, and transmitting the PPDU such that the HE-STF field included in the PPDU is transmitted via a channel, wherein the HE-STF sequence is configured on the basis of an M
(Continued)

1. Repeat the structure

2. Put extra values and optimize coefficients of M sequence and extra values sequence, and when the channel is a 20 MHz channel, the HE-STF sequence may be configured to have a structure of {the M Sequence, $0_7$, 0, 0, 0, 0, 0, 0, the M sequence}, when the channel is a 40 MHz channel, the HE-STF sequence may be configured on the basis of a structure in which the HE-STF sequence of the 20 MHz channel is duplicated twice and frequency-shifted, and when the channel is a 80 MHz channel, the HE-STF sequence may be configured on the basis of a structure in which the HE-STF sequence of the 40 MHz channel is duplicated twice and frequency-shifted.

6 Claims, 51 Drawing Sheets

Related U.S. Application Data filed on Mar. 22, 2015, provisional application No. 62/201,567, filed on Aug. 5, 2015, provisional application No. 62/195,765, filed on Jul. 22, 2015.

(51) Int. Cl.
  *H04L 29/08* (2006.01)
  *H04W 72/04* (2009.01)
  *H04W 84/12* (2009.01)

(52) U.S. Cl.
  CPC ...... *H04L 27/2613* (2013.01); *H04L 27/2692* (2013.01); *H04L 69/323* (2013.01); *H04W 72/0453* (2013.01); *H04L 29/08018* (2013.01); *H04W 84/12* (2013.01)

(58) Field of Classification Search
  CPC ... H04L 69/22; H04L 27/261; H04L 27/2613; H04L 27/2692; H04L 5/005; H04L 5/0048; H04L 5/0051; H04W 84/12
  See application file for complete search history.

(56) References Cited

U.S. PATENT DOCUMENTS

2016/0087766 A1* 3/2016 Sun ............... H04L 5/0007 370/329
2016/0261452 A1* 9/2016 Porat ............... H04L 27/2656

FOREIGN PATENT DOCUMENTS

KR  10-2014-0114013 A  9/2014
WO  WO 2013/122377 A1  8/2013

OTHER PUBLICATIONS

Marvell et al., "HE-STF Proposal", IEEE 802.11-15/0381r0, Mar. 9, 2015, slide 1-38.

* cited by examiner

[Fig. 1]
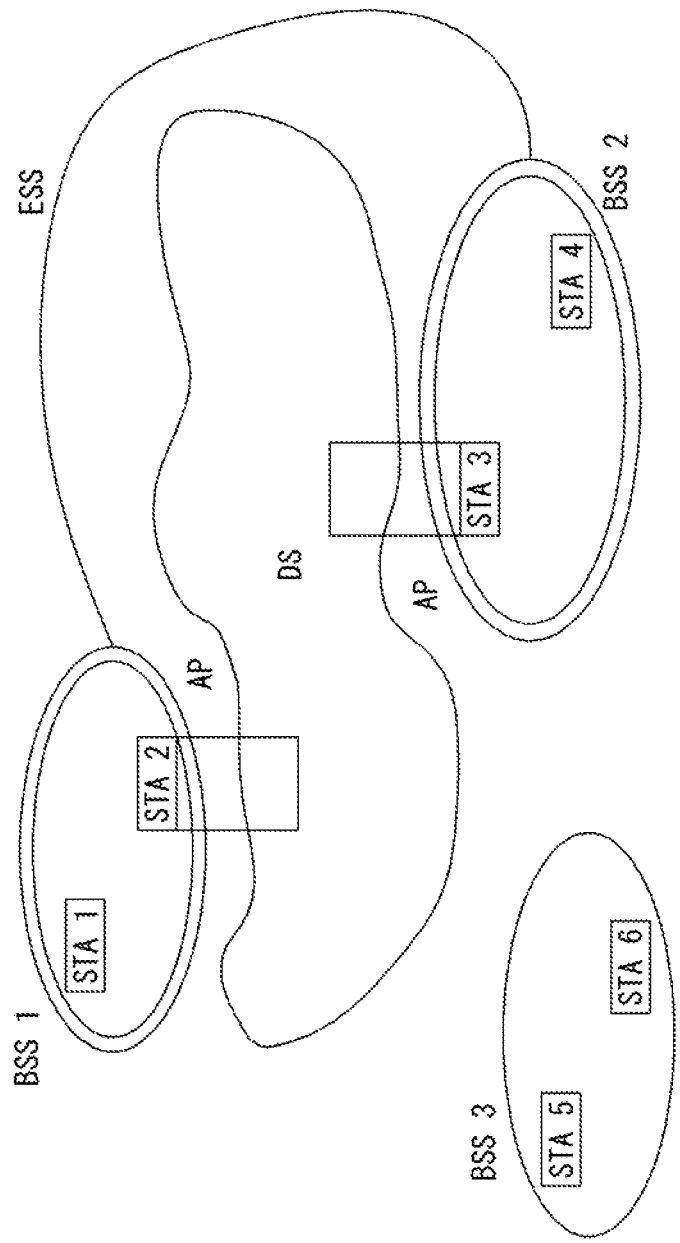

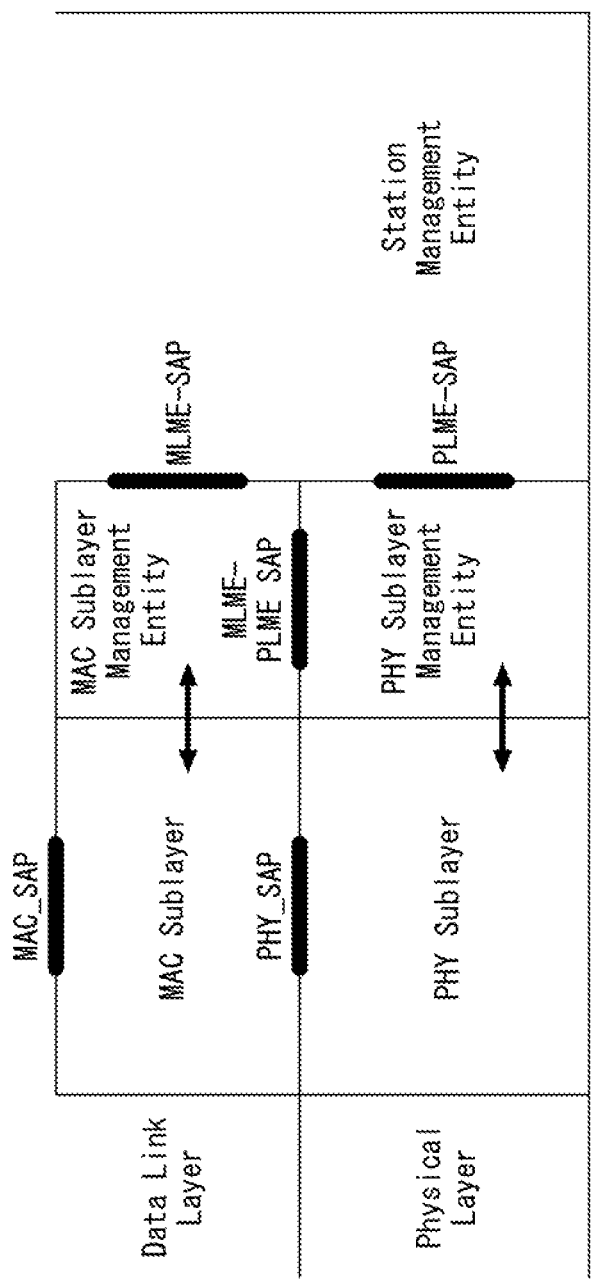
[Fig. 2]

[Fig. 3]
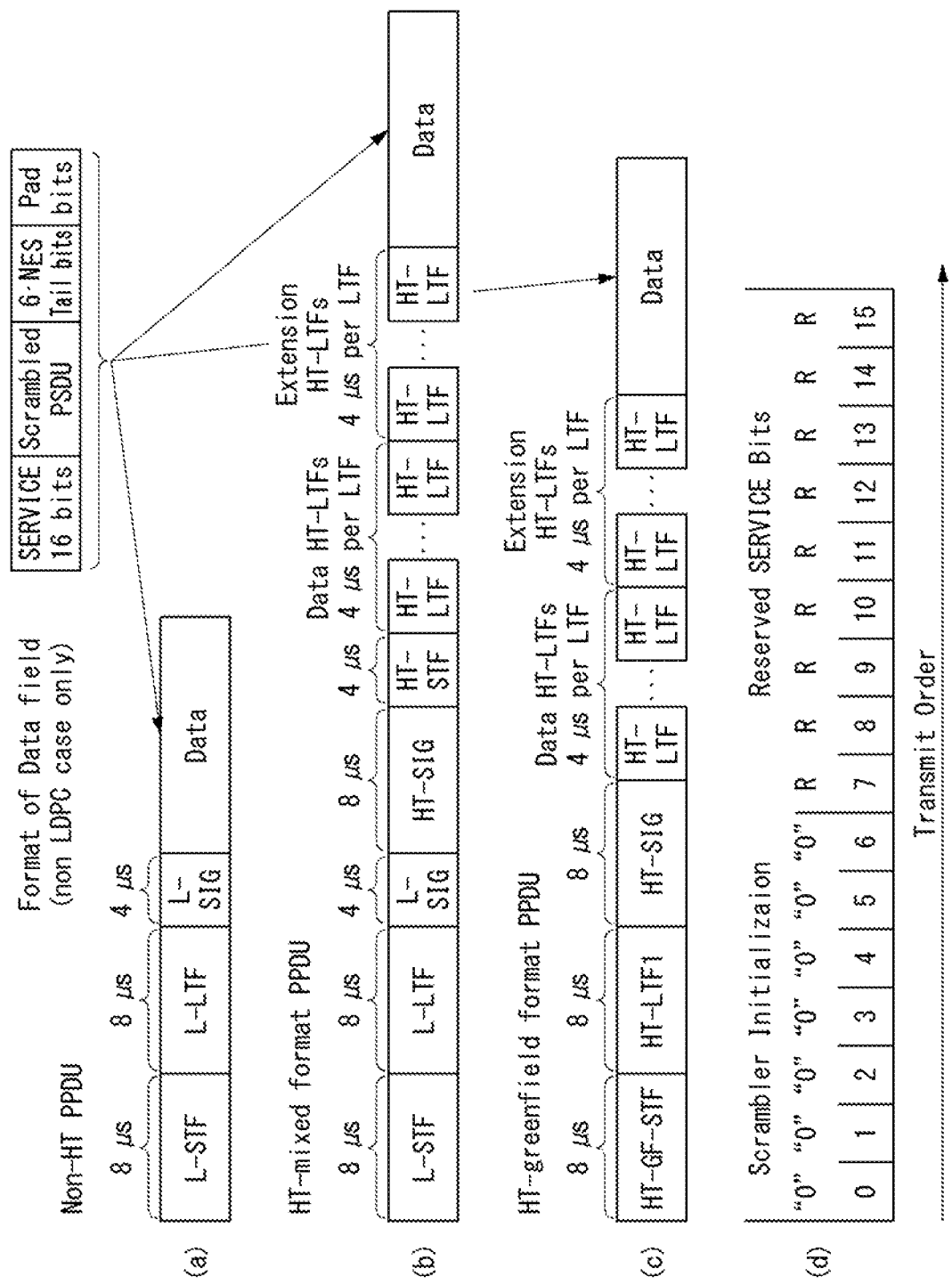

[Fig. 4]
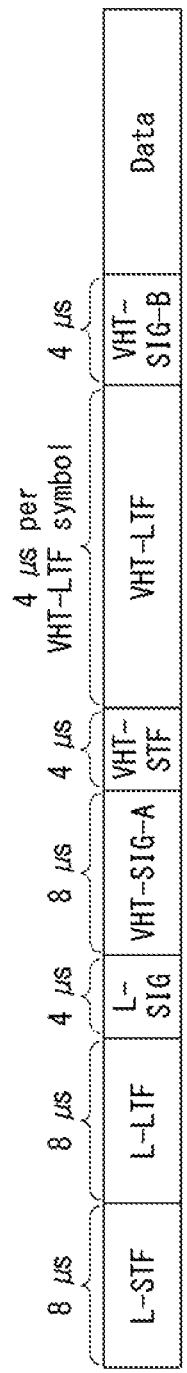

[Fig. 5]
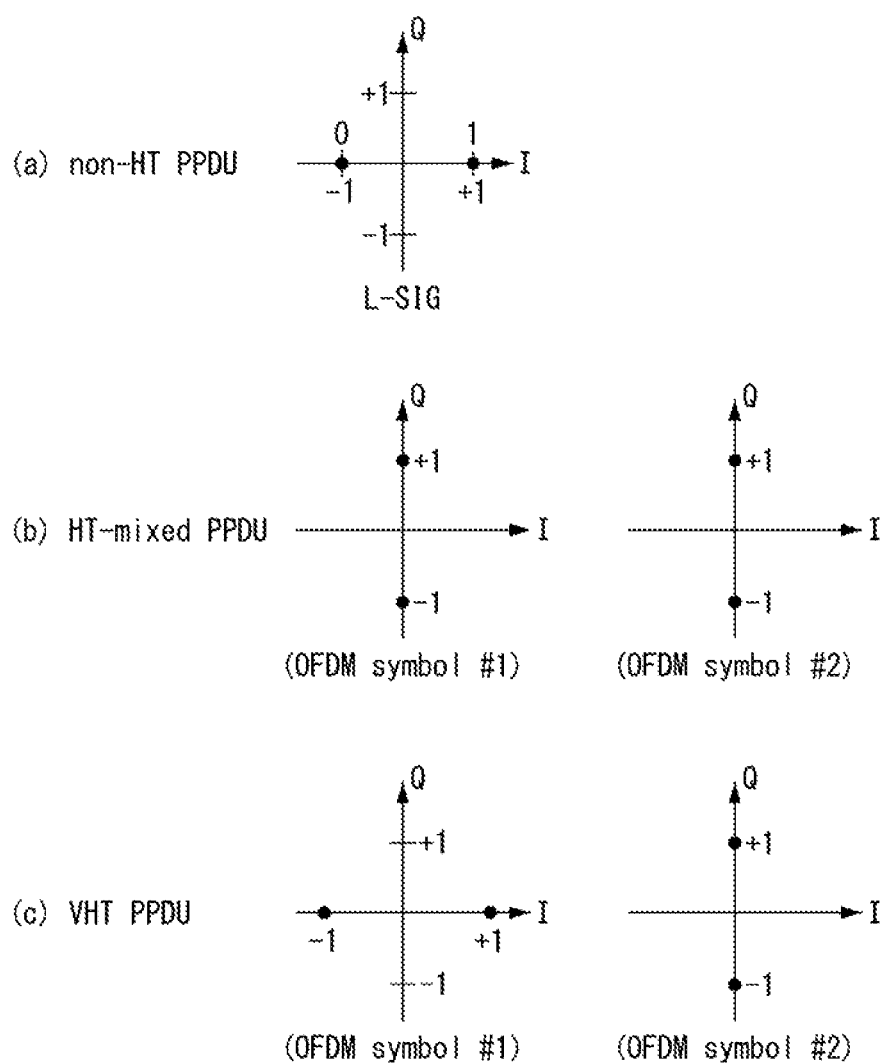

[Fig. 6]
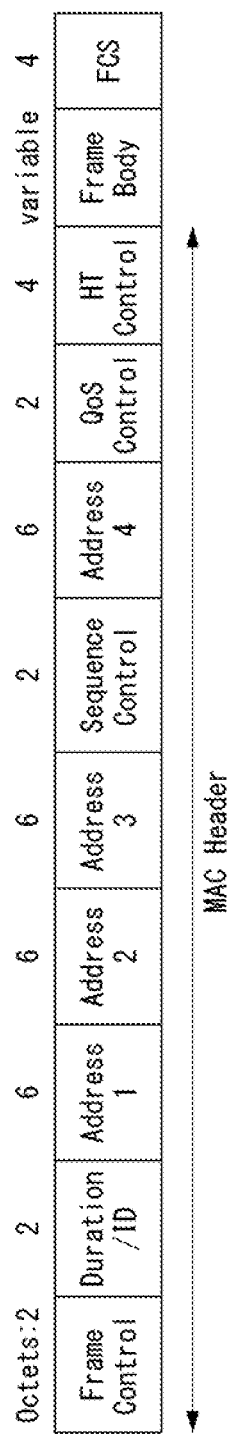

[Fig. 7]

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag-ments | Retry | Power Management | More Data | Protected Frame | Order |
| 2 | 2 | 4 | 1 | 1 | 1 | 1 | 1 | 1 | 1 | 1 |

Bits:

【Fig. 8】
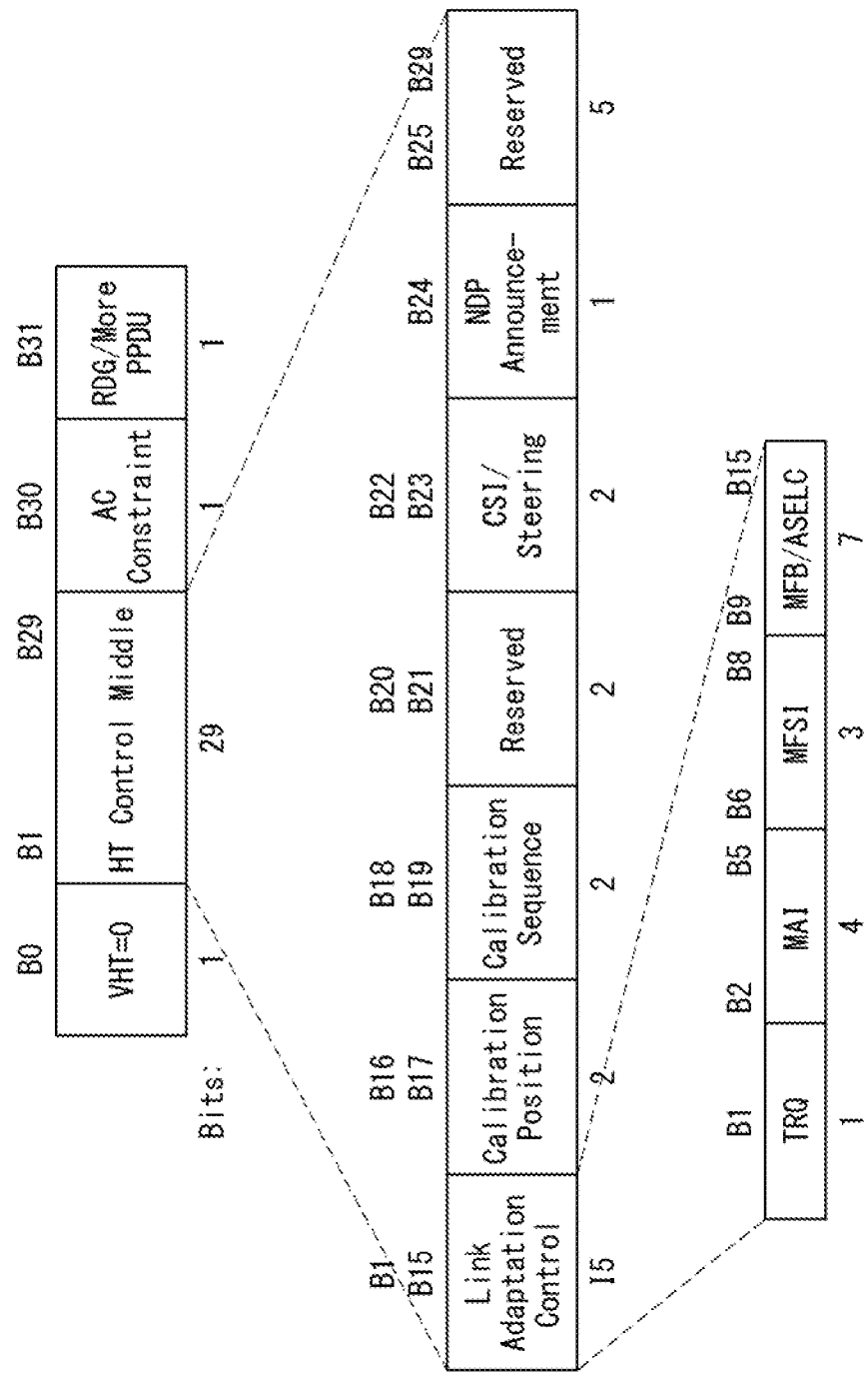

[Fig. 9]
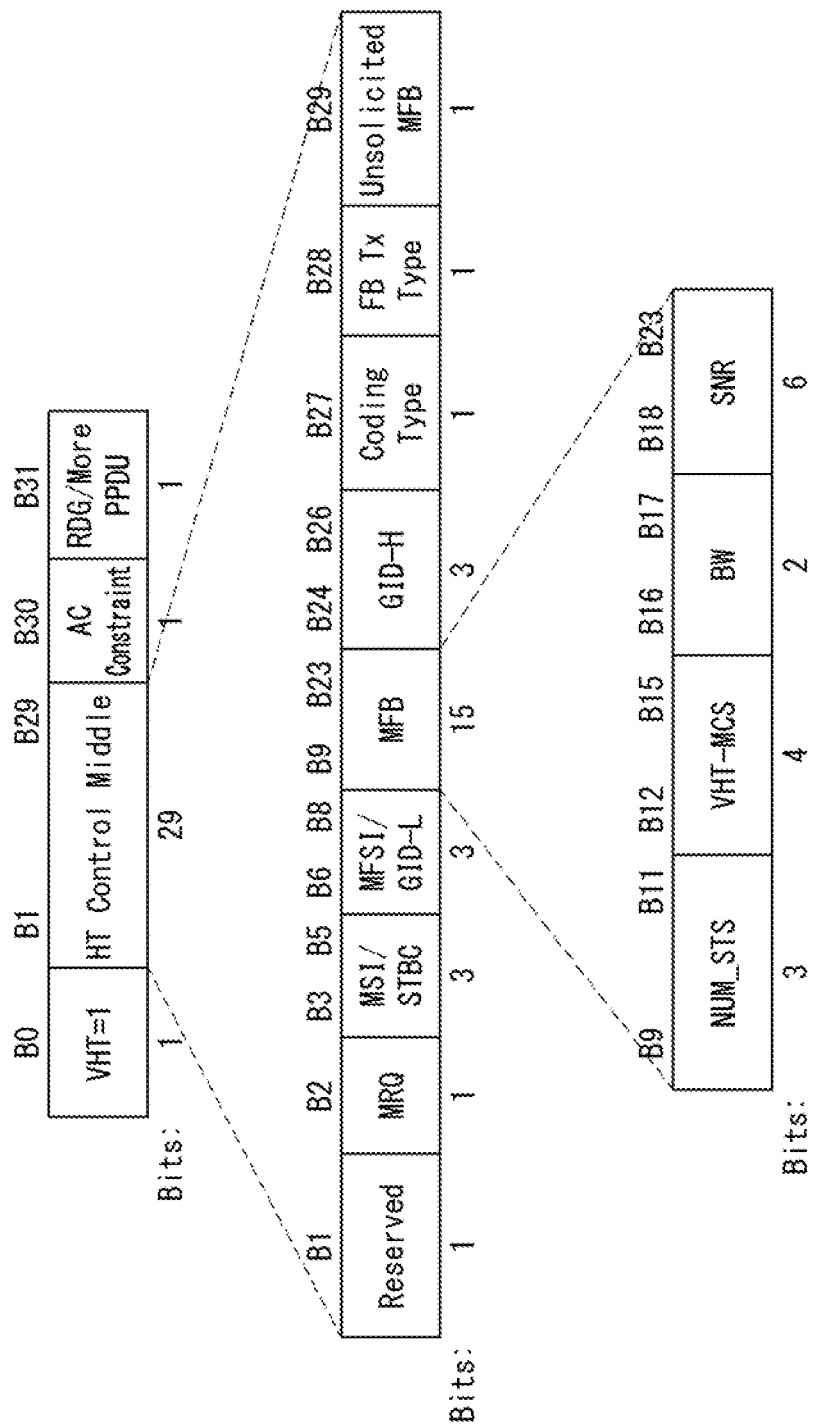

【Fig. 10】
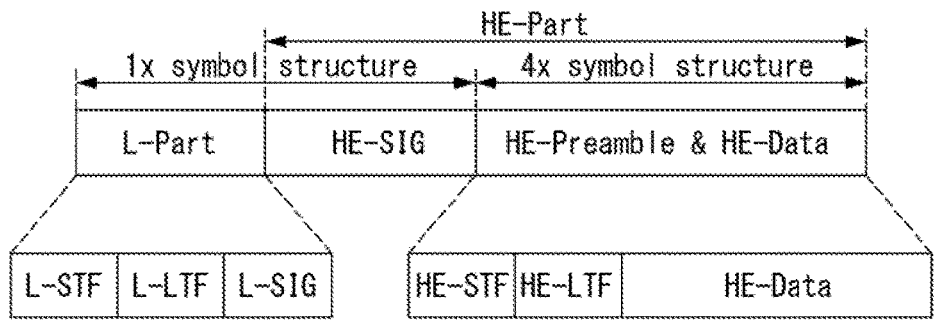
【Fig. 11】
| L-STF | L-LTF | L-SIG | HE-SIG A | | | | |
|---|---|---|---|---|---|---|---|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |
【Fig. 12】
| L-STF | L-LTF | L-SIG | HE-SIG A | | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Fig. 13]

| L-STF | L-LTF | L-SIG | HE-SIG A | HE-SIG B | HE-STF | HE-LTF | Data for STA1 |
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

[Fig. 14]

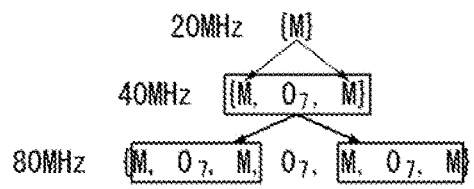

1. Repeat the structure

20MHz  {$c_1$M}

40MHz  {$c_2$M, $0_7$, $c_3$M}

80MHz  {$c_4$M, $0_3$, ⓐ₁, $0_3$, $c_5$M, $0_7$, $c_6$M, $0_3$, ⓐ₂, $0_3$, $c_7$M}
                   Extra                  Extra
                   Value                  Value 2. Put extra values and optimize coefficients of M sequence and extra values 【Fig. 15】
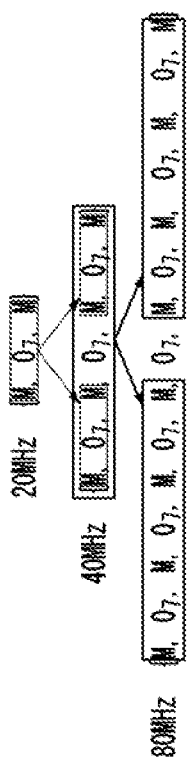

[Fig. 16]
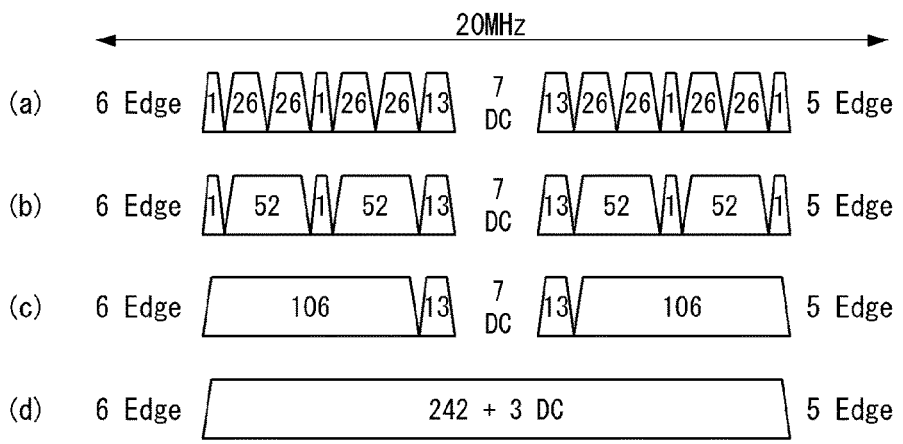

| 6.02 | 2.22 | 2.22 | 4.77 | 1.93 | 4.77 | 2.22 | 2.22 | 6.02 |
|------|------|------|------|------|------|------|------|------|
| 4.89 || 3.51 || 1.93 | 3.51 || 4.89 ||
| 4.52 |||| 1.93 | 4.52 ||||
| 4.40 |||||||||

(b)

| 2.48 | 2.22 | 2.22 | 4.77 | 1.93 | 4.77 | 2.22 | 2.22 | 2.48 |
|------|------|------|------|------|------|------|------|------|
| 4.62 || 3.51 || 1.93 | 3.51 || 4.62 ||
| 3.99 |||| 1.93 | 3.99 ||||
| 5.78 |||||||||

[Fig. 18]
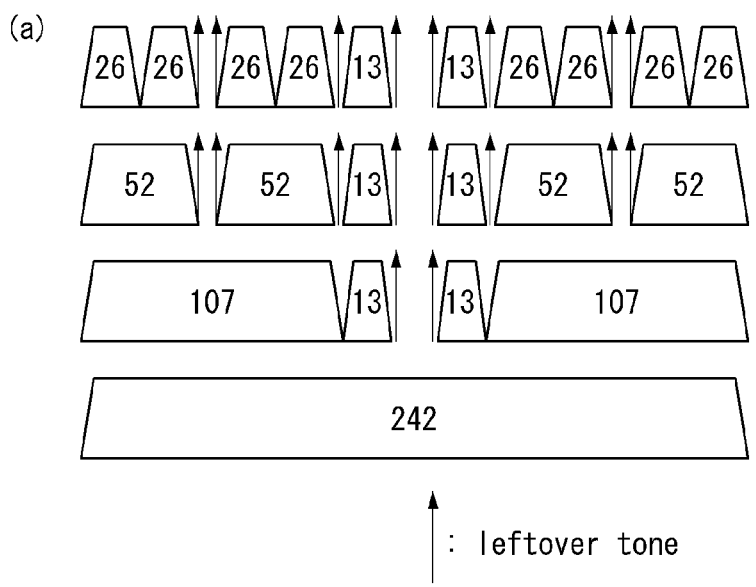

【Fig. 19】
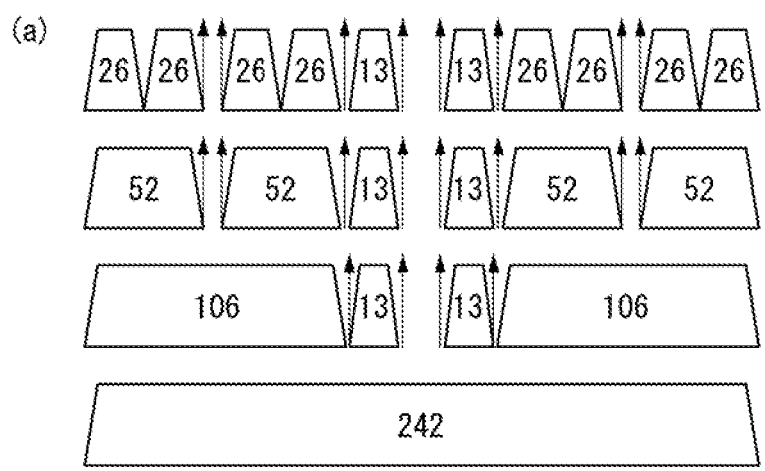

【Fig. 20】
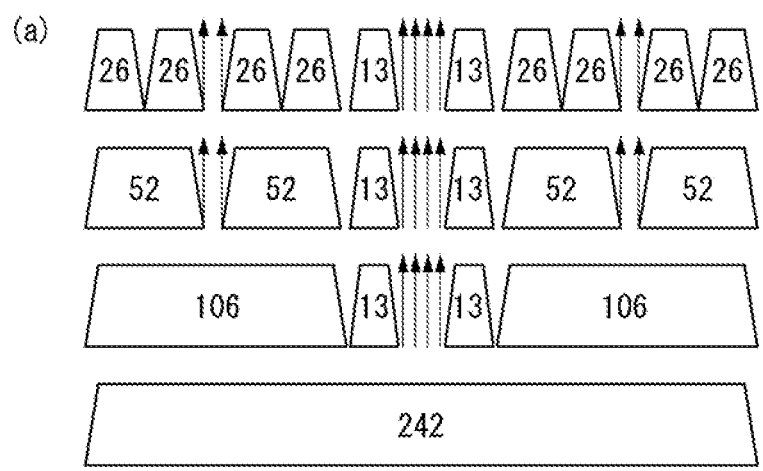

【Fig. 21】
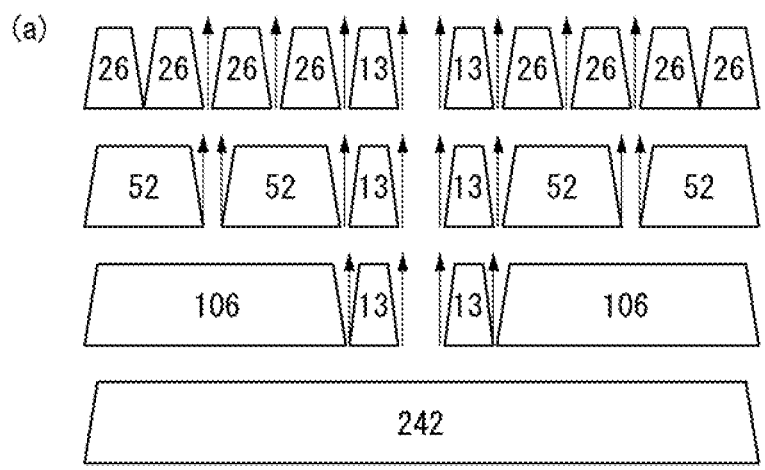

【Fig. 22】
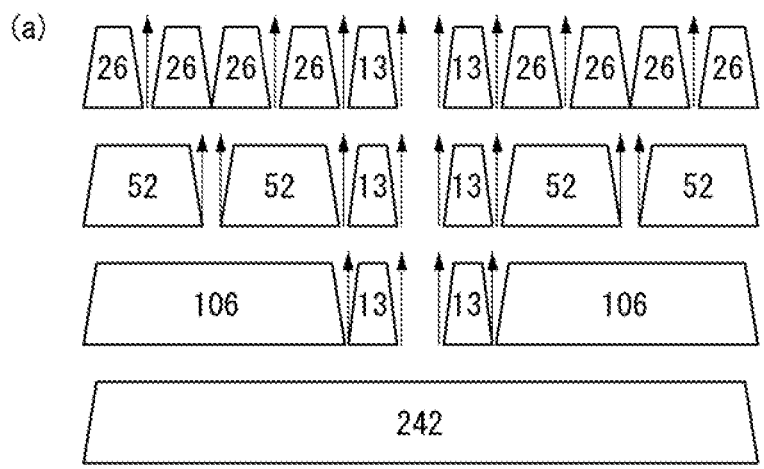

[Fig. 23]
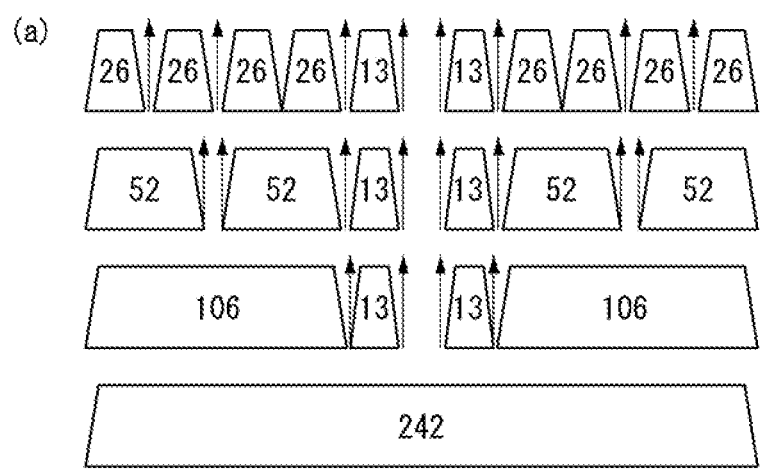

[Fig. 24]
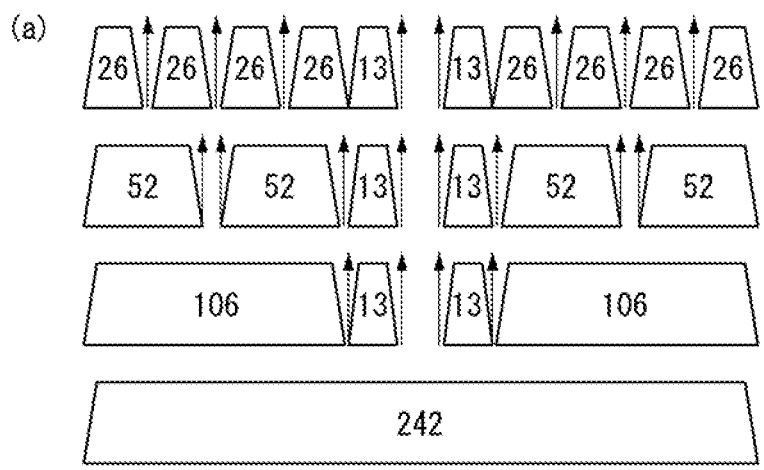

【Fig. 25】
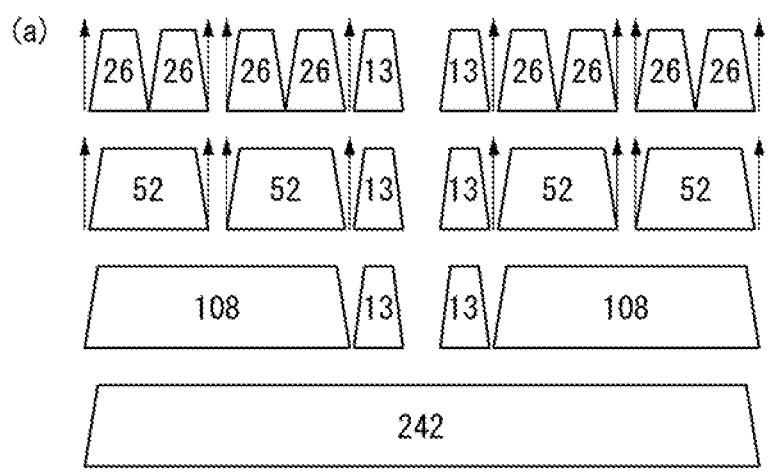

[Fig. 26]
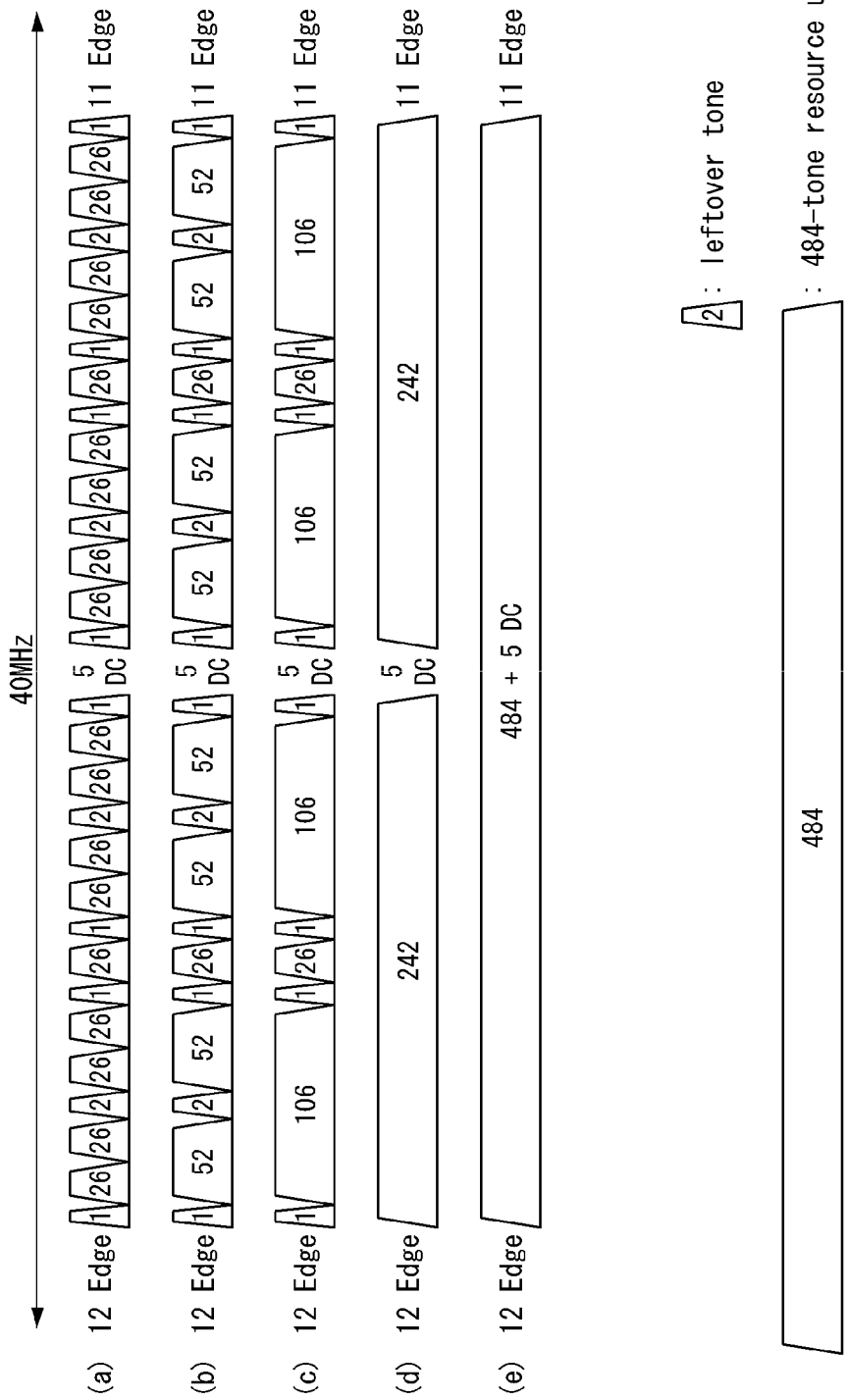

[Fig. 27]

| 4.77 | 3.75 | 2.22 | 4.77 | 3.01 | 4.77 | 2.22 | 2.22 | 4.77 | 4.77 | 2.22 | 2.22 | 4.77 | 3.01 | 4.77 | 2.22 | 3.75 | 4.77 |
|---|---|---|---|---|---|---|---|---|---|---|---|---|---|---|---|---|---|
| 2.77 | | 4.59 | | 3.01 | | 3.51 | | 4.30 | 4.30 | | 3.51 | | 3.01 | | 4.59 | | 2.77 |
| | 3.02 | | | 3.01 | | | 4.52 | | | 4.52 | | | 3.01 | | 3.02 | | |
| | | | | 5.00 | | | | | 4.43 | | | | 5.00 | | | | |

[Fig. 28]

[Fig. 29]
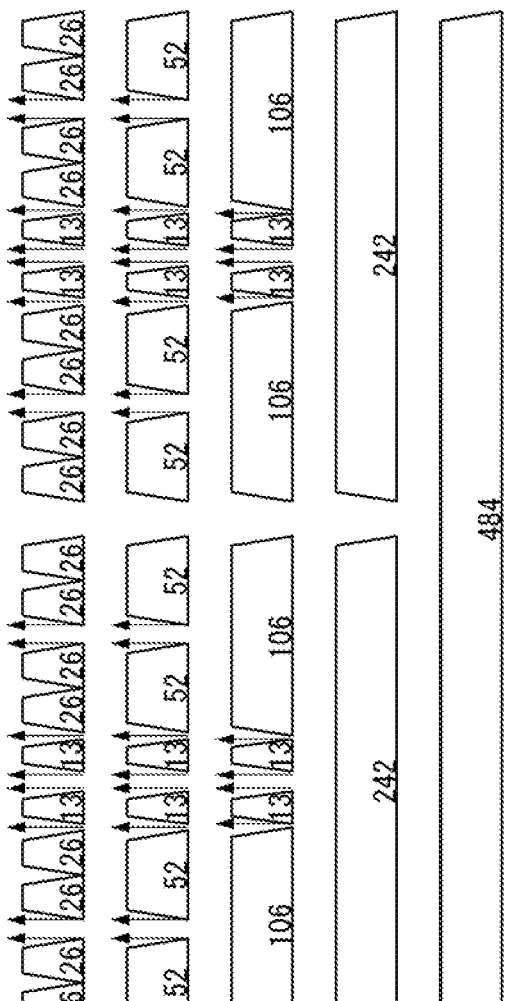

【Fig. 30】
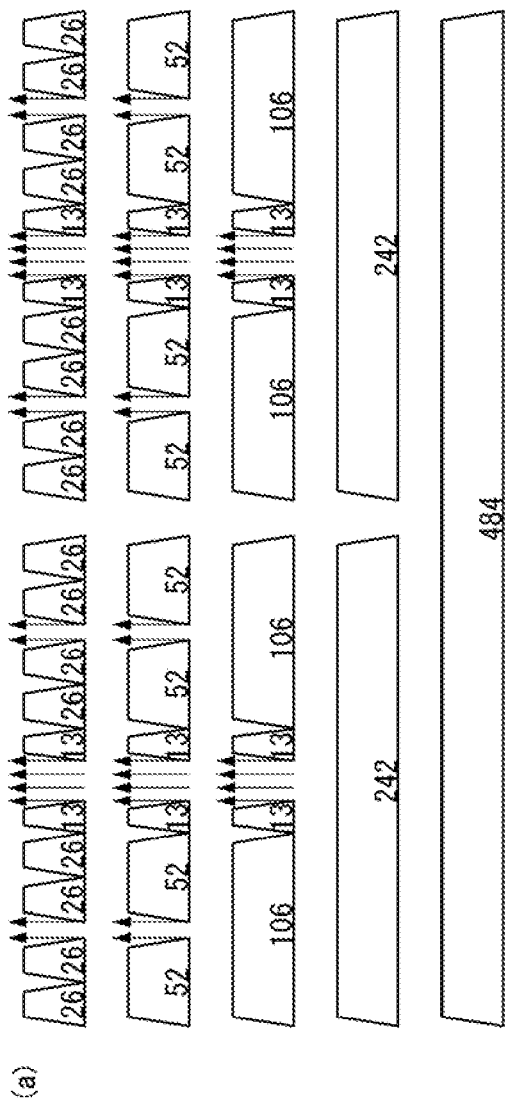

【Fig. 31】
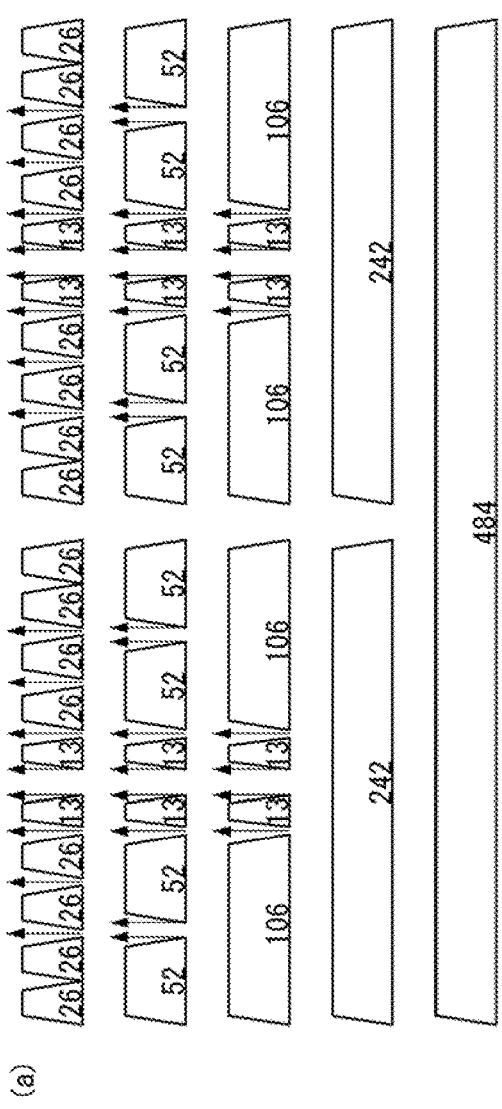

[Fig. 32]
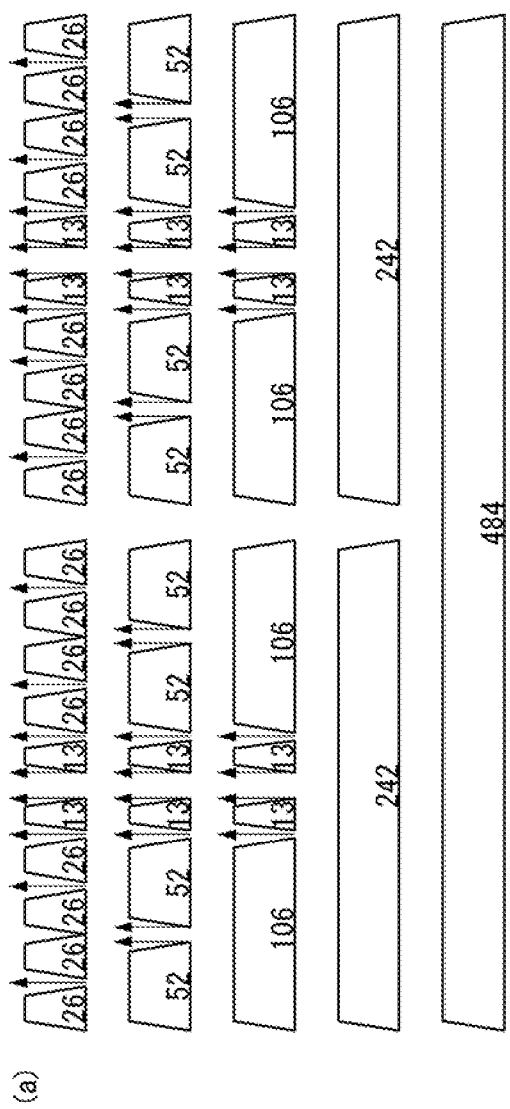

【Fig. 33】
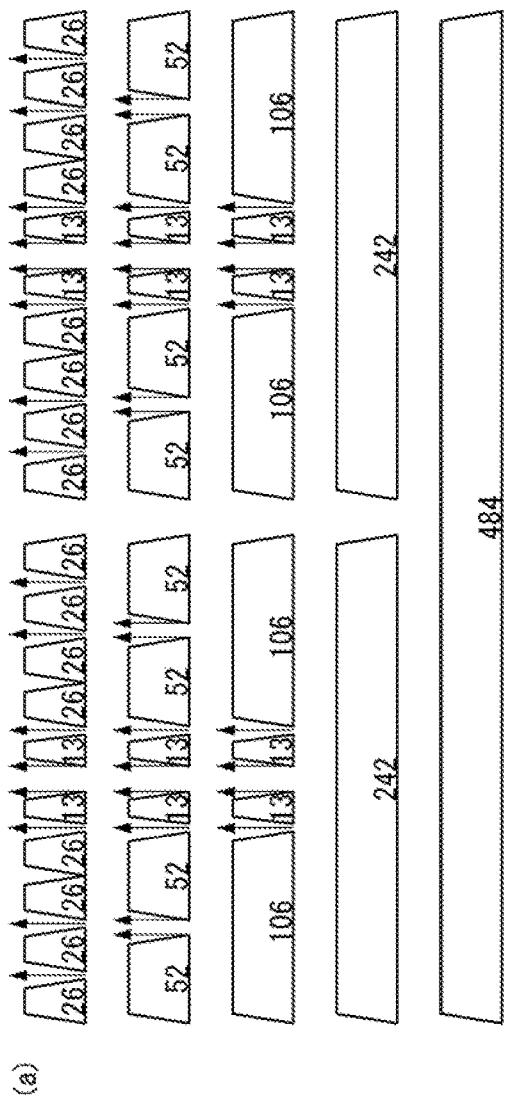

【Fig. 34】
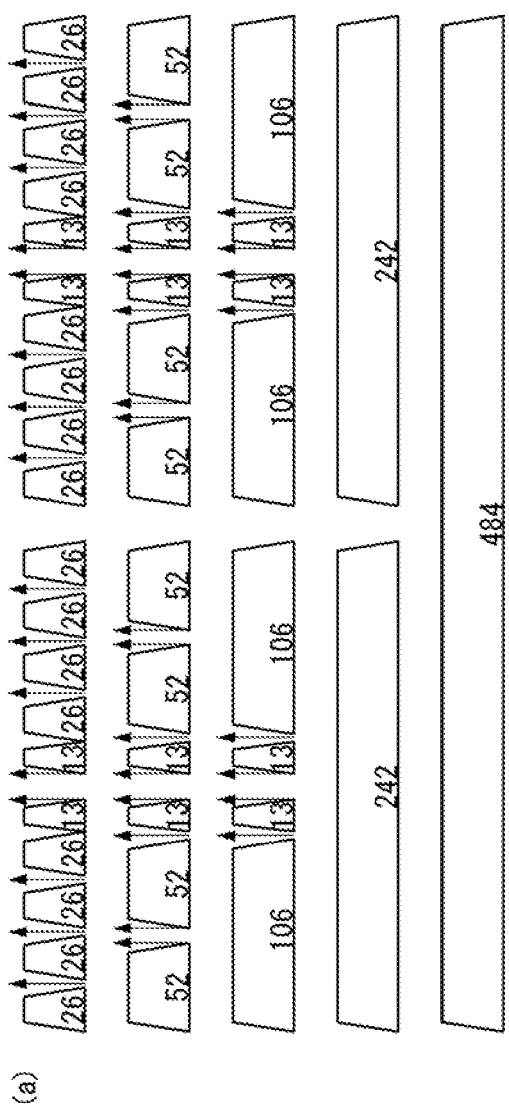

[Fig. 35]
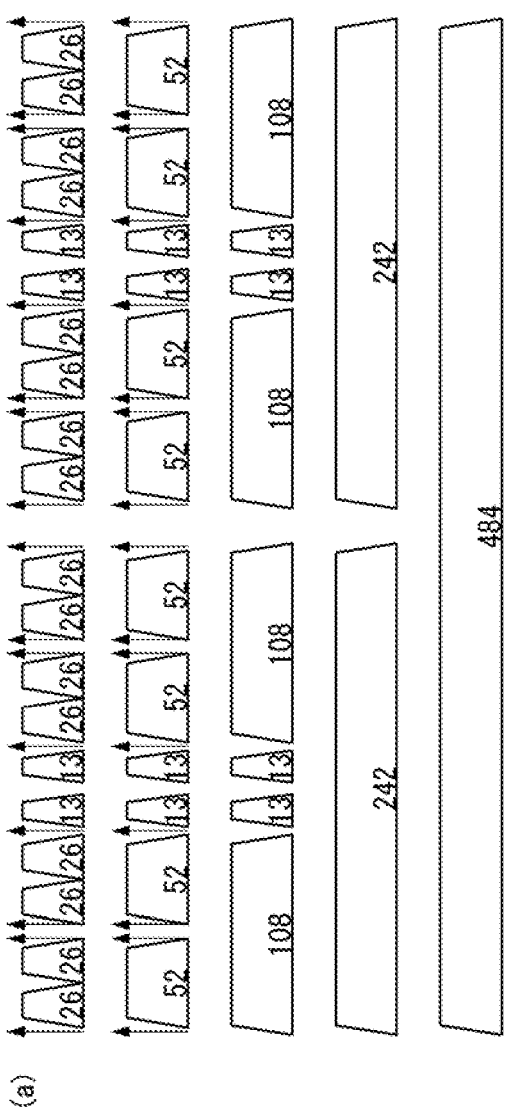

[Fig. 36]
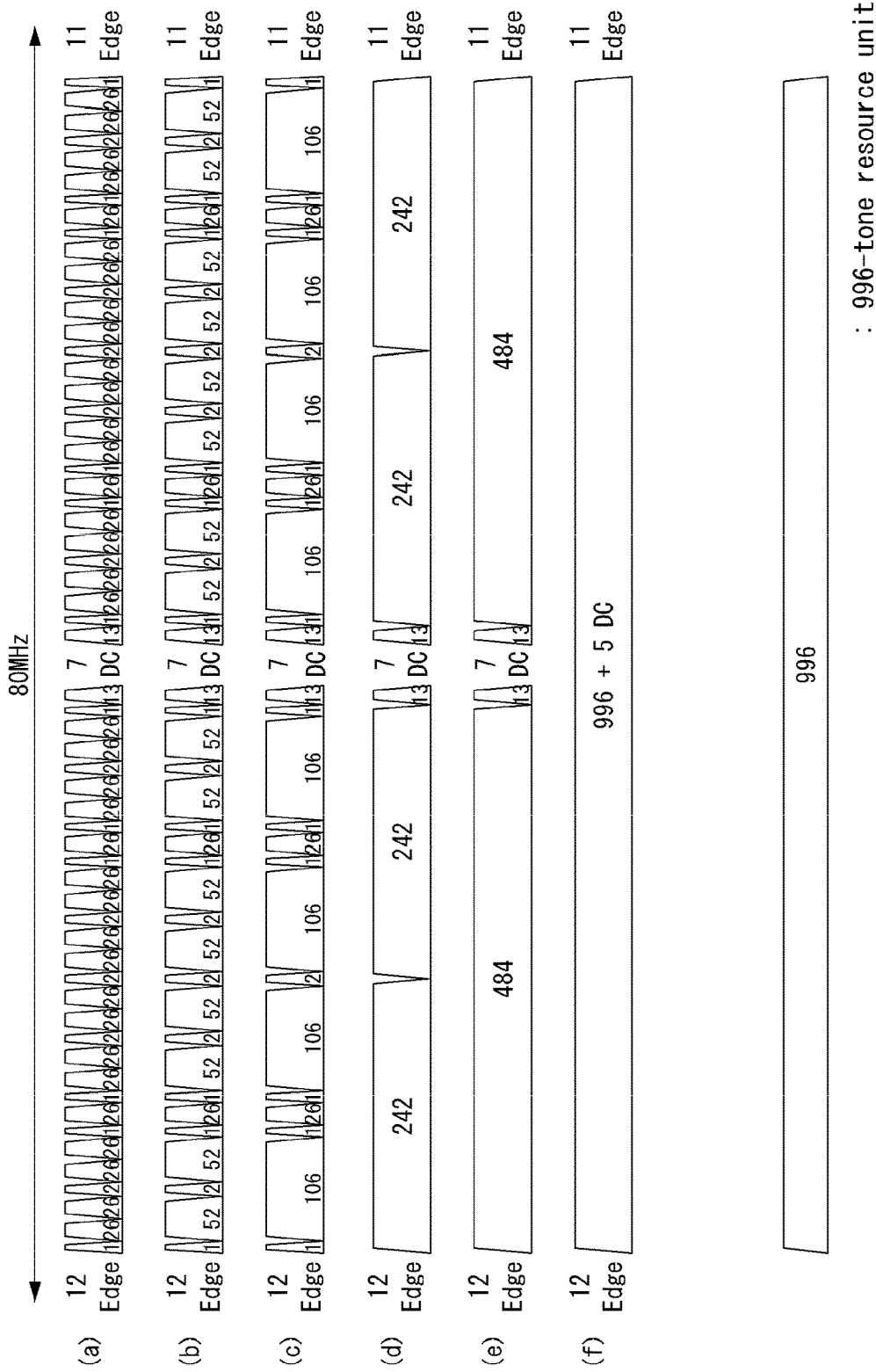

| 4.77 | 3.75 | 2.22 | 4.77 | 2.48 | 4.77 | 2.22 | 4.77 | 6.02 | 2.22 | 2.22 | 2.48 | 2.22 | 4.77 | 3.75 | 2.22 | 4.77 |
|------|------|------|------|------|------|------|------|------|------|------|------|------|------|------|------|------|
| 2.77 | 4.59 | | 2.48 | 3.51 | | 4.30 | | 5.53 | | 4.92 | 2.22 | | 4.90 | 3.51 | |
| 3.02 | | 2.48 | | 4.52 | | | 4.12 | | | 2.22 | | 4.52 | | |
| | 4.55 | | | | | | | | 5.18 | | | | | |
| | | | | | 5.08 | | | | | | | | | |

(b)

| 4.77 | 2.22 | 3.75 | 4.77 | 2.48 | 2.22 | 6.02 | 2.22 | 2.22 | 2.48 | 2.22 | 4.77 | 2.48 | 4.77 | 2.22 | 3.75 | 4.77 |
|------|------|------|------|------|------|------|------|------|------|------|------|------|------|------|------|------|
| 3.51 | | 4.90 | | 4.92 | | 5.53 | | 3.51 | | 4.30 | | 4.59 | 2.77 | |
| 4.52 | | | 4.12 | | | | | 4.52 | | | 3.02 | | |
| | | 5.18 | | | | | | 4.55 | | | | | |
| | | | | | 5.08 | | | | | | | | |

[Fig. 38]
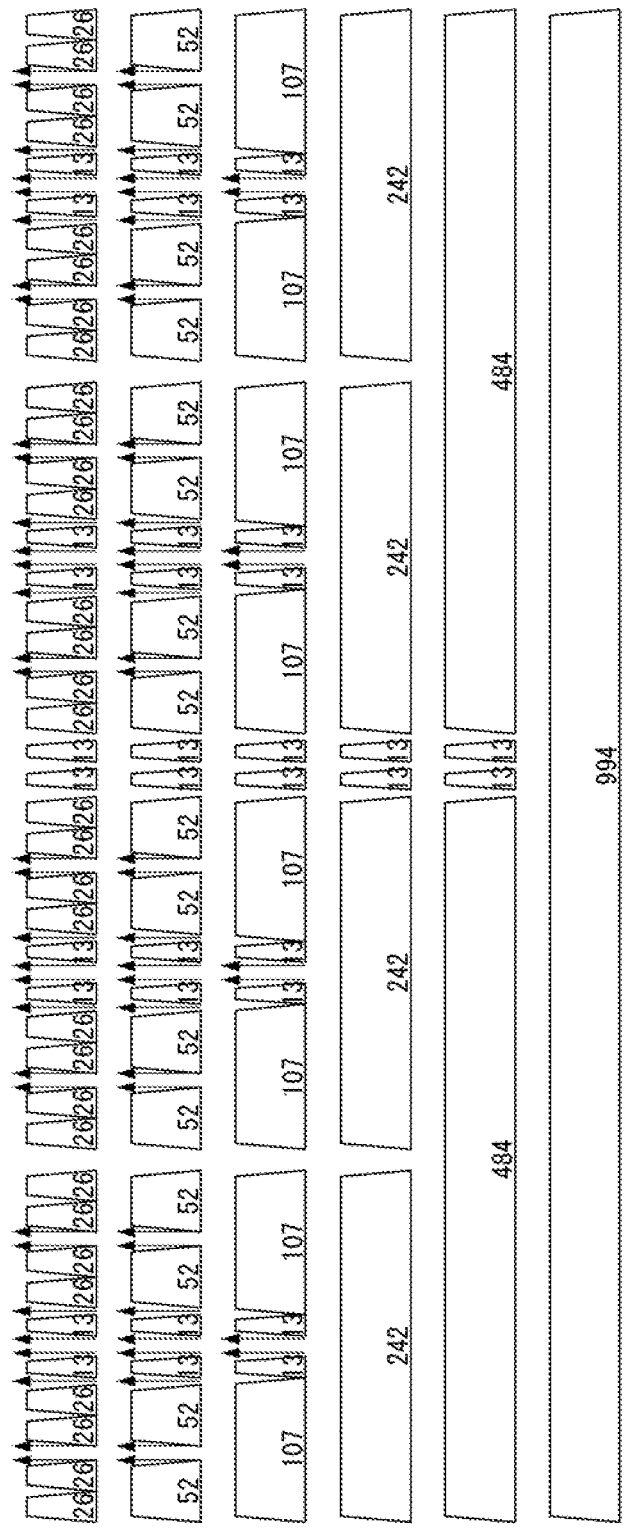

| 4.77 | 2.22 | 4.77 | 2.48 | 4.77 | 2.22 | 2.22 | 4.77 | 2.22 | 2.22 | 2.22 | 2.22 | 4.77 | 3.75 | 2.22 | 4.77 |
|------|------|------|------|------|------|------|------|------|------|------|------|------|------|------|------|
| 4.59 | | 4.59 | 2.48 | 3.51 | 4.30 | 5.53 | 2.48 | 5.11 | 2.22 | 2.22 | 4.90 | | 3.51 | | |
| 3.02 | | | 2.48 | | 4.52 | | 4.12 | | 2.22 | | 4.52 | | | | |
| | | | 4.55 | | | | | | 5.18 | | | | | | |
| | | | | | | 5.08 | | | | | | | | | |

(b)

| 4.77 | 2.22 | 3.75 | 4.77 | 2.22 | 2.22 | 4.77 | 2.48 | 2.22 | 4.77 | 2.22 | 2.48 | 4.77 | 2.22 | 2.22 | 4.77 |
|------|------|------|------|------|------|------|------|------|------|------|------|------|------|------|------|
| 3.51 | | 4.90 | | 5.53 | 5.11 | 2.22 | | 4.30 | 3.51 | | 2.48 | | 4.59 | | 4.59 |
| | | 4.52 | | | 4.12 | 2.22 | | | 4.52 | | 2.48 | | | | 3.02 |
| | | | | | | 5.18 | | | | | 4.55 | | | | |
| | | | | | | | | 5.08 | | | | | | | |

[Fig. 40]
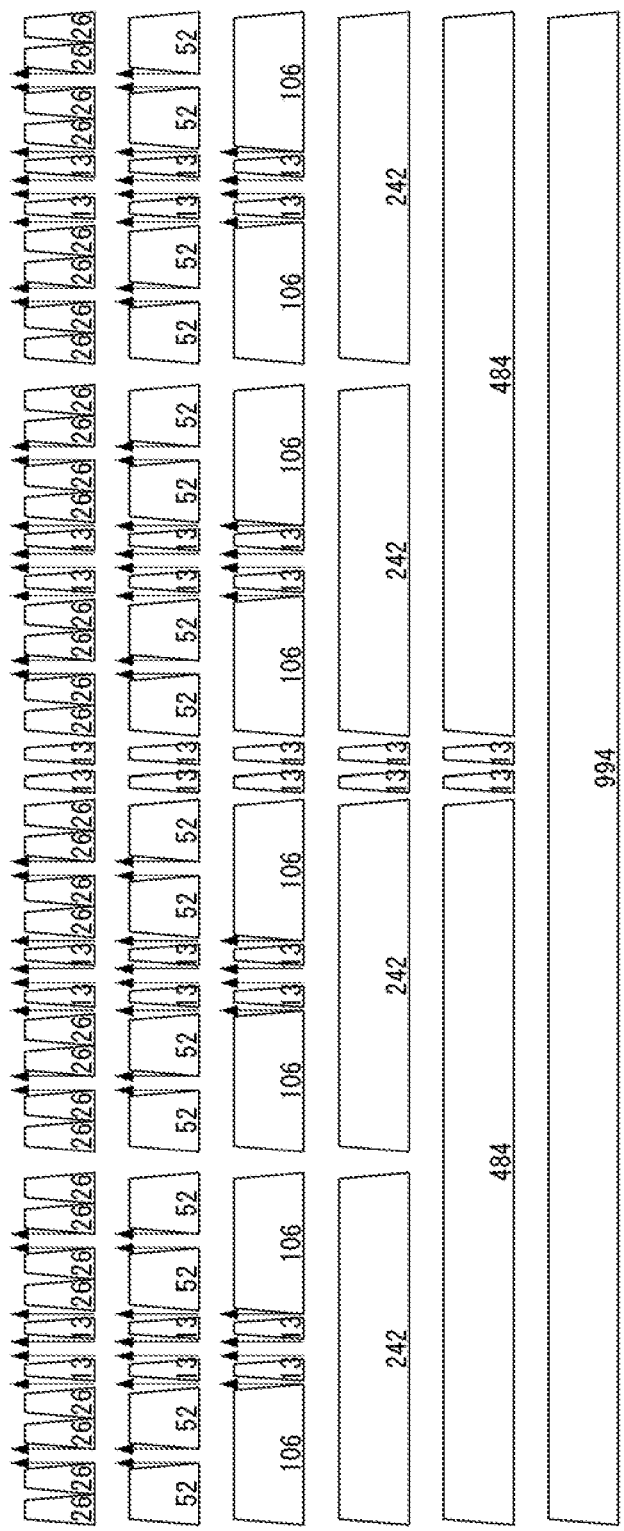

[Fig. 42]
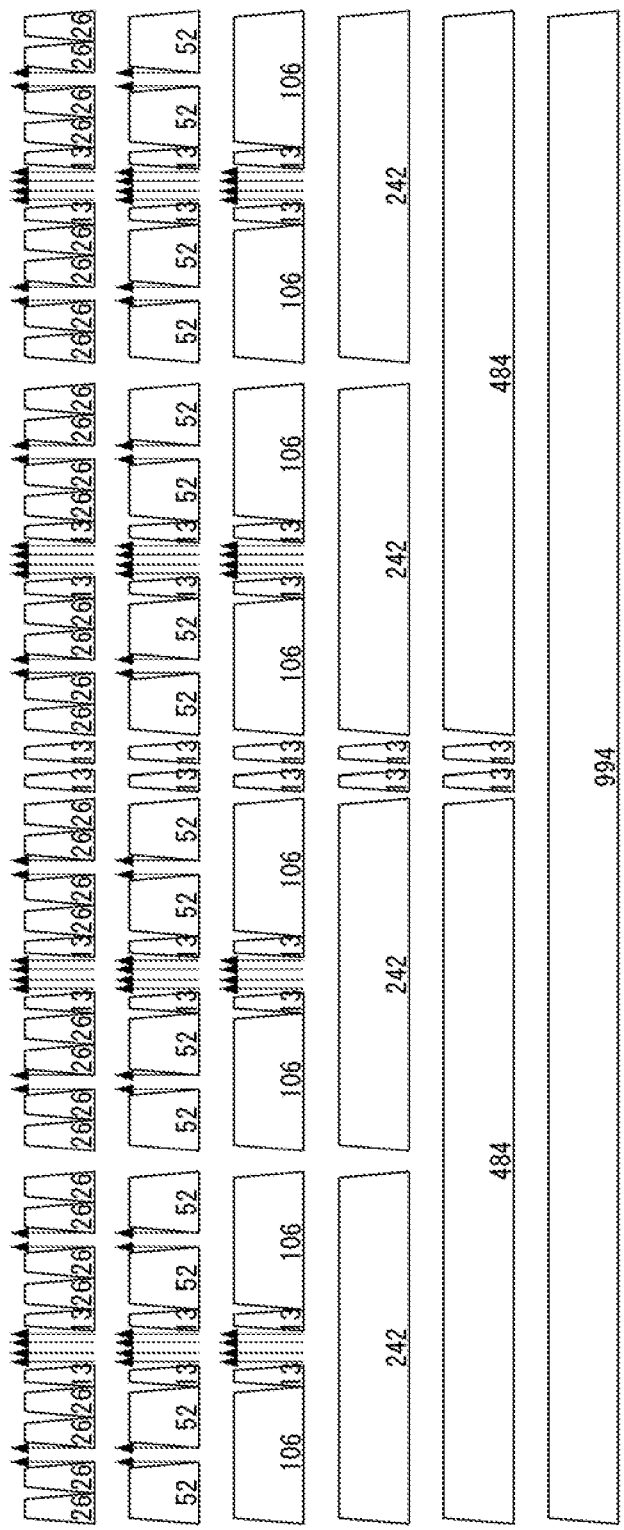

| 4.77 | 2.22 | 2.22 | 4.77 | 2.48 | 4.77 | 2.22 | 4.77 | 2.48 | 2.22 | 2.22 | 3.72 | 4.77 | 3.75 | 2.22 | 4.77 |
|---|---|---|---|---|---|---|---|---|---|---|---|---|---|---|---|
| 4.59 | 4.59 | 2.48 | 3.51 | 4.30 | 5.53 | 5.11 | 3.72 | 4.90 | 3.51 |
| 3.02 | 2.48 | 4.52 | 4.52 | 4.99 | 3.72 | 4.52 |
| 4.55 | 5.18 |
| 5.08 |

(b)

| 4.77 | 2.22 | 3.75 | 4.77 | 2.48 | 2.22 | 2.22 | 4.77 | 2.22 | 2.48 | 4.77 | 2.22 | 2.22 | 4.77 |
|---|---|---|---|---|---|---|---|---|---|---|---|---|---|
| 3.51 | 4.90 | 3.72 | 5.53 | 5.11 | 4.30 | 3.51 | 4.59 | 4.59 |
| 4.52 | 3.72 | 4.99 | 4.52 | 3.02 |
| 5.18 | 4.55 |
| 5.08 |

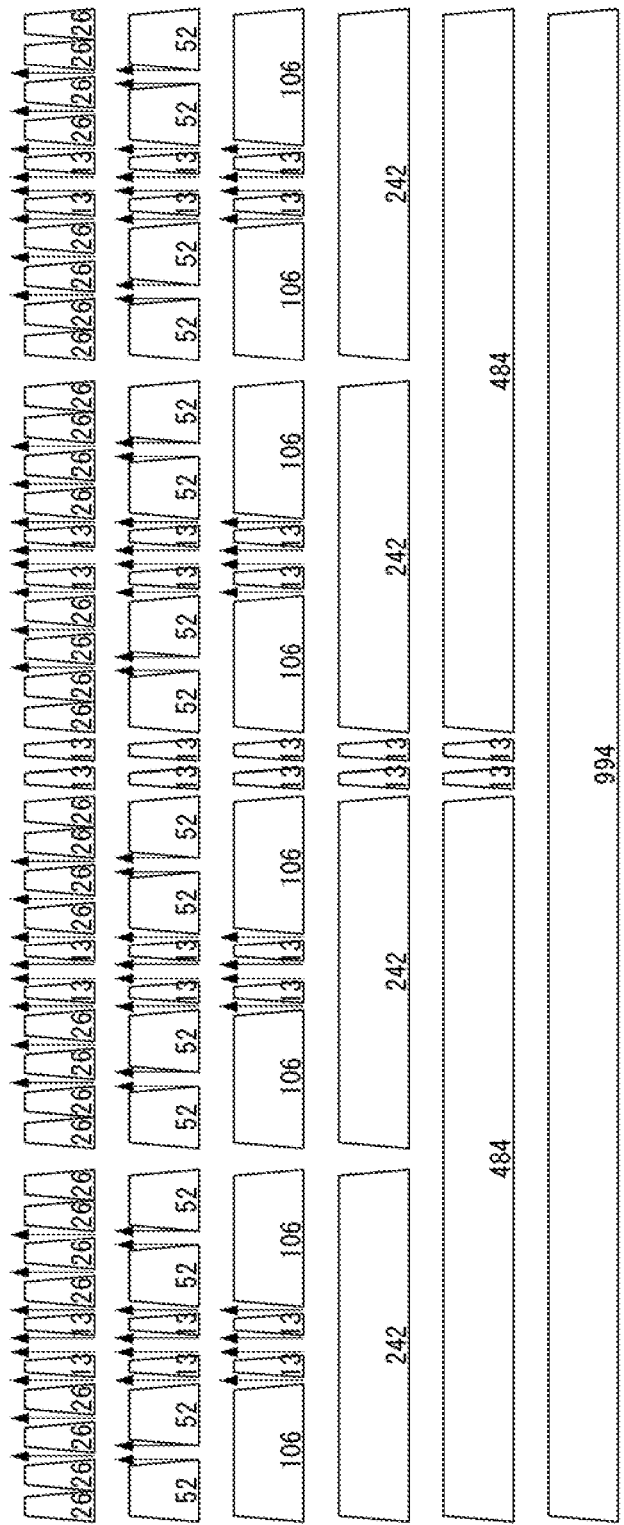
[Fig. 44]

| 4.77 | 2.22 | 2.22 | 4.77 | 2.48 | 4.77 | 3.75 | 2.22 | 4.77 | 2.48 | 2.22 | 2.22 | 4.77 | 2.22 | 2.22 | 4.77 |
|---|---|---|---|---|---|---|---|---|---|---|---|---|---|---|---|
| 4.59 | 4.59 | 2.48 | 2.48 | 3.51 | 5.53 | 4.30 | 5.11 | 2.22 | 4.90 | 3.51 | | | | | |
| 3.02 | | 2.48 | 4.52 | 4.52 | 4.99 | | 2.22 | 4.52 | | | | | | | |
| 4.55 | | | | 5.08 | | | 5.18 | | | | | | | | |

(b)

| 4.77 | 2.22 | 2.22 | 4.77 | 2.48 | 2.22 | 2.22 | 4.77 | 3.75 | 2.22 | 4.77 | 2.48 | 2.22 | 2.22 | 4.77 |
|---|---|---|---|---|---|---|---|---|---|---|---|---|---|---|
| 3.51 | 4.90 | 2.22 | 2.22 | 5.11 | 5.53 | 4.30 | 3.51 | 2.48 | 4.59 | | | | | |
| 4.52 | | 2.22 | 4.99 | | 4.52 | | 3.02 | | | | | | | |
| | 5.18 | | | 5.08 | | 4.55 | | | | | | | | |

[Fig. 46]
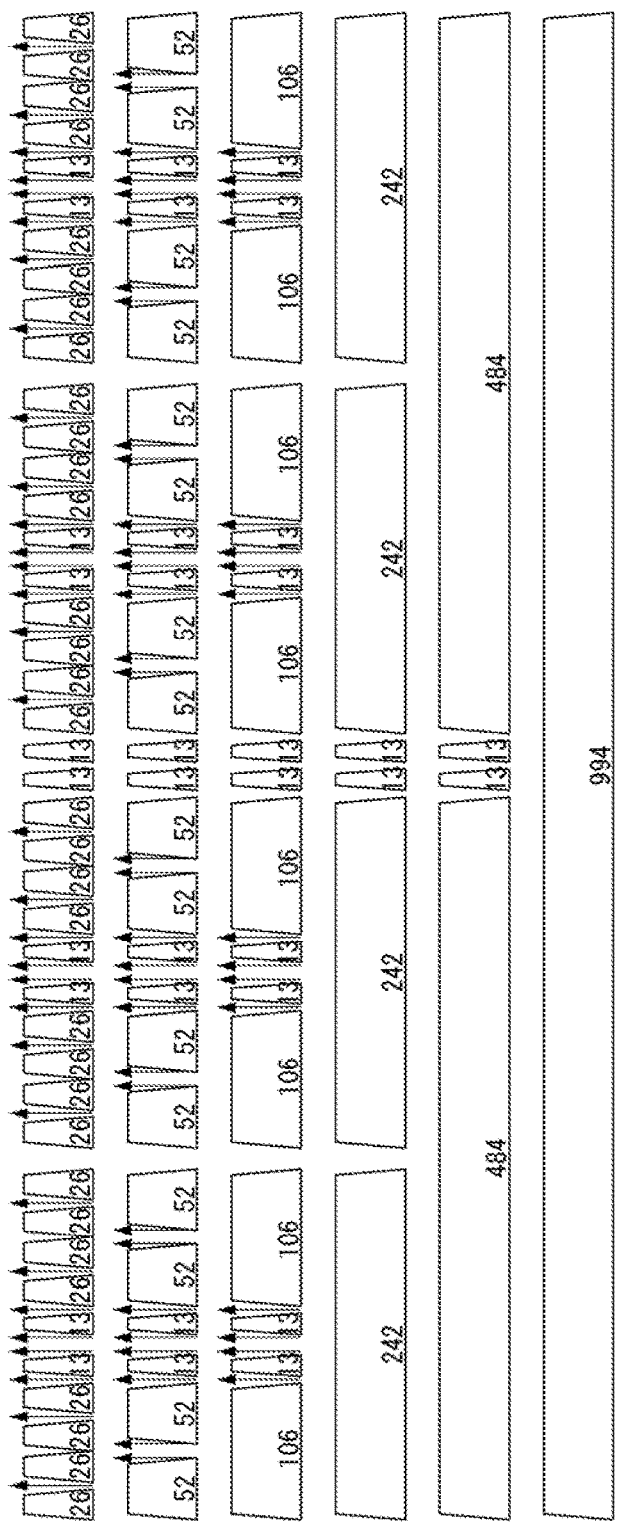

| 4.77 | 3.75 | 2.22 | 4.77 | 2.48 | 4.77 | 3.75 | 2.22 | 4.77 | 2.22 | 2.22 | 2.22 | 2.22 | 4.77 | 2.22 | 2.22 | 4.77 |
|---|---|---|---|---|---|---|---|---|---|---|---|---|---|---|---|---|
| 4.59 | | | 4.59 | 2.48 | 3.51 | | 4.30 | 5.53 | 5.11 | | 2.22 | 2.22 | 4.90 | | 3.51 | |
| 3.02 | | | | 2.48 | | 4.52 | | 4.99 | | | 2.22 | | 4.52 | | | |
| | | | 4.55 | | | | | | 5.08 | | | 5.18 | | | | |

(b)

| 4.77 | 2.22 | 4.77 | 2.22 | 2.22 | 4.77 | 2.22 | 3.75 | 4.77 | 2.48 | 2.48 | 4.77 | 2.22 | 2.22 | 3.75 | 4.77 |
|---|---|---|---|---|---|---|---|---|---|---|---|---|---|---|---|
| 3.51 | | 4.90 | | 5.11 | | 5.53 | 4.30 | 3.51 | 2.48 | 2.48 | 4.59 | 4.59 | 4.59 | | 4.59 |
| | 4.52 | | | | 4.99 | | | 4.52 | | | | 3.02 | | | |
| | | | 5.18 | | | | 5.08 | | | 4.55 | | | | | |

【Fig. 48】
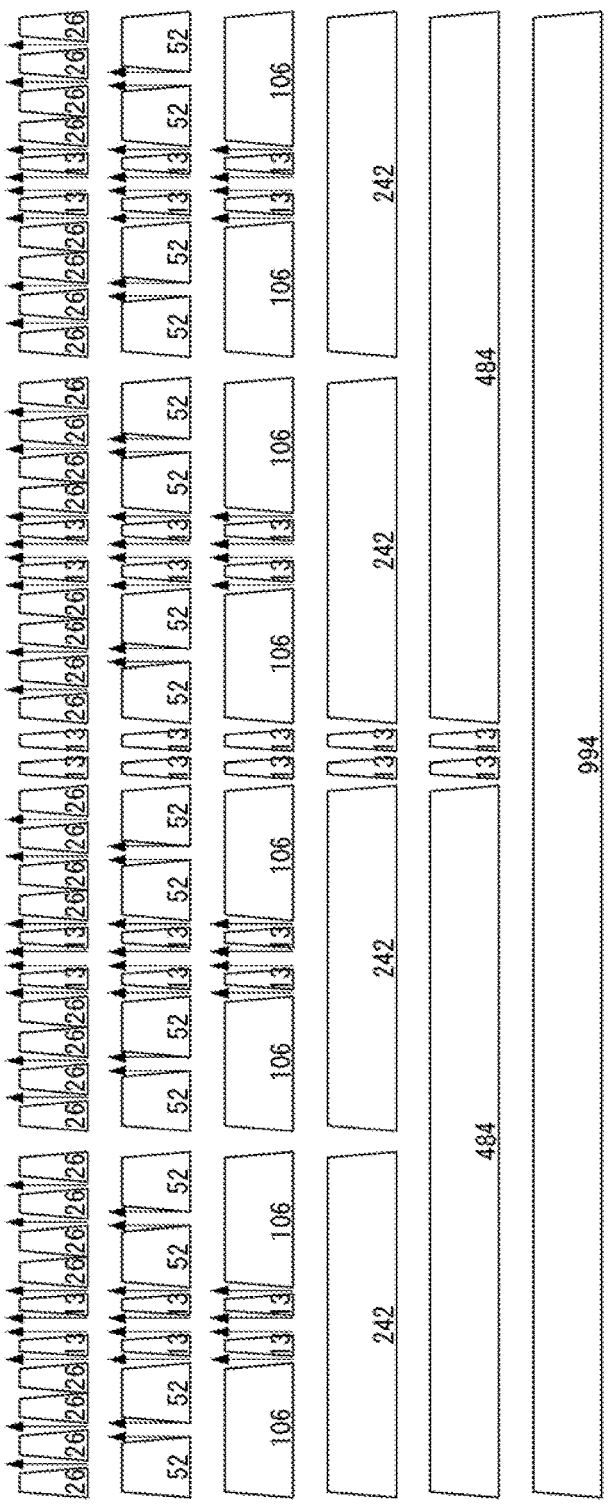

| 4.77 | 3.75 | 2.22 | 4.77 | 2.48 | 4.77 | 2.22 | 2.22 | 2.22 | 2.22 | 4.77 | 4.77 | 3.75 | 2.22 | 4.77 |
|------|------|------|------|------|------|------|------|------|------|------|------|------|------|------|
| 4.59 | 4.59 | 2.22 | 4.77 | 2.48 | 3.51 | 5.53 | 5.11 | 2.22 | 2.22 | 4.30 | 4.90 | 4.90 | 3.51 |
| 3.02 | 3.02 | | | 2.48 | 4.52 | 4.99 | 5.11 | 2.22 | 4.52 | 4.52 | | | |
| | | | | 4.55 | | | 5.18 | | | | | | |
| | | | | | | 5.08 | | | | | | | |

(b)

| 4.77 | 2.22 | 3.75 | 4.77 | 2.22 | 4.77 | 2.22 | 2.48 | 2.22 | 2.22 | 4.77 | 4.77 | 2.22 | 3.75 | 4.77 |
|------|------|------|------|------|------|------|------|------|------|------|------|------|------|------|
| 3.51 | 4.90 | 3.75 | 4.90 | 2.22 | 5.11 | 5.53 | 2.48 | 3.51 | 4.59 | 4.59 | |
| 4.52 | 4.52 | | 4.99 | 4.99 | 4.30 | 2.48 | 4.52 | 3.02 | |
| | | 5.18 | | | | 4.55 | | | |
| | | | | | 5.08 | | | | |

[Fig. 50]
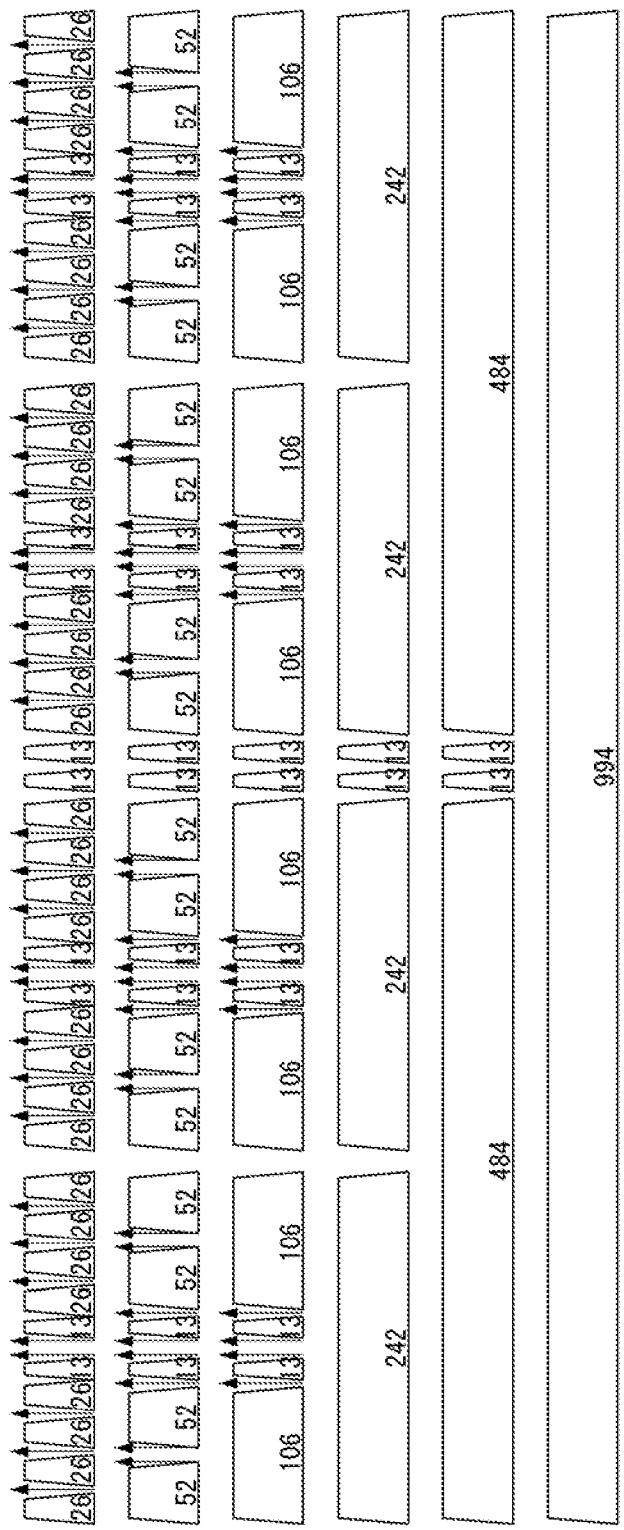

| 4.77 | 3.75 | 2.22 | 4.77 | 2.48 | 4.77 | 2.22 | 2.22 | 4.77 | 2.22 | 2.22 | 2.48 | 2.22 | 4.77 | 3.75 | 2.22 | 4.77 |
|---|---|---|---|---|---|---|---|---|---|---|---|---|---|---|---|---|
| 4.59 | | 3.02 | 4.59 | 2.48 | 3.51 | 4.30 | 5.53 | 2.22 | 2.22 | 5.11 | 2.48 | 2.22 | 4.90 | | 3.51 | |
| | | | | 4.55 | | 4.52 | 4.99 | | 2.22 | | 4.52 | | | | | |
| | | | | | | | | 5.18 | | | | | | | | |
| | | | | | | | 5.08 | | | | | | | | | |

(b)

| 4.77 | 2.22 | 3.75 | 4.77 | 2.48 | 4.77 | 2.22 | 2.22 | 4.77 | 2.22 | 2.22 | 2.48 | 2.22 | 4.77 | 2.22 | 3.75 | 4.77 |
|---|---|---|---|---|---|---|---|---|---|---|---|---|---|---|---|---|
| 3.51 | | 4.90 | | 2.48 | 5.11 | 5.53 | 4.30 | 2.22 | 2.22 | 3.51 | 2.48 | 2.48 | 4.59 | | 4.59 | |
| | | 4.52 | | | | 4.99 | | | 5.18 | | 4.52 | | 4.55 | | 3.02 | |
| | | | | | | | | 5.08 | | | | | | | | |

[Fig. 52]
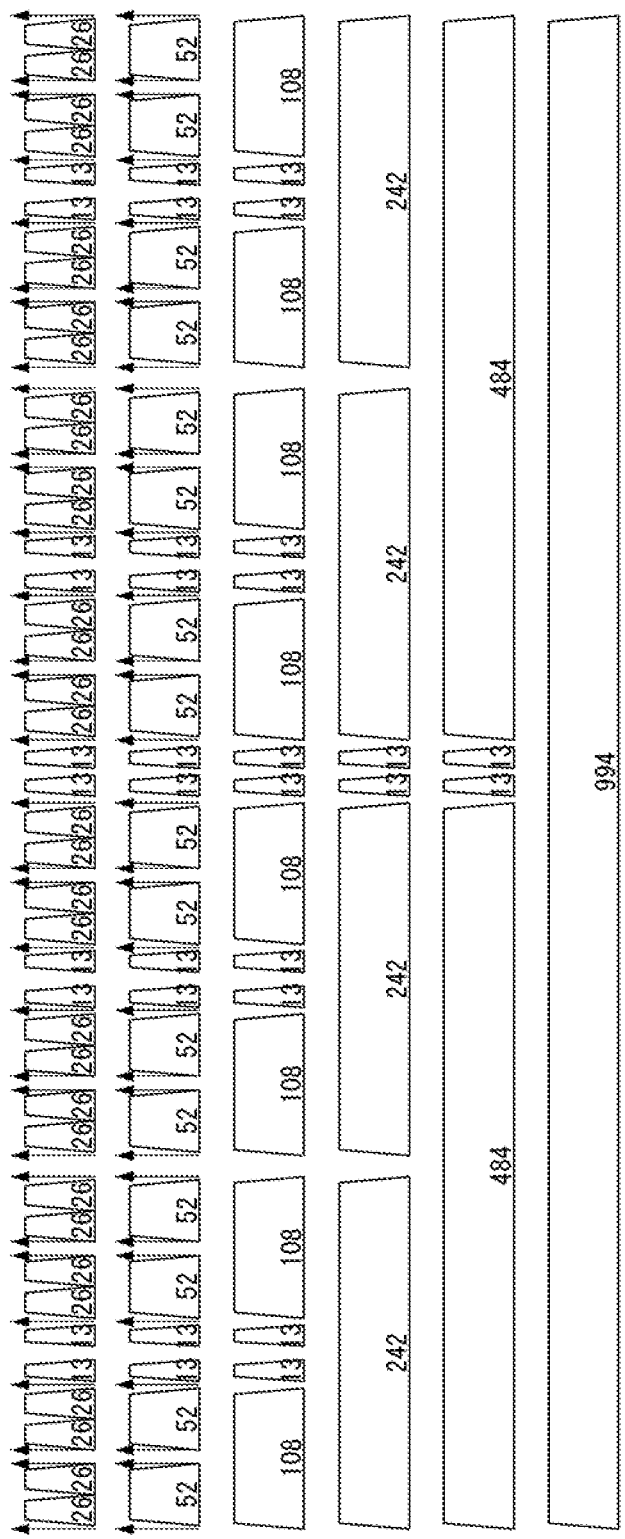

[Fig. 54]
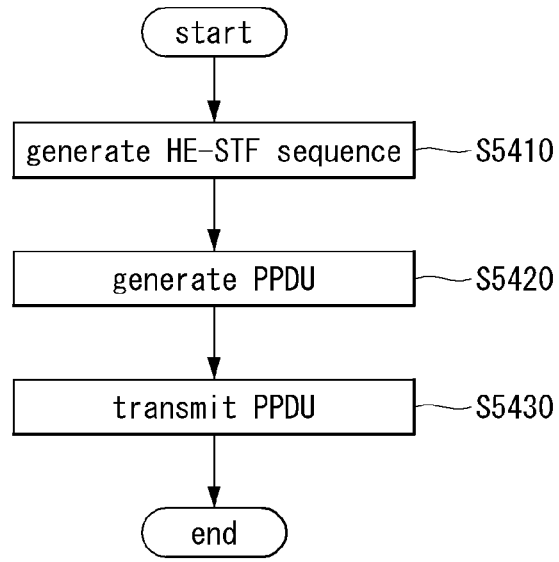
[Fig. 55]
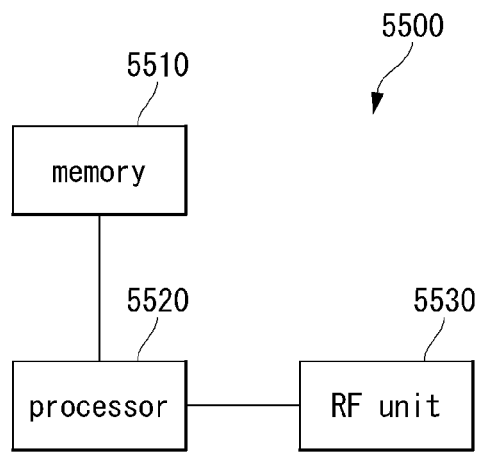

TRANSMISSION/RECEPTION APPARATUS AND METHOD FOR WIRELESS COMMUNICATION SYSTEM

CROSS-REFERENCE TO RELATED APPLICATIONS

This application is the National Phase of PCT International Application No. PCT/KR2016/002514, filed on Mar. 14, 2016, which claims priority under 35 U.S.C. 119(e) to U.S. Provisional Application No. 62/133,971, filed on Mar. 16, 2015, 62/136,618, filed on Mar. 22, 2015, 62/195,765 filed on Jul. 22, 2015 and 62/201,567 filed on Aug. 5, 2015, all of which are hereby expressly incorporated by reference into the present application.

BACKGROUND OF THE INVENTION

Technical Field

The present invention relates to a wireless communication system and, more particularly, to a method for transmitting and receiving a physical protocol data unit (PPDU) of a single user (SU) or multiple users (MU), and a device supporting the same.

Background Art

Wi-Fi is a wireless local area network (WLAN) technology which enables a device to access the Internet in a frequency band of 2.4 GHz, 5 GHz or 6 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN study group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

SUMMARY OF THE INVENTION

A next-generation WLAN system defines a new PPDU format, and thus, a high-efficiency short training field (HE-STF) used for enhancing automatic gain control (AGC) estimation performance, or the like, is required to be defined.

An aspect of the present invention provides a method for generating an HE-STF frequency domain sequence.

Another aspect of the present invention provides a method for transmitting and receiving a PPDU including an HE-STF field.

Technical subjects obtainable from the present invention are non-limited by the above-mentioned technical task. And, other unmentioned technical tasks can be clearly understood from the following description by those having ordinary skill in the technical field to which the present invention pertains.

According to an aspect of the present invention, there are provided a STA device of a WLAN system and a method for transmitting data of an STA device.

In an aspect, a method for transmitting a physical protocol data unit (PPDU) of an STA device in a WLAN system includes: generating a high efficiency-short training field (HE-STF) sequence; generating a PPDU configured on the basis of the HE-STF sequence and including an HE-STF field having periodicity of 1.6 µs; and transmitting the PPDU such that the HE-STF field included in the PPDU is transmitted via a channel, wherein the HE-STF sequence is configured on the basis of an M sequence, and when the channel is a 20 MHz channel, the HE-STF sequence may be configured to have a structure of {the M Sequence, 0, 0, 0, 0, 0, 0, 0, the M sequence}, when the channel is a 40 MHz channel, the HE-STF sequence may be configured on the basis of a structure in which the HE-STF sequence of the 20

MHz channel is duplicated twice and frequency-shifted, and when the channel is a 80 MHz channel, the HE-STF sequence may be configured on the basis of a structure in which the HE-STF sequence of the 40 MHz channel is duplicated twice and frequency-shifted.

When the channel is the 40 MHz channel, the HE-STF sequence may be configured on the basis of a structure of {the HE-STF sequence of the 20 MHz channel, 0, 0, 0, 0, 0, 0, 0, the HE-STF sequence of the 20 MHz}, and when the channel is the 80 MHz channel, the HE-STF sequence may be configured on the basis of a structure of {the HE-STF sequence of the 40 MHz channel, 0, 0, 0, 0, 0, 0, 0, the HE-STF sequence of the 40 MHz channel}.

The HE-STF sequence of the 40 MHz channel may be configured to have a structure of {the M sequence, 0, 0, 0, a1, 0, 0, 0, the M sequence, 0, 0, 0, 0, 0, 0, 0, the M sequence, 0, 0, 0, a2, 0, 0, 0, the M sequence}, the HE-STF sequence of the 80 MHz channel may be configured to have a structure of {the M sequence, 0, 0, 0, a3, 0, 0, 0, the M sequence, 0, 0, 0, a4, 0, 0, 0, the M sequence, 0, 0, 0, a5, 0, 0, 0, the M sequence, 0, 0, 0, 0, 0, 0, 0, the M sequence, 0, 0, 0, a6, 0, 0, 0, the M sequence, 0, 0, 0, a7, 0, 0, 0, the M sequence, 0, 0, 0, a8, 0, 0, 0, the M sequence}, and any one predefined value among 1, −1, j, and −j may be multiplied to each of the M sequences.

Any one predefined value among $\sqrt{½}(1+j)$, $\sqrt{½}(1-j)$, $\sqrt{½}(-1+j)$, $\sqrt{½}(-1-j)$ may be allocated to each of a1 to a8.

The HE-STF sequence may be mapped to data tones excluding a direct current (DC) tone and a guard tone of each channel, and a non-zero value may be mapped to all the data tones having tone indices, a multiple of 8.

The M sequence may be configured as $\sqrt{½}\{-1-j, 0, 0, 0, 1+j, 0, 0, 0, -1-j, 0, 0, 0, 1+j, 0, 0, 0, -1-j, 0, 0, 0, -1-j, 0, 0, 0, 1+j, 0, 0, 0, 1+j, 0, 0, 0, -1-j, 0, 0, 0, -1-j, 0, 0, 0, 1+j, 0, 0, 0, 1+j, 0, 0, 0, 1+j, 0, 0, 0, 1+j\}$.

In another aspect, a station (STA) device of a wireless LAN (WLAN) system includes: a radio frequency (RF) unit transmitting and receiving a wireless signal; and a processor controlling the RF unit, wherein the processor generates a high efficiency-short training field (HE-STF) sequence, generates a physical protocol data unit (PPDU) configured on the basis of the HE-STF sequence and including an HE-STF field having periodicity of 1.6 μs, and transmits the PPDU such that the HE-STF field included in the PPDU is transmitted via a channel, wherein the HE-STF sequence is configured on the basis of an M sequence, and when the channel is a 20 MHz channel, the HE-STF sequence may be configured to have a structure of {the M Sequence, 0, 0, 0, 0, 0, 0, 0, the M sequence}, when the channel is a 40 MHz channel, the HE-STF sequence may be configured on the basis of a structure in which the HE-STF sequence of the 20 MHz channel is duplicated twice and frequency-shifted, and when the channel is a 80 MHz channel, the HE-STF sequence may be configured on the basis of a structure in which the HE-STF sequence of the 40 MHz channel is duplicated twice and frequency-shifted.

When the channel is the 40 MHz channel, the HE-STF sequence may be configured on the basis of a structure of {the HE-STF sequence of the 20 MHz channel, 0, 0, 0, 0, 0, 0, the HE-STF sequence of the 20 MHz}, and when the channel is the 80 MHz channel, the HE-STF sequence may be configured on the basis of a structure of {the HE-STF sequence of the 40 MHz channel, 0, 0, 0, 0, 0, 0, 0, the HE-STF sequence of the 40 MHz channel}.

The HE-STF sequence of the 40 MHz channel may be configured to have a structure of {the M sequence, 0, 0, 0, a1, 0, 0, 0, the M sequence, 0, 0, 0, 0, 0, 0, 0, the M sequence, 0, 0, 0, a2, 0, 0, 0, the M sequence}, the HE-STF sequence of the 80 MHz channel may be configured to have a structure of {the M sequence, 0, 0, 0, a3, 0, 0, 0, the M sequence, 0, 0, 0, a4, 0, 0, 0, the M sequence, 0, 0, 0, a5, 0, 0, 0, the M sequence, 0, 0, 0, 0, 0, 0, 0, the M sequence, 0, 0, 0, a6, 0, 0, 0, the M sequence, 0, 0, 0, a7, 0, 0, 0, the M sequence, 0, 0, 0, a8, 0, 0, 0, the M sequence}, and any one predefined value among 1, −1, j, and −j may be multiplied to each of the M sequences.

Any one predefined value among $\sqrt{½}(1+j)$, $\sqrt{½}(1-j)$, $\sqrt{½}(-1+j)$, and $\sqrt{½}(-1-j)$ may be allocated to each of a1 to a8.

The HE-STF sequence may be mapped to data tones excluding a direct current (DC) tone and a guard tone of each channel, and a non-zero value may be mapped to all the data tones having tone indices, a multiple of 8.

The M sequence may be configured as $\sqrt{½}\{-1-j, 0, 0, 0, 1+j, 0, 0, 0, -1-j, 0, 0, 0, 1+j, 0, 0, 0, -1-j, 0, 0, 0, -1-j, 0, 0, 0, 1+j, 0, 0, 0, 1+j, 0, 0, 0, -1-j, 0, 0, 0, -1-j, 0, 0, 0, 1+j, 0, 0, 0, 1+j, 0, 0, 0, 1+j, 0, 0, 0, 1+j\}$.

The aforementioned embodiments may be selectively applied or combined to be applied according to effects and objects.

According to an embodiment of the present invention, a peak-to-power average ratio (PAPR) regarding an HE-STF field may be minimized.

Also, according to an embodiment of the present invention, a PPDU including an HE-STF field configured on the basis of an HE-STF sequence may be smoothly transmitted and received by a transceiver unit.

Advantages and effects of the present invention that may be obtained in the present invention are not limited to the foregoing effects and any other technical effects not mentioned herein may be easily understood by a person skilled in the art from the present disclosure and accompanying drawings.

BRIEF DESCRIPTION OF THE DRAWINGS

FIG. 1 is a diagram showing an example of an IEEE 802.11 system to which the present invention may be applied;

FIG. 2 is a diagram illustrating the structure of a layer architecture of an IEEE 802.11 system to which the present invention may be applied;

FIG. 3 illustrates a non-HT format PPDU and an HT format PPDU in a wireless communication system to which the present invention may be applied;

FIG. 4 illustrates a VHT format PPDU in a wireless communication system to which the present invention may be applied;

FIG. 5 illustrates constellation diagrams for classifying a PPDU format in a wireless communication system to which the present invention may be applied;

FIG. 6 illustrates a MAC frame format in an IEEE 802.11 system to which the present invention may be applied;

FIG. 7 is a diagram illustrating the frame control field in the MAC frame in a wireless communication system to which the present invention may be applied;

FIG. 8 illustrates an HT format of an HT control field in the MAC frame of FIG. 6;

FIG. 9 illustrates a VHT format of an HT control field in a wireless communication system to which the present invention may be applied;

FIG. 10 illustrates a high efficiency (HE) format PPDU according to an embodiment of the present invention;

FIG. 11 illustrates an HE format PPDU according to an embodiment of the present invention;

FIG. 12 illustrates an HE format PPDU according to an embodiment of the present invention;

FIG. 13 illustrates an HE format PPDU according to an embodiment of the present invention;

FIG. 14 illustrates a structure of 1× HE-STF sequence by PPDU transmission channels according to an embodiment of the present invention;

FIG. 15 illustrates a structure of 2× HE-STF sequence by PPDU transmission channels according to an embodiment of the present invention;

FIGS. 16 to 25 illustrate various tone plans of a 20 MHz channel and tables of PAPR values measured by tone plans according to an embodiment of the present invention;

FIGS. 26 to 35 illustrate various tone plans of a 40 MHz channel and tables of PAPR values measured by tone plans according to an embodiment of the present invention;

FIGS. 36 to 53 illustrate various tone plans of a 80 MHz channel and tables of PAPR values measured by tone plans according to an embodiment of the present invention;

FIG. 54 is a flow chart illustrating a method for transmitting a PPDU by an STA device according to an embodiment of the present invention; and FIG. 55 is a block diagram of each STA device according to an embodiment of the present invention.

DETAILED DESCRIPTION OF THE EMBODIMENTS

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details In some instances, known structures and devices are omitted or are shown in block diagram form, focusing on important features of the structures and devices, so as not to obscure the concept of the invention.

It should be noted that specific terms used in the description below are intended to provide better understanding of the present invention, and these specific terms may be changed to other forms within the technical spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 system is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is a device operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to a device directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the structure of a layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU includes a legacy format preamble including L-STF (Legacy (or Non-HT) Short Training field), L-LTF (Legacy (or Non-HT) Long Training field), and L-SIG (Legacy (or Non-HT) SIGNAL) and a data field.

The L-STF may include a short training orthogonal frequency division multiplexing symbol (OFDM) symbol. The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to transmit control information for demodulation and decoding of a data field. The L-SIG field may include information regarding a data rate and a data length.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4 illustrates a VHT format PPDU for supporting an IEEE 802.11ac system.

Referring to FIG. 4, the VHT format PPDU includes a legacy preamble including L-STF, L-LTF, and L-SIG fields, a VHT format preamble including a VHT-SIG-A (VHT-Signal-A) field, a VHT-STF (VHT Short Training Field), a VHT-LTF (VHT Long Training Field), and a VHT-SIG-B (VHT-Signal-B), and a data field.

Since the L-STF, the L-LTF, and the L-SIG are legacy fields for backward compatibility, these fields are the same with a non-HT format. However, the L-LTF may further include information for channel estimation to be performed to demodulate the L-SIG field and the VHT-SIG-A field.

The L-STF, L-LTF, and L-SIG fields and the VHT-SIG-A field may be repeatedly transmitted in units of 20 MHz channels. For example, when a PPDU is transmitted through four 20 MHz-channels (e.g., 80 MHz bandwidth), the L-STF, L-LTF, and L-SIG fields and the VHT-SIG-A field may be repeatedly transmitted in each 20 MHz channel.

A VHT-STA may recognize the VHT format PPDU using the VHT-SIG-A field following the legacy field, and decode the data field on the basis of this.

In order to allow an L-STA to receive the VHT format PPDU to obtain data, the L-STF, L-LTF, and L-SIG fields are first transmitted. Thereafter, the VHT-SIG-A field is transmitted for demodulating and decoding data transmitted for the VHT-STA.

The VHT-SIG-A field, a field for transmitting control information common to VHT STAs MIMO-paired with an AP, may include control information for interpreting the received VHT format PPDU.

The VHT-SIG-A field may include a VHT-SIG-A1 field and a VHT-SIG-A2 field.

The VHT-SIG-A1 field may include information of a channel bandwidth (BW) in use, information regarding whether space time block coding (STBC) is applied, a group identifier (ID) indicating a group of stations (STAs) grouped in MU-MIMO, information regarding the number of space-time streams (NSTS) in use/partial association identifiers (AIDs), and transmit power save forbidden information. Here, the group ID refers to an identifier allocated to a transmission target STA group to support MU-MIMO transmission and may indicate whether a currently used MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information required for a plurality of MU-MIMO paired VHT-STAs to receive a PPDU to obtain data. Thus, the VHT-STA may be designed to decode a VHT-SIG-B only when common control information included in the VHT-SIG-A field indicates that the currently received PPDU indicates MU-MIMO transmission. Meanwhile, the STA may be designed not to decode the VHT-SIG-B field in cases where the common control information indicates that the currently received PPDU is for a single VHT-STA (including SU-MIMO).

The VHT-SIG-B field may include information regarding modulation, encoding, and rate matching of each VHT-STA. A size of the VHT-SIG-B field may be varied depending on a type of MIMO transmission (MU-MIMO or SU-MIMO) and a channel bandwidth used for PPDU transmission.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This will be described in more detail below with reference to the drawings.

FIG. 5 illustrates constellation diagrams for classifying a PPDU format in a wireless communication system to which the present invention may be applied.

(a) of FIG. 5 illustrates a constellation for the L-SIG field included in the non-HT format PPDU, (b) of FIG. 5 illustrates a phase rotation for HT-mixed format PPDU detection, and (c) of FIG. 5 illustrates a phase rotation for VHT format PPDU detection.

In order for an STA to classify a PPDU as a non-HT format PPDU, HT-GF format PPDU, HT-mixed format PPDU, or VHT format PPDU, the phases of constellations of the L-SIG field and of the OFDM symbols, which are transmitted following the L-SIG field, are used. That is, the STA may classify a PDDU format based on the phases of constellations of the L-SIG field of a received PPDU and/or of the OFDM symbols, which are transmitted following the L-SIG field.

Referring to (a) of FIG. 5, the OFDM symbols of the L-SIG field use BPSK (Binary Phase Shift Keying).

To begin with, in order to classify a PPDU as an HT-GF format PPDU, the STA, upon detecting a first SIG field from a received PPDU, determines whether this first SIG field is an L-SIG field or not. That is, the STA attempts to perform decoding based on the constellation illustrated in (a) of FIG. 5. If the STA fails in decoding, the corresponding PPDU may be classified as the HT-GF format PPDU.

Next, in order to distinguish the non-HT format PPDU, HT-mixed format PPDU, and VHT format PPDU, the phases of constellations of the OFDM symbols transmitted following the L-SIG field may be used. That is, the method of modulation of the OFDM symbols transmitted following the L-SIG field may vary, and the STA may classify a PPDU format based on the method of modulation of fields coming after the L-SIG field of the received PPDU.

Referring to (b) of FIG. 5, in order to classify a PPDU as an HT-mixed format PPDU, the phases of two OFDM symbols transmitted following the L-SIG field in the HT-mixed format PPDU may be used.

More specifically, both the phases of OFDM symbols #1 and #2 corresponding to the HT-SIG field, which is transmitted following the L-SIG field, in the HT-mixed format PPDU are rotated counterclockwise by 90 degrees. That is, the OFDM symbols #1 and #2 are modulated by QBPSK (Quadrature Binary Phase Shift Keying). The QBPSK constellation may be a constellation which is rotated counterclockwise by 90 degrees based on the BPSK constellation.

An STA attempts to decode the first and second OFDM symbols corresponding to the HT-SIG field transmitted after the L-SIG field of the received PDU, based on the constellations illustrated in (b) of FIG. 5. If the STA succeeds in decoding, the corresponding PPDU may be classified as an HT format PPDU.

Next, in order to distinguish the non-HT format PPDU and the VHT format PPDU, the phases of constellations of the OFDM symbols transmitted following the L-SIG field may be used.

Referring to (c) of FIG. 5, in order to classify a PPDU as a VHT format PPDU, the phases of two OFDM symbols transmitted after the L-SIG field may be used in the VHT format PPDU.

More specifically, the phase of the OFDM symbol #1 corresponding to the VHT-SIG-A coming after the L-SIG field in the HT format PPDU is not rotated, but the phase of the OFDM symbol #2 is rotated counterclockwise by 90 degrees. That is, the OFDM symbol #1 is modulated by BPSK, and the OFDM symbol #2 is modulated by QBPSK.

The STA attempts to decode the first and second OFDM symbols corresponding to the VHT-SIG field transmitted following the L-SIG field of the received PDU, based on the constellations illustrated in (c) of FIG. 5. If the STA succeeds in decoding, the corresponding PPDU may be classified as a VHT format PPDU.

On the contrary, If the STA fails in decoding, the corresponding PPDU may be classified as a non-HT format PPDU.

MAC Frame Format

FIG. 6 illustrates a MAC frame format in an IEEE 802.11 system to which the present invention may be applied.

Referring to FIG. 6, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field contains information on the characteristics of the MAC frame. A more detailed description of the frame control field will be given later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 7 is a diagram illustrating the frame control field in the MAC frame in a wireless communication system to which the present invention may be applied.

Referring to FIG. 7, the frame control field includes a Protocol Version subfield, a Type subfield, a Subtype subfield, a to DS subfield, a From DS subfield, a More Fragments subfield, a Retry subfield, a Power Management subfield, a More Data subfield, a Protected Frame subfield, and an Order subfield.

The protocol version subfield may indicate the version of a WLAN protocol applied to the MAC frame.

The type subfield and the subtype subfield may be configured to indicate information for identifying the function of the MAC frame.

The MAC frame may include three frame types: Management frames, Control frames, and Data frames.

Each frame type may be subdivided into subtypes.

For example, the Control frames may include an RTS (request-to-send) frame, a CTS (clear-to-send) frame, an ACK (Acknowledgement) frame, a PS-Poll frame, a CF (contention free)-End frame, a CF-End+CF-ACK frame, a BAR (Block Acknowledgement request) frame, a BA (Block Acknowledgement) frame, a Control Wrapper (Control+HTcontrol) frame, a VHT NDPA (Null Data Packet Announcement) frame, and a Beamforming Report Poll frame.

The Management frames may include a Beacon frame, an ATIM (Announcement Traffic Indication Message) frame, a Disassociation frame, an Association Request/Response frame, a Reassociation Request/Response frame, a Probe Request/Response frame, an Authentication frame, a Deauthentication frame, an Action frame, an Action No ACK frame, and a Timing Advertisement frame.

The To Ds subfield and the From DS subfield may contain information required to interpret the Address 1 field through Address 4 field included in the MAC frame header. For a Control frame, the To DS subfield and the From DS subfield may all set to '0'. For a Management frame, the To DS subfield and the From DS subfield may be set to '1' and '0', respectively, if the corresponding frame is a QoS Management frame (QMF); otherwise, the To DS subfield and the From DS subfield all may be set to '0'.

The More Fragments subfield may indicate whether there is a fragment to be sent subsequent to the MAC frame. If there is another fragment of the current MSDU or MMPDU, the More Fragments subfield may be set to '1'; otherwise, it may be set to '0'.

The Retry subfield may indicate whether the MAC frame is the previous MAC frame that is re-transmitted. If the MAC frame is the previous MAC frame that is re-transmitted, the Retry subfield may be set to '1'; otherwise, it may be set to '0'.

The Power Management subfield may indicate the power management mode of the STA. If the Power Management subfield has a value of '1', this may indicate that the STA switches to power save mode.

The More Data subfield may indicate whether there is a MAC frame to be additionally sent. If there is a MAC frame to be additionally sent, the More Data subfield may be set to '1'; otherwise, it may be set to '0'.

The Protected Frame subfield may indicate whether a Frame Body field is encrypted or not. If the Frame Body field contains information that is processed by a cryptographic encapsulation algorithm, it may be set to '1'; otherwise '0'.

Information contained in the above-described fields may be as defined in the IEEE 802.11 system. Also, the above-described fields are examples of the fields that may be included in the MAC frame but not limited to them. That is, the above-described fields may be substituted with other fields or further include additional fields, and not all of the fields may be necessarily included.

FIG. 8 illustrates an HT format of an HT control field in the MAC frame of FIG. 6.

Referring to FIG. 8, the HT control field may include a VHT subfield, an HT control middle subfield, an AC constraint subfield, and a reverse direction grant (RDG)/more PPDU subfield.

The VHT subfield indicates whether the HT control field has a format of the HT control field for VHT (VHT=1) or whether the HT control field has a format of the HT control field for HT (VHT=0). In FIG. 8, the HT control field for HT (i.e., VHT=0) is assumed.

The HT control middle subfield may be implemented to have a different format according to an indication of the VHT subfield. Details of the HT control middle subfield will be described hereinafter.

The AC constraint subfield indicates whether a mapped access category (AC) of reverse directional (RD) data frame is limited to a single AC.

The RDG/more PPDU subfield may be interpreted to be different according to whether the corresponding field is transmitted by an RD initiator or an RD responder.

In cases where the RDG/more PPDU subfield is transmitted by the RD initiator, if RDG is present, the RDG/more PPDU subfield is set to "1", and if the RDG is not present, the RDG/more PPDU subfield is set to "0". In cases where the RDG/more PPDU subfield is transmitted by the RD responder, if a PPDU including the corresponding subfield is a final frame transmitted by the RD responder, the RDG/more PPDU subfield is set to "1", and if another PPDU is transmitted, the RDG/more PPDU subfield is set to "0".

The HT control middle subfield of the HT control field for HT may include a link adaptation subfield, a calibration position subfield, a calibration sequence subfield, a reserved subfield, a channel state information (CSI)/steering subfield, an HT null data packet (NDP) announcement subfield, and a reserved subfield.

The link adaptation subfield may include a training request (TRQ) subfield, a modulation and coding scheme (MCS) request or antenna selection (ASEL) indication (MAI) subfield, an MCS feedback sequence identifier (MFSI) subfield, and an MCS feedback and antenna selection command/data (MFB/ASELC) subfield.

The TRQ subfield is set to 1 when requesting transmission of a sounding PPDU to the responder, and set to 0 when not requesting transmission of the sounding PPDU to the responder.

When the MAI subfield is set to 14, it indicates an antenna selection (ASEL) indication and the MFB/ASELC subfield is interpreted as an antenna selection command/data. Otherwise, the MAI subfield indicates an MCS request and the MFB/ASELC subfield is interpreted as MCS feedback.

In cases where the MAI subfield indicates an MCS request (MRQ), the MAI subfield includes an MRQ (MCS request) and an MSI (MRQ sequence identifier). The MRQ subfield is set to "1" when MCS feedback is requested, and set to "0", when the MCS feedback is not requested. When the MRQ subfield is "1", the MSI subfield includes a sequence number for specifying an MCS feedback request. When the MRQ subfield is "0", the MSI subfield is set with a reserved bit.

The aforementioned subfields are examples of subfields which may be included in the HT control field, and may be replaced with any other subfields or may further include an additional subfield.

FIG. 9 illustrates a VHT format of an HT control field in a wireless communication system to which the present invention may be applied.

Referring to FIG. 9, the HT control field may include a VHT subfield, an HT control middle subfield, an AC constraint subfield, and a reversed direction grant (RDG)/more PPDU subfield.

In FIG. 9, an HT control field for VHT (i.e., VHT=1) will be assumed. The HT control field for VHT may be referred to as a VHT control field.

Descriptions of the AC constraint subfield and the RDG/more PPDU subfield are the same as those of FIG. 8, and thus, the redundant descriptions will be omitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

High Efficiency (HE) System

Hereinafter, a next-generation WLAN system will be described. The next-generation WLAN system is a next-generation Wi-Fi system, and IEEE 802.11ax may be described as an example of the next-generation Wi-Fi system. In this disclosure, the next-general WLAN system will be referred to as a high efficiency (HE) system and a frame, a PPDU, and the like, of the system may be referred to as an HE frame, an HE PPDU, an HE-SIG field, an HE-STF, and HE-LTF, and the like.

To contents of the HE system not additionally described hereinafter, descriptions of the existing WLAN system such as the aforementioned VHT system may be applied. For example, descriptions of the VHT-SIG A field and VHT-STF, VHT-LTF, and HE-SIG-B fields described above may be applied to an HE-SIG A field and HE-STF, HE-LTF, and HE-SIG-B fields. An HE frame, a preamble, and the like, of the HE system may also be used in any other wireless communication or cellular system. An HE STA may be a non-AP STA or an AP-STA as described above. In this disclosure, an STA may also represent an HE STA device.

In the HE system, the HE format PPDU may include a legacy part (L-part), an HE part, and an HE data field. Hereinafter, the HE format PPDU will be described in detail with reference to the accompanying drawings.

FIG. 10 illustrates an HE format PPDU according to an embodiment of the present invention.

Referring to FIG. 10, the HE format PPDU for HEW may include a legacy part (L-part) and an HE-part.

The L-part includes an L-STF field, an L-LTF field, and an L-SIG field, like the form maintained in the existing WLAN system. The L-STF field, the L-LTF field, and the L-SIG field may be called a legacy preamble.

The HE-part, newly defined for 802.11ax standard, may include an HE-SIG field, an HE-preamble, and data (HE-data). Also, the HE-preamble may include an HE-STF field and an HE-LTF field. Also, the HE-SIG field, as well as the HE-STF field and the HE-LTF field, may generally be called an HE-preamble.

In FIG. 10, the order of the HE-SIG field, the HE-STF field, and the HE-LTF field is illustrated, but the fields may be configured in order different thereto.

The L-part, the HE-SIG field, and the HE-preamble may generally be called a physical (PHY) preamble.

The HE-SIG field may include information (e.g., OFDMA, UL MU MIMO, enhanced MCS, etc.) for decoding the HE-data field.

The L-part and the HE-part (in particular, HE-preamble and HE-data) may have different FFT (Fast Fourier Transform) sizes and may use different CPs (Cyclic Prefix). That is, the L-part and the HE-part (in particular, HE-preamble and HE-data) may be defined to be different in subcarrier frequency spacing.

The 802.11ax system may use an FFT size four times greater (4×FFT) than the legacy WLAN system. That is, the L-part may have a 1× symbol structure and the HE-part (in particular HE-preamble and HE-data) may have a 4× symbol structure. Here, 1×, 2×, and 4×-sized FFT refer to relative sizes regarding the legacy WLAN system (e.g., IEEE 802.11a, 802.11n, 802.11ac etc.).

For example, if the sizes of FFT used in the L-part are 64, 128, 256, and 512 in 20 MHz, 40 MHz, 80 MHz, and 160 MHz, respectively, the sizes of FFT used in the HE-part may be 256, 512, 1024, and 2048 in 20 MHz, 40 MHz, 80 MHz, and 160 MHz, respectively.

If an FFT size is larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 160 MHz/512), the subcarrier spacing of the HE-part may be 78.125 kHz (=20 MHz/256, 40 MHz/512, 80 MHz/1024 and/or 160 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 16 μs depending on the GI.

In FIG. 10, a case in which the HE-SIG field is configured to have a 1× symbol structure is illustrated, but the HE-SIG field may also be configured to have a 4× symbol structure like the HE-preamble and the HE-data.

Unlike the example of FIG. 10, the HE-SIG may be divided into an HE-SIG A field and an HE-SIG B field. Here, an FFT size per unit frequency may be further increased from the HE-SIG B. That is, a length of the OFDM symbol may be increased from the HE-SIG B, compared with the L-part.

The HE format PPDU for the WLAN system to which the present invention may be applied may be transmitted through at least one 20 MHz channel. For example, the HE format PPDU may be transmitted in a frequency band of 40 MHz, 80 MHz, or 160 MHz through a total of four 20 MHz channels. This will be described in detail with reference to the accompanying drawings.

FIG. 11 illustrates an HE format PPDU according to an embodiment of the present invention.

In FIG. 11, a PPDU format in cases where 80 MHz is allocated to one STA (or in cases where OFDMA resource unit is allocated to multiple STAs within 80 MHz) or where different stream of 80 MHz is allocated to each of multiple STAs is illustrated.

Referring to FIG. 11, the L-STF, the L-LTF, and the L-SIG may be transmitted in an OFDM symbol generated on the basis of 64 FFT points (or 64 subcarriers) in each 20 MHz channel.

The HE-SIG A field may include common control information commonly transmitted to STAs which receive a PPDU. The HE-SIG A field may be transmitted one to three OFDM symbols. The HE-SIG A field is duplicated in units of 20 MHz to include the same information. Also, the HE-SIG A field provides overall bandwidth information of the system.

Table 1 illustrates information included in the HE-SIG A field.

TABLE 1

| Field | Bit | Description |
| --- | --- | --- |
| Bandwidth | 2 | It indicates bandwidth in which PPDU is transmitted, e.g., 20 MHz, 40 MHz, 80 MHz, or 160 MHz |
| Group ID | 6 | It indicates STA or group of STAs for receiving PPDU |
| Stream information | 12 | It indicates position or number of spatial stream for each STA or indicates position or number of spatial stream for group of STAs |
| UL indication | 1 | It indicates whether PPDU is oriented to AP (uplink) or STA (downlink) |
| MU indication | 1 | It indicates whether PPDU is SU-MIMO PPDU or MU-MIMO PPDU |
| GI indication | 1 | It indicates whether short GI is used or long GI is used |
| Allocation information | 12 | It indicates band or channel (subchannel index or subband index) allocated to each STA in band in which PPDU is transmitted |
| Transmission power | 12 | It indicates transmission power for each channel or each STA |

Information included in each field illustrated in Table 1 may follow a definition of the IEEE 802.11 system. Also, the respective fields described above are an example of fields which may be included in a PPDU and are not limited thereto. That is, the respective fields described above may be replaced by any other fields or include an additional field, or every field may not be essentially included.

The HE-SIG B field may include user-specific information required for each STA to receive data thereof (e.g., a PSDU). The HE-SIG B field may be transmitted on one or two OFDM symbols. For example, the HE-SIG B field may include information regarding modulation and coding scheme (MCS) of the corresponding PSDU and a length of the corresponding PSDU.

The L-STF, L-LTF, L-SIG, and HE-SIG A fields may be repeatedly transmitted in units of 20 MHz channels. For example, when a PPDU is transmitted through four 20 MHz channels (i.e., 80 MHz band), the L-STF, L-LTF, L-SIG, and HE-SIG A fields may be repeatedly transmitted in each of the 20 MHz channels.

When an FFT size is increased, a legacy STA supporting an existing IEEE 802.11a/g/n/ac may not be able to decode the corresponding HE PPDU. In order for the legacy STA and the HE STA to coexist, the L-STF, L-LTF, and L-SIG fields may be transmitted through 64 FFT in a 20 MHz channel. For example, the L-SIG field may occupy one OFDM symbol, one OFDM symbol duration is 4 µs, and the GI may be 0.8 µs.

The HE-STF is used to improve performance of AGC estimation in MIMO transmission. An FFT size of each frequency unit may be further increased from the HE-STF. For example, 256 FFT may be used in a 20 MHz channel, 512 FFT may be used in a 40 MHz channel, and 1024 FFT may be used in a 80 MHz channel. When the FFT size is increased, a space between OFDM subcarriers is reduced, and thus, the number of OFDM subcarriers per unit frequency may be increased, but an OFDM symbol duration is lengthened. In order to enhance system efficiency, a length of the GI from the HE-STF may be set to be equal to a length of the GI of the HE-SIG A.

The HE-SIG A field may include information required for the HE STA to decode an HE PPDU. However, the HE-SIG A field may be transmitted through 64 FFT in a 20 MHz channel so that the legacy STA and the HE STA may receive the HE-SIG A field. This is to allow the HE STA to receive the existing HT/VHT format PPDU, as well as the HE format PPDU and the legacy STA and the HE STA should distinguish between the HT/VHT format PPDU and the HE format PPDU.

FIG. 12 illustrates an HE format PPDU according to an embodiment of the present invention.

In FIG. 12, a case in which 20 MHz channels are allocated to each of different STAs (e.g., STA 1, STA 2, STA 3, and STA 4) is assumed.

Referring to FIG. 12, an FFT size per unit frequency may be further increased from HE-STF (or HE-SIG B). For example, from the HE-STF (or HE-SIG B), 256 FFT may be used in a 20 MHz channel, 512 FFT may be used in a 40 MHz channel, and 1024 FFT may be used in a 80 MHz channel.

Information transmitted in each field included in the PPDU is the same as that of the example of FIG. 11, and thus, descriptions thereof will be omitted.

The HE-SIG B field may include information specific to each STA but may be encoded in the entire band (i.e., indicated in the HE-SIG A field). That is, the HE-SIG B field includes information regarding every STA and is received by every STA.

The HE-SIG B field may provide frequency bandwidth information allocated to each STA and/or stream information in a corresponding frequency band. For example, in FIG. 12, in the HE-SIG B, a 20 MHz may be allocated to STA 1, next 20 MHz may be allocated to STA 2, next 20 MHz may be allocated to STA 3, and next 20 MHz may be allocated to STA 4. Also, 40 MHz may be allocated to STA 1 and STA 2 and next 40 MHz may be allocated to STA 3 and STA 4. In this case, different streams are allocated to STA 1 and STA 2 and different steams may be allocated to STA 3 and STA 4.

Also, an HE-SIG C field may be defined and added to the example of FIG. 12. Here, in the HE-SIG B field, information regarding every STA may be transmitted in the entire band and control information specific to each STA may be transmitted in units of 20 MHz through the HE-SIG C field.

Also, unlike the example of FIGS. 11 and 12, the HE-SIG B field may not be transmitted in the entire band but may be transmitted in units of 20 MHz, like the HE-SIG A field. This will be described with reference to below figure.

FIG. 13 illustrates an HE format PPDU according to an embodiment of the present invention.

In FIG. 13, a case in which 20 MHz channels are allocated to each of different STAs (e.g., STA 1, STA 2, STA 3, and STA 4) is assumed.

Referring to FIG. 13, the HE-SIG B field is not transmitted in the entire band but is transmitted in units of 20 MHz, like the HE-SIG A field. However, unlike the HE-SIG A field, the HE-SIG B field is encoded and transmitted in units of 20 MHz but may not be duplicated and transmitted in units of 20 MHz.

In this case, an FFT size per unit frequency may be further increased from the HE-STF (or the HE-SIG B). For example, starting from the HE-STF (or HE-SIG B), 256 FFT is used in the 20 MHz channel, 512 FFT may be used in the 40 MHz channel, and 1024 FFT may be used in the 80 MHz channel.

Information transmitted in each field included in a PPDU is the same as that of FIG. 11, and thus, descriptions thereof will be omitted.

The HE-SIG A field is duplicated and transmitted in units of 20 MHz.

The HE-SIG B field may provide frequency bandwidth information allocated to each STA and/or stream information in the corresponding frequency band. Since the HE-SIG B field includes information regarding each STA, each HE-SIG B field of 20 MHz unit may include information regarding each STA. Here, in the example of FIG. 13, a case in which 20 MHz is allocated to each STA is illustrated, but, for example, in cases where 40 MHz is allocated to an STA, the HE-SIG B field may be duplicated and transmitted in units of 20 MHz.

In cases where a partial bandwidth with a low interference level from an adjacent BSS is allocated to an STA in a situation in which BSSs support different bandwidths, it may be preferred not to transmit the HE-SIG B field in the entire band.

In FIGS. 10 to 13, the data field may include a service field, a scrambled PSDU, tail bits, and padding bits as payload.

Meanwhile, the HE format PPDU illustrated in FIGS. 10 to 13 may be distinguished through a repeated L-SIG (RL-SIG) field, a repeated symbol of the L-SIG field. The RL-SIG field may be inserted in front of the HE-SIG A field and each STA may identify a format of a PPDU received using the RL-SIG field by an HE format PPDU.

A scheme in which an AP operating in the WLAN system transmits data to multiple STAs on the same time resource may be referred to as downlink multi-user (DL MU) transmission. Conversely, a scheme in which multiple STAs operating in the WLAN system transmit data on the same time resource to the AP may be referred to as uplink multi-user (UL MU) transmission.

The DL MU transmission or UL MU transmission may be multiplexed in a frequency domain or spatial domain.

When the DL MU transmission or UL MU transmission are multiplexed on the frequency domain, different frequency resources (e.g., subcarriers or tones) may be allocated as downlink or uplink resources to each of the multiple STAs on the basis of OFDMA (orthogonal frequency division multiplexing). The transmission scheme through different frequency resources on the same time resource may be referred to as "DL/UL OFDMA transmission".

When the DL MU transmission or UL MU transmission are multiplexed on the spatial domain, different spatial streams may be allocated as DL or UL resources to each of multiple STAs. The transmission scheme through different spatial streams on the same time resource may be referred to as "DL/UL MU MIMO transmission".

HE-STF Sequence

The present invention proposes a method for configuring an HE-STF sequence and a method for transmitting and receiving a PPDU including an HE-STF field configured on the basis of the HE-STF sequence. In particular, the present invention proposes a method for configuring a 2× HE-STF sequence and a method for transmitting and receiving a PPDU including a 2× HE-STF field.

Before describing the present invention, the HT-STF defined in the 802.11n system and the VHT-STF defined in the 802.11ac system will be described.

First, the HT-STF will be described.

The HT-STF is used to enhance AGC estimation performance in the MIMO system. A duration of the HT-STF 4 μs. In a 20 MHz transmission, a frequency domain sequence used to configure the HT-STF is the same as that of the L-STF. In 40 MHz transmission, the HT-STF is configured as an 20 MHz HT-STF sequence is duplicated and frequency-shifted and an upper subcarrier is rotated by 90°.

In a 20 MHz PPDU transmission, an HT-STF sequence (HTS) of the frequency domain is defined as expressed by Equation 2 below.

$$HTS_{-28,28} = \sqrt{1/2}$$

$$\{0,0,0,0,1+j,0,0,0,-1-j,0,0,0,1+j,0,0,0,-1-j,0,0,0,-1-j,0,0,0,1+j,0,0,0,$$

$$0,0,0,0,-1-j,0,0,0,-1-j,0,0,0,1+j,0,0,0,1+j,0,0,0,1+j,0,$$
$$0,0,1+j,0,0,0,0\}$$ [Equation 1]

Referring to Equation 1, HTS_−28,28 illustrates an HT-STF sequence mapped to subcarriers corresponding to a subcarrier (or tone) index −28 to a subcarrier index 28.

That is, in the 20 MHz PPDU transmission, in the case of the HT-STF sequence, among the subcarriers from the subcarrier index −28 to the subcarrier index 28, a value rather than 0 (or a non-zero value) is mapped to a subcarrier whose subcarrier index is a multiple of 4, while a value 0 is mapped to the subcarriers whose subcarrier indices are −28, 0, and 28.

In the 40 MHz PPDU transmission, a frequency domain HT-STF sequence is defined as expressed by Equation 2 below.

$$HTS_{-58,58} = \sqrt{1/2}$$

$$\{0,0,1+j,0,0,0,-1-j,0,0,0,1+j,0,0,0,-1-j,0,0,0,-1-j,0,$$
$$0,0,1+j,0,0,0,$$

$$0,0,0,0,-1-j,0,0,0,-1-j,0,0,0,1+j,0,0,0,1+j,0,0,0,1+j,0,$$
$$0,0,1+j,0,0,0,0,0,$$

$$0,0,0,0,0,0,0,0,0,1+j,0,0,0,-1-j,0,0,0,1+j,0,0,0,-1-j,$$
$$0,0,0,-1-j,0,0,0,1+j,$$

$$0,0,0,0,0,0,0,-1-j,0,0,0,-1-j,0,0,0,1+j,0,0,0,1+j,0,0,0,$$
$$1+j,0,0,0,1+j,0,0\}$$ [Equation 2]

Referring to Equation 2, HTS_−58,58 illustrates an HT-STF sequence mapped to subcarriers corresponding to a subcarrier (or tone) index −58 to a subcarrier index 58.

That is, in the 40 MHz PPDU transmission, in the case of the HT-STF sequence, among the subcarriers from the subcarrier index −58 to the subcarrier index 58, a non-zero value is mapped to a subcarrier whose subcarrier index is a multiple of 4, while a value 0 is mapped to subcarriers whose subcarrier indices are −32, −4, 0, 4, 32.

In Equations 1 and 2, phase rotation by 20 MHz subchannels does not appear.

In the given bandwidth (i.e., a PPDU transmission bandwidth), gamma (γ) (i.e., phase rotation) is applied to the HT-STF sequences defined by Equations 1 and 2 by 20 MHz subchannels.

In the case of the 20 MHz PPDU transmission, γ is defined as expressed by Equation 3 below.

$$Y'_k = 1, \text{in a 20 MHz channel}$$ [Equation 3]

In Equation 3, k denotes an index of a subcarrier (or tone). That is, 1 is multiplied to the HT-STF sequence in every subcarrier.

In the case of 40 MHz PPDU transmission, γ is defined as expressed by Equation 4 below.

$$Y_k = \begin{cases} 1, k \le 0, \text{in a 40 MHz channel} \\ j, k > 0, \text{in a 40 MHz channel} \end{cases}$$ [Equation 4]

In Equation 4, k denotes an index of a subcarrier (or tone).

In the case of the 40 MHz channel, when a subcarrier index is equal to or smaller than 0, 1 is multiplied to the HT-STF sequence, and when the subcarrier index is greater than 0, j is multiplied to the HT-STF sequence.

The VHT-STF will be described.

The VHT-STF field is used to enhance AGC estimation performance in MIMO transmission. A duration of the VHT-STF is 4 μs. In 20 MHz transmission, a frequency domain sequence used to configure the VHT-STF field is the same as that of L-STF. In 40 MHz and 80 MHz transmission, in the VHT-STF, a 20 MHz VHT-STF sequence is duplicated for each 20 MHz subchannel and frequency-shifted, and also, phase rotation is applied for each 20 MHz subchannel.

In 20 MHz PPDU transmission, a frequency domain VHT-STF sequence (VHTS) is defined as expressed by Equation 5 below.

$$VHTS_{-28,28} = HTS_{-28,28}$$ [Equation 5]

In Equation 5, HTS_−28,28 is defined by the foregoing Equation 1.

In 40 MHz PPDU transmission, a frequency domain VHT-STF sequence is defined as expressed by Equation 6 below.

$$VHTS_{-58,58} = HTS_{-58,58}$$ [Equation 5]

In Equation 6, HTS_−58,58 is defined by the foregoing Equation 2.

In 80 MHz PPDU transmission, a frequency domain VHT-STF sequence is defined as expressed by Equation 7 below.

$$VHTS_{-122,122} = \{VHTS_{-58,58}, 0,0,0,0,0,0,0,0,0,0,0,0,$$
$$VHTS_{-58,58}\}$$ [Equation 7]

In Equation 7, VHTS_−58,58 is defined by the foregoing Equation 6.

0 is mapped to a direct current (DC) tone and VHTS_−58,58 sequences are mapped to both sides of the DC tone.

That is, in 80 MHz PPDU transmission, in the case of the VHT-STF sequence, among subcarriers from a subcarrier index −122 to a subcarrier index 122, a non-zero value is mapped to subcarriers whose subcarrier index is a multiple of 4, while the value 0 is mapped to subcarriers whose subcarrier indices are −96, −68, −64, −60, −32, −4, 0, 4, 32, 60, 64, 68, and 96.

In the case of noncontiguous 80+80 MHz PPDU transmission, a 80 MHz VHT-STF sequence defined by the foregoing Equation 9 is used for each 80 MHz frequency segment.

In contiguous 160 MHz PPDU transmission, a frequency domain VHT-STF sequence is defined as expressed by Equation 8 below.

$$VHTS_{-250,250} = \{VHTS_{-122,122}, 0,0,0,0,0,0,0,0,0,0,0, VHTS_{-122,122}\} \quad \text{[Equation 8]}$$

In Equation 8, VHTS_−122,122 is defined by the foregoing Equation 7.

0 is mapped to a DC tone and VHTS_−122,122 sequences are mapped to both sides of the DC tone.

That is, in the contiguous 160 MHz PPDU transmission, in the case of the VHT-STF sequence, among subcarriers from a subcarrier index −250 to a subcarrier index 250, a non-zero value is mapped to a subcarrier whose subcarrier index is a multiple of 4, while the value 0 is mapped to subcarriers whose subcarrier indices are −224, −196, −192, −188, −160, −132, −128, −124, −96, −68, −64, −60, −32, −4, 0, 4, 32, 60, 64, 68, 96, 124, 128, 132, 160, 188, 192, 196, 224.

In Equations 5 to 8, phase rotation by 20 MHz subchannels does not appear.

In the given bandwidth (i.e., a PPDU transmission bandwidth), gamma (γ) (i.e., phase rotation) is applied to the VHT-STF sequences defined by Equations 5 to 8 per 20 MHz subchannel.

Hereinafter, γ_k,BW for each PPDU bandwidth will be described. In γ_k,BW, k denotes an index of a subcarrier (or tone), and BW denotes a PPDU transmission bandwidth.

In 20 MHz PPDU transmission, γ_k,BW is defined as expressed by Equation 9 below.

$$\Upsilon'_{k,20} = 1 \quad \text{[Equation 9]}$$

In the case of 20 MHz PPDU transmission, 1 is multiplied to every VHT-STF sequence of every subcarrier.

In 40 MHz PPDU transmission, γ_k,BW is defined as expressed by Equation 10 below.

$$\Upsilon_{k,40} = \begin{cases} 1, & k < 0 \\ j, & k \geq 0 \end{cases} \quad \text{[Equation 10]}$$

In the case of 40 MHz PPDU transmission, when a subcarrier index is smaller than 0, 1 is multiplied to the VHT-STF sequence, and when the subcarrier index is equal to or greater than 0, j is multiplied to the VHT-STF sequence.

In 80 MHz PPDU transmission, γ_k,BW is defined as expressed by Equation 11 below.

$$\Upsilon_{k,80} = \begin{cases} 1, & k < -64 \\ -1, & k \geq -64 \end{cases} \quad \text{[Equation 11]}$$

In 80 MHz PPDU transmission, when a subcarrier index is smaller than −64, 1 is multiplied to the VHT-STF sequence, and when the subcarrier index is equal to or greater than −64, −1 is multiplied to the VHT-STF sequence.

In the case of non-contiguous 80+80 MHz PPDU transmission, each 80 MHz frequency segment uses the same phase rotation as that of Equation 11.

In contiguous 160 MHz PPDU transmission, γ_k,BW is defined as expressed by Equation 12 below.

$$\Upsilon_{k,160} = \begin{cases} 1, & k < -192 \\ -1, & -192 \leq k < 0 \\ 1, & 0 \leq k < 64 \\ -1, & 64 \leq k \end{cases} \quad \text{[Equation 12]}$$

In the case of contiguous 160 MHz PPDU transmission, when a subcarrier index is smaller than −192, 1 is multiplied to the VHT-STF sequence, when the subcarrier index is equal to or greater than −192 and smaller than 0, −1 is multiplied to the VTH-STF sequence, when the subcarrier index is equal to or greater than 0 and smaller than 64, 1 is multiplied to the VHT-STF sequence, and when the subcarrier index is equal to or greater than 64, −1 is multiplied to the VHT-STF sequence.

As illustrated in FIGS. 11 to 13, in 802.11ax, the HE-STF field used to enhance AGC estimation performance, or the like, is required to be newly defined to correspond to a new PPDU format.

In detail, in the case of UL MU transmission, each STA transmits data using one resource unit (allocation unit of frequency resource for DL/UL OFDMA transmission). Thus, if an STF sequence used in the existing 802.11ac system is used by scaling only a tone position, various problems arise. One of the problems is a peak-to-power average ratio (PAPR). Since a sequence of the existing system was designed in consideration of only a case in which each STA performs UL transmission using the full bandwidth (or PPDU bandwidth), if an STF sequence is transmitted using only a portion (e.g., one resource unit) of the full bandwidth, the PAPR may be increased.

The PAPR is generally defined by a peak amplitude of an OFDM signal divided by a root mean square of an amplitude of the OFDM signal.

Since the OFDM signal includes a combination of numerous subcarriers (or tones) having different amplitudes, a PAPR value may be significantly increased. A high PAPR causes distortion of a signal to result in an increase in noise and interference between subcarriers. Also, a low PAPR may prevent clipping of a signal. Thus, it is effective to lower the PAPR of each OFDMA signal.

Thus, in order to solve the aforementioned problems, the present invention proposes a method for generating an HE-STF sequence and a method for transmitting a PPDU with an HE-STF mapped thereto.

In a legacy WLAN system, FFT sizes may be 64, 128, 256, and 512 in 20 MHz, 40 MHz, 80 MHz, and 160 MHz, respectively. Here, in the legacy WLAN system, a subcarrier spacing may be 312.5 kHz (=20 MHz/64, 40MHZ/128, 80 MHz/256 and/or 160 MHz/512) and an IDFT/DFT period may be 3.2 μs (=1/312.5 kHz).

As described above, since the HT-STF and the VHT-STF are mapped as a non-zero value with four subcarrier spacing (i.e., a subcarrier index is a multiple of 4) in the frequency domain, the HT-STF and the VHT-STF has periodicity of 0.8 μs (=3.2 μs/4) corresponding to ¼ times of an IDFT/DTF period in the time domain.

As described above, in the 802.11ax system (i.e., the HEW system), an FFT size four times greater (i.e., 4×) than that of the existing IEEE 802.11 OFDM system (IEEE 802.11a, 802.11n, 802.11ac, etc.) may be used in each bandwidth.

That is, when the FFT sizes used in the legacy WLAN system are 64, 128, 256, and 512 in 20 MHz, 40 MHz, 80 MHz, and 160 MHz, respectively, FFT sizes used in the HE-part may be 256, 512, 1024, and 2048 in 20 MHz, 40

MHz, 80 MHz, and 160 MHz, respectively. Here, subcarrier spacings of the HE-part may be 78.125 kHz (=20 MHz/256, 40MHZ/512, 80 MHz/1024 and/or 160 MHz/2048) and an IDFT/DFT period of the HE-part may be 12.8 μs (=1/78.125 kHz).

In this manner, since the subcarrier spacing of the HE-part corresponds to ¼ of the legacy WLAN system, if an HE-STF sequence is defined such that a non-zero value is mapped at 16 subcarrier spacings (e.g., a subcarrier index is a multiple of 16), the HE-STF has the same periodicity (i.e., 0.8 μs) as that of the legacy WLAN system. That is, when the legacy WLAN system is 1×, the HE-STF having the same periodicity as that of the legacy WLAN system may be called 1× HE-STF.

Also, when an HE-STF sequence is defined such that a non-zero value is mapped at 8 subcarrier spacings (e.g., a subcarrier index is a multiple of 8), the HE-STF has a periodicity (i.e., 1.6 μs) two times greater than that of the legacy WLAN system. The HE-STF at this time may be called 2× HE-STF.

Also, when an HE-STF sequence is defined such that a non-zero value is mapped at 4 subcarrier spacings (e.g., a subcarrier index is a multiple of 4), the HE-STF has a periodicity (i.e., 3.2 μs) four times greater than that of the legacy WLAN system. The HE-STF at this time may be called 4× HE-STF.

The HE-STF sequence may be mapped to (data) tones included in each transmission channel. (1×, 2×) HE-STF sequence may include a value "0" or a value (coefficient) rather than "0". Hereinafter, for the purposes of description, among tones (i.e., tones of resource units) to which (1×, 2×) HE-STF sequence is mapped, a tone to which a nonzero value is mapped (i.e., a tone to which a predetermined coefficient is mapped) will be called a (1×, 2×) HE-STF tone (or subcarrier).

Hereinafter, a 2× HE-STF sequence which may be applied to the 802.11ax system is proposed and the 2× HE-STF sequence will be described with reference to the accompanying drawings. In particular, a 2× HE-STF for minimizing a PAPR of every resource unit included in a transport channel (or bandwidth) (e.g., 20 MHz, 40 MHz, or 80 MHz) of a PPDU is proposed.

To this end, first, a structure of a 1×/2× HE-STF sequence and a method for configuring the 1×/2× HE-STF sequence will be described.

FIG. 14 illustrates a structure of 1× HE-STF sequence by PPDU transmission channels according to an embodiment of the present invention.

Referring to FIG. 14, a 1× HE-STF sequence of each channel may be configured using (or on the basis of) a 1× HE-STF sequence of a smaller channel. Or, the 1× HE-STF sequence of each channel may be configured to have a structure in which a 1× HE-STF sequence of a smaller channel is duplicated (or repeated). For example, a 1× HE-STF sequence of a 40 MHz channel may be configured using a 1× HE-STF sequence of a 20 MHz channel, and a 80 MHz channel may be configured using a 1× HE-STF sequence of a 20 MHz or 40 MHz channel.

The 1× HE-STF sequence of the 20 MHz channel may be configured as M sequence (or subsequence). That is, the 1× HE-STF sequence of the 20 MHz channel may be configured to have a structure such as {M}, and here, the M sequence may be configured by re-using the HT-STF sequence of the existing 802.11n system. The M sequence will be described in detail hereinafter.

A 1× HE-STF sequence of a 40 MHz channel may be configured using (or on the basis of) the 1× HE-STF sequence of the 20 MHz channel. In detail, the 1× HE-STF sequence of the 40 MHz channel may be configured by duplicating the 1× HE-STF sequence of the 20 MHz channel twice and frequency-shifting the same. Also, in order to null the DC tones, the 1× HE-STF sequence of the 40 MHz channel may be configured such that seven 0 values are positioned at the center. Thus, the 1× HE-STF sequence of the 40 MHz channel may be configured to have such a structure as {M, 0, 0, 0, 0, 0, 0, 0, M}.

Also, a 1× HE-STF sequence of a 80 MHz channel may be configured using the 40 MHz channel (or 20 MHz channel). In detail, the 1× HE-STF sequence of the 80 MHz channel may be configured by duplicating the 1× HE-STF sequence of the 40 MHz channel twice and frequency-shifting the same. Also, in order to null the DC tones, the 1× HE-STF sequence of the 80 MHz channel may be configured such that seven 0 values are positioned at the center. Thus, the 1× HE-STF sequence of the 80 MHz channel may be configured to have such a structure as {M, 0, 0, 0, 0, 0, 0, 0, M, 0, 0, 0, 0, 0, 0, 0, M, 0, 0, 0, 0, 0, 0, 0, M}.

However, in cases where the 1× HE-STF sequence of the 80 MHz channel is configured as described above, when it is assumed that the 1× HE-STF sequence is sequentially mapped to subcarriers (excluding a DC tone and a guard tone) of the 80 MHz channel, tones to which value 0 is mapped (e.g., tones positioned in tone indices ±256) may be present among tones positioned in tone indices, a multiple of 16. That is, when the 1× HE-STF sequence is configured as described above, 1× HE-STF tones may not be present wholly in units of 16 tones within the 80 MHz channel. Thus, in order to allow a non-zero value to be wholly mapped to the tones positioned in units of 16 tones in the 80 MHz channel, extra values a1 and a2, instead of value "0", may be inserted to specific positions (e.g., positions corresponding to the tone indices ±256) within the 1× HE-STF sequence. In other words, in order to allow the 1× HE-STF tones to be positioned in units of 16 tones without omission in the 80 MHz channel, extra values a1 and a2, instead of the value "0", may be inserted into specific positions (e.g., tone indices ±256 positions) within the 1× HE-STF sequence. Here, the extra values (a_n, n is a natural number) inserted instead of the value "0" may be determined as any one of four values of $\sqrt{1/2}*{1+j, 1-j, -1+j, -1-j}$.

In the existing system (802.11n, 802.11ac), although a tone index is a multiple of 4, some subcarriers to which the value "0" is mapped are present, but in the system of the present invention, since the 1× HE-STF sequence is configured such that a non-zero value is mapped to every subcarrier whose tone index is a multiple of 16, all the available tones which may be used as the 1× HE-STF tones may advantageously be used.

In addition, a specific coefficient (c_n, n is a natural number) may be multiplied to the M sequence included in the 1× HE-STF sequence by channels. Here, the specific coefficient (c_n) multiplied to the M sequence may be determined as any one of four values of {1, -1, j, -j}.

To sum up, the 1× HE-STF sequence of each channel may be configured to have the following structure.

20 MHz channel: {c1*M}
40 MHz channel: {c2*M, 0, 0, 0, 0, 0, 0, 0, c3*M}
80 MHz channel: {c4*M, 0, 0, 0, a1, 0, 0, 0, c5*M, 0, 0, 0, 0, 0, 0, c6*M, 0, 0, 0, a2, 0, 0, 0, c7*M}

Here, c_n and a_n may be determined as any one of the following values capable of minimizing the PAPR.

c_n: {1, -1, j, -j}
a_n: $\sqrt{1/2}*{1+j, 1-j, -1+j, -1-j}$

FIG. 15 illustrates a structure of 2× HE-STF sequence by PPDU transmission channels according to an embodiment of the present invention.

Referring to FIG. 15, as in the embodiment of FIG. 14, a 2× HE-STF sequence of each channel may be configured using (or on the basis of) a 2× HE-STF sequence of a smaller channel. Or, the 2× HE-STF sequence of each channel may be configured to have a structure in which a 2× HE-STF sequence of a smaller channel is duplicated (or repeated). For example, a 2× HE-STF sequence of a 40 MHz channel may be configured using a 2× HE-STF sequence of a 20 MHz channel, and a 80 MHz channel may be configured using a 2× HE-STF sequence of a 20 MHz or 40 MHz channel.

The 2× HE-STF sequence of the 20 MHz channel may be configured as M sequence (or subsequence) and the value "0". That is, the 2× HE-STF sequence of the 20 MHz channel may be configured to have a structure such as {M, 0, 0, 0, 0, 0, 0, 0, M}, and here, the M sequence may be configured by re-using the HT-STF sequence of the existing 802.11n system.

A 2× HE-STF sequence of a 40 MHz channel may be configured using (or on the basis of) the 2× HE-STF sequence of the 20 MHz channel. In detail, the 2× HE-STF sequence of the 40 MHz channel may be configured by duplicating the 2× HE-STF sequence of the 20 MHz channel twice and frequency-shifting the same. Also, in order to null the DC tones, the 2× HE-STF sequence of the 40 MHz channel may be configured such that seven 0 values are positioned at the center. Thus, the 2× HE-STF sequence of the 40 MHz channel may be configured to have such a structure as {M, 0, 0, 0, 0, 0, 0, 0, M, 0, 0, 0, 0, 0, 0, 0, M, 0, 0, 0, 0, 0, 0, 0, M}.

However, in cases where the 2× HE-STF sequence of the 40 MHz channel is configured as described above, when it is assumed that the 2× HE-STF sequence is sequentially mapped to subcarriers (excluding a DC tone and a guard tone) of the 40 MHz channel, tones to which value 0 is mapped (e.g., tones positioned in tone indices ±128) may be present among tones positioned in tone indices, a multiple of 8. That is, when the 2× HE-STF sequence is configured as described above, 2× HE-STF tones may not be present wholly in units of 8 tones within the 40 MHz channel. Thus, in order to allow a non-zero value to be wholly mapped to the tones positioned in units of 8 tones in the 40 MHz channel, extra values a1 and a2, instead of value "0", may be inserted to specific positions (e.g., positions corresponding to the tone indices ±128) within the 2× HE-STF sequence. In other words, in order to allow the 2× HE-STF tones to be positioned in units of 8 tones without omission in the 40 MHz channel, extra values a1 and a2, instead of the value "0", may be inserted into specific positions (e.g., tone indices ±128 positions) within the 2× HE-STF sequence. Here, the extra values (a_n, n is a natural number) inserted instead of the value "0" may be determined as any one of four values of $\sqrt{1/2}$*{1+j, 1−j, −1+j, −1−j}.

Also, the 2× HE-STF sequence of the 80 MHz channel may be configured using the 40 MHz channel (or the 20 MHz channel). In detail, the 2× HE-STF sequence of the 80 MHz channel may be configured by duplicating the 2× HE-STF sequence of the 40 MHz channel twice and frequency-shifting the same. Also, in order to null the DC tones, the 2× HE-STF sequence of the 80 MHz channel may be configured such that seven 0 values are positioned at the center. Thus, the 2× HE-STF sequence of the 80 MHz channel may be configured to have such a structure as {M, 0, 0, 0, 0, 0, 0, 0, M, 0, 0, 0, 0, 0, 0, 0, M, 0, 0, 0, 0, 0, 0, 0, M, 0, 0, 0, 0, 0, 0, 0, M, 0, 0, 0, 0, 0, 0, 0, M, 0, 0, 0, 0, 0, 0, 0, M, 0, 0, 0, 0, 0, 0, 0, M}.

However, in cases where the 2× HE-STF sequence of the 80 MHz channel is configured as described above, tones to which value 0 is mapped (e.g., tones positioned in tone indices ±384, ±256, and ±128) are present among subcarriers in units of 8 tones to which the 2× HE-STF sequence is mapped. Thus, in order to allow a non-zero value to be wholly mapped to the tones (or subcarriers) in units of 8 tones to which the 2× HE-STF sequence is mapped in the 80 MHz channel without omission, extra values a1 to a6, instead of value "0", may be inserted to specific positions (e.g., tone index ±384, ±256, and ±128 positions) within the 2× HE-STF sequence. In other words, in order to allow a non-zero value to be mapped to tones (or subcarriers) in units of 8 tones to which the 2× HE-STF sequence is mapped without omission in the 80 MHz channel, extra values a1 to a6, instead of the value "0", may be inserted into specific positions (e.g., tone index ±384, ±256, and ±128 positions) within the 2× HE-STF sequence. Here, the extra values (a_n, n is a natural number) inserted instead of the value "0" may be determined as any one of four values of {1+j, 1−j, −1+j, −1−j}.

However, in cases where the 2× HE-STF sequence of the 80 MHz channel is configured as described above, when it is assumed that the 2× HE-STF sequence is sequentially mapped to subcarriers (excluding a DC tone and a guard tone) of the 80 MHz channel, tones to which value 0 is mapped (e.g., tones positioned in tone index ±384, ±256, and ±128) may be present among tones positioned in tone indices, a multiple of 8. That is, when the 2× HE-STF sequence is configured as described above, 2× HE-STF tones may not be present wholly in units of 8 tones within the 80 MHz channel. Thus, in order to allow a non-zero value to be wholly mapped to the tones positioned in units of 8 tones in the 80 MHz channel, extra values a1 to a6, instead of value "0", may be inserted to specific positions (e.g., positions corresponding to the tone indices ±384, ±256, and ±128) within the 2× HE-STF sequence. In other words, in order to allow the 2× HE-STF tones to be positioned in units of 8 tones without omission in the 80 MHz channel, extra values a1 to a6, instead of the value "0", may be inserted into specific positions (e.g., tone index ±384, ±256, and ±128 positions) within the 2× HE-STF sequence. Here, the extra values (a_n, n is a natural number) inserted instead of the value "0" may be determined as any one of four values of {1+j, 1−j, −1+j, −1−j}.

Compared with the existing system (802.11n, 802.11ac) in which, subcarriers to which the value "0" is mapped are present although a tone index is a multiple of 4, in the present invention, since the 2× HE-STF sequence is configured such that a non-zero value is mapped to every subcarrier whose tone index is a multiple of 8 in present invention, all the available tones which may be used as the 2× HE-STF tones may advantageously be used.

In addition, a specific coefficient (c_n, n is a natural number) may be multiplied to the M sequence included in the 2× HE-STF sequence by channels. Here, the specific coefficient (c_n) multiplied to the M sequence may be determined as any one of four values of {1, −1, j, −j}.

To sum up, the 2× HE-STF sequence of each channel may be configured to have the following structure.

20 MHz channel: {c1*M, 0, 0, 0, 0, 0, 0, 0, c2*M}
40 MHz channel: {c3*M, 0, 0, 0, 0, a1, 0, 0, 0, 0, c4*M, 0, 0, 0, 0, 0, 0, 0, c5*M, 0, 0, 0, 0, a2, 0, 0, 0, 0, c6*M}

80 MHz channel: {c7*M, 0, 0, 0, a3, 0, 0, 0, c8*M, 0, 0, 0, a4, 0, 0, 0, c9*M, 0, 0, 0, a5, 0, 0, 0, c10*M, 0, 0, 0, 0, 0, 0, 0, c11*M, 0, 0, 0, a6, 0, 0, 0, c12*M, 0, 0, 0, a7, 0, 0, 0, c13*M, 0, 0, 0, a8, 0, 0, 0, c14*M}

Here, $c\_n$ and $a\_n$ may be determined as any one of the following values capable of minimizing the PAPR.

$c\_n$: {1, −1, j, −j}

$a\_n$: $\sqrt{1/2}$*{1+j, 1−j, −1+j, −1−j}

So far, the structures of the 1×, 2× HE-STF sequences of each channel have been described. Hereinafter, an M sequence having good performance in terms of the PAPR with respect to the proposed 2× HE-STF sequence structure in a situation in which tone plans by channels are variously applied is proposed. In addition, a new 2× HE-STF sequence optimized for the 802.11ax system by applying the proposed M sequence to the 2× HE-STF sequence structure and optimizing the coefficient ($c\_n$) of the M sequence and other extra value $a\_n$ is proposed. Here, as the coefficient ($c\_n$) of the M sequence, {1, −1, j, −j} (non-binary) values are considered, and as the extra value, $\sqrt{1/2}$*{1+j, 1−j, −1+j, −1−j} values are considered.

When optimizing, phase rotation (or gamma value) of the 802.11ac system is applied. That is, the 2× HE-STF sequence proposed hereinafter is a sequence before phase rotation (or gamma value) is applied, and has an optimized PAPR when phase rotation (or gamma value) is applied.

Also, the PAPR measured hereinafter indicates a PAPR value (dB unit) of each resource unit used to transmit the 2× HE-STF sequence in transmission of the 2× HE-STF sequence of the 802.11ax system in which the 4×FFT size is used, and is a value measured in a situation in which four times of FFT size is additionally applied (4× upsampling PAPR). For example, an FFT size of 802.11ax 20 MHz is 256, and the PAPR hereinafter is a value measured in a situation in which the FFT size of 1024 (256*4) is applied.

1. 2× HE-STF Sequence of 20 MHz Channel

As illustrated in FIG. 15, the 2× HE-STF sequence of the 20 MHz channel may be configured to have a structure of {c1*M, 0, 0, 0, 0, 0, 0, 0, c2*M}, and here, the M sequence, a coefficient of the M sequence, and an extra value may be defined as expressed by Equation 13 below.

$$M_{-28,28}(-24:24)=HTS_{-28,28}(-24:24)$$

$$M_{-28,28}(-28)=\sqrt{1/2}(-1-j), M_{-28,28}(28)=\sqrt{1/2}(1+j)$$

$$M_{-28,28}(0)=\sqrt{1/2}(1+j) \quad \text{[Equation 13]}$$

Referring to FIG. 13, the M sequence may be configured by reusing the HT-STF sequence. In detail, corresponding values ($M\_{-28,28}(-24:24)$) from indices −24 to 24 of the M sequence may be configured as values (HTS −28,28(−24:24)) from tone indices −24 to 24 of the HT-STF sequence. Here, $HTS\_{-28,28}$, the HT-STF sequence, is defined as expressed by Equation 1. Also, a value $\sqrt{1/2}(-1-j)$ is applied to the index −28 of the M sequence, a value $\sqrt{1/2}(1+j)$ is applied to the index 28, and a value (1+j) is applied to the index 0.

The 2× HE-STF of the 20 MHz channel configured on the basis of the M sequence may be defined as expressed by Equation 14 below.

$$HES_{-120,120}(-120:2:120)=\{M_{-28,28}, 0_7, -M_{-28,28}\}$$

$$HES_{-128,127}=\{0_8, HES_{-120,120}, 0_7\} \quad \text{[Equation 14]}$$

Referring to FIG. 14, the 2× HE-STF sequence (HES_−120,120(−120:2:120)) mapped to tones of the tone indices from −120 to 120 in units of 2 tones may be configured as {M_−28,28, 0_7, −M_−28,28}.

Also, the 2× HE-STF sequence (HES_−128,127) mapped to tones of the tone indices from −128 to 127 may be configured as {0_8, HES_−120,120, 0_7}.

Since the 2× HE-STF sequence is generated as described above, the 2× HE-STF tones to which a non-zero value is mapped is configured at 8 tone intervals in the entire data tones without omission.

In addition to the aforementioned Equation 13 and Equation 14, the 2× HE-STF sequence may also be defined as expressed by Equation 15 below.

$$M1_{-28,28}(-24:24)=HTS_{-28,28}(-24:24)$$

$$M1_{-28,28}(-28)=\sqrt{1/2}(-1+j), M1_{-28,28}(28)=\sqrt{1/2}(-1-j)$$

$$M1_{-28,28}(0)=\sqrt{1/2}(1+j)$$

$$HES_{-120,120}(-120:2:120)=\{M1_{-28,28}, 0_7, -M1_{-28,28}\}$$

$$HES_{-128,127}=\{0_8, HES_{-120,120}, 0_7\} \quad \text{[Equation 15]}$$

FIGS. 16 to 25 illustrate various tone plans of the 20 MHz channel and tables of PAPR values measured by tone plans according to an embodiment of the present invention. The 2× HE-STF sequence proposed in Equation 13 and Equation 14 can obtain an optimized PAPR value when applied to various tone plans of FIGS. 16 to 25. Hereinafter, various tone plans according to various embodiments and PAPR measurement values when the 2× HE-STF sequence proposed in Equation 14 is applied to each tone plan will be described.

FIG. 16 is a view illustrating a tone plane of a 20 MHz channel according to a first embodiment of the present invention.

Referring to FIG. 16(a), the 20 MHz channel may include nine 26-tone resource units, six left guard tones, five right guard tones, and seven DC tones. In addition, the 20 MHz channel may additionally include four leftover tones (first to fourth leftover tones) positioned to be adjacent to the resource units.

Here,
the first leftover tone may be positioned on the left of a first 26-tone resource unit,
the second leftover tone may be positioned between second and third 26-tone resource units,
the third leftover tone may be positioned between seventh and eighth 26-tone resource units, and
the fourth leftover tone may be positioned on the right of a ninth 26-tone resource unit.

Here, resource units of a small tone unit may be classified as one resource unit of a larger tone unit together with a leftover tone. For example, two 26-tone resource units may be classified as one 52-tone resource unit (refer to FIG. 16(b), two 52-tone resource unit and two leftover tones may be classified as one 106-tone resource unit (refer to FIG. 16(c)), and two 106-tone resource units, one 26-tone resource unit, and four leftover tones (or DC tones) may be classified as one 242-tone resource unit (refer to FIG. 16(d)). Similarly, resource units of a larger tone unit may be divided into resource units of a smaller tone unit and a leftover tone. Thus, various tone plans obtained by combining tone plans of FIGS. 16(a) to 16(d), as well as the tone plans of FIGS. 16(a) to 16(d), may be derived.

FIG. 17 illustrates tables of PAPR values measured by resource units when the 2× HE-STF sequence of the present invention is applied to a tone plan of 20 MHz channel according to a first embodiment. Specifically, FIG. 17(a) illustrates a table of PAPR values measured by resource units when the 2× HE-STF sequence defined in Equation 14 is applied to the tone plan of the first embodiment, and FIG. 17(b) illustrates a table of PAPR values measured by resource units when the 2× HE-STF sequence defined in Equation 15 is applied to the tone plan of the first embodiment. In FIG. 17, the values of the respective spaces indicate PAPR measurement values of resource units corresponding to positions of the spaces.

Referring to FIG. 17(a), a maximum PAPR value is 6.02, and referring to FIG. 17(b), a maximum PAPR value is 5.78. Referring to FIGS. 17(a) and 17(b), the PAPR values may be minimized using the 2× HE-STF sequence defined in Equation 14 or 15.

FIG. 18 illustrates a tone plan of a 20 MHz channel and PAPR values by resource units according to a second embodiment of the present invention. In FIG. 18, for the purposes of description, illustration of a left/right guard tone and DC tone is omitted. Also, the same descriptions of FIGS. 16 and 17 may be applied to FIG. 18 in the same or similar manner.

Referring to FIG. 18(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in this embodiment, as described above, resource units of a small tone unit may be classified as one resource unit of a larger tone unit together with a leftover tone, and resource units of a large tone unit may be divided into resource units of a smaller tone unit and a leftover tone.

For example, two 52-tone resource unit and three leftover tones may be classified as one 107-tone resource unit, and two 107-tone resource units, one 26-tone resource unit, and two leftover tones may be classified as one 242-tone resource unit. Thus, the tone plans of the 20 MHz channel may be variously derived as an embodiment in which the tone plans illustrated in this drawing are combined with each other, as well as the tone plans illustrated in this drawing.

When the 2× HE-SFT sequence defined in Equation 14 is applied to the tone plan of the 20 MHz channel according to the second embodiment, PAPR values illustrated in FIG. 18(b) were measured. In FIG. 18(b), values of the respective spaces indicate PAPR measurement values of resource units corresponding to the positions of the respective spaces. Referring to FIG. 18(b), it can be seen that PAPR values of all the resource units were measured to be very low, i.e., 4.89 or lower.

FIG. 19 illustrates a tone plan of a 20 MHz channel and PAPR values by resource units according to a third embodiment of the present invention. In this drawing, for the purposes of description, illustration of a left/right guard tone and a DC tone is omitted. Also, the same descriptions as those of FIGS. 16 and 17 may be applied to FIG. 19 in the same or similar manner.

Referring to FIG. 19(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the third embodiment, PAPR values were measured as illustrated in FIG. 19(b). In FIG. 19(b), values of the respective spaces indicate PAPR measurement values of resource units corresponding to the positions of the respective spaces. Referring to FIG. 19(b), it can be seen that PAPR values of all the resource units were measured to be very low, i.e., 4.89 or lower.

FIG. 20 illustrates a tone plan of a 20 MHz channel and PAPR values by resource units according to a fourth embodiment of the present invention. In this drawing, for the purposes of description, illustration of a left/right guard tone and a DC tone is omitted. Also, the same descriptions as those of FIGS. 16 and 17 may be applied to FIG. 20 in the same or similar manner.

Referring to FIG. 20(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the fourth embodiment, PAPR values were measured as illustrated in FIG. 20(b). In FIG. 20(b), values of the respective spaces indicate PAPR measurement values of resource units corresponding to the positions of the respective spaces. Referring to FIG. 20(b), it can be seen that PAPR values of all the resource units were measured to be very low, i.e., 4.89 or lower.

FIG. 21 illustrates a tone plan of a 20 MHz channel and PAPR values by resource units according to a fifth embodiment of the present invention. In this drawing, for the purposes of description, illustration of a left/right guard tone and a DC tone is omitted. Also, the same descriptions as those of FIGS. 16 and 17 may be applied to FIG. 21 in the same or similar manner.

Referring to FIG. 21(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone.

Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the fifth embodiment, PAPR values were measured as illustrated in FIG. 21(b). In FIG. 21(b), values of the respective spaces indicate PAPR measurement values of resource units corresponding to the positions of the respective spaces. Referring to FIG. 21(b), it can be seen that PAPR values of all the resource units were measured to be very low, i.e., 4.89 or lower.

FIG. 22 illustrates a tone plan of a 20 MHz channel and PAPR values by resource units according to a sixth embodiment of the present invention. In this drawing, for the purposes of description, illustration of a left/right guard tone and a DC tone is omitted. Also, the same descriptions as those of FIGS. 16 and 17 may be applied to FIG. 22 in the same or similar manner.

Referring to FIG. 22(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the sixth embodiment, PAPR values were measured as illustrated in FIG. 22(b). In FIG. 22(b), values of the respective spaces indicate PAPR measurement values of resource units corresponding to the positions of the respective spaces. Referring to FIG. 22(b), it can be seen that PAPR values of all the resource units were measured to be very low, i.e., 4.89 or lower.

FIG. 23 illustrates a tone plan of a 20 MHz channel and PAPR values by resource units according to a seventh embodiment of the present invention. In this drawing, for the purposes of description, illustration of a left/right guard tone and a DC tone is omitted. Also, the same descriptions as those of FIGS. 16 and 17 may be applied to FIG. 23 in the same or similar manner.

Referring to FIG. 23(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the seventh embodiment, PAPR values were measured as illustrated in FIG. 23(b). In FIG. 23(b), values of the respective spaces indicate PAPR measurement values of resource units corresponding to the positions of the respective spaces. Referring to FIG. 23(b), it can be seen that PAPR values of all the resource units were measured to be very low, i.e., 4.89 or lower.

FIG. 24 illustrates a tone plan of a 20 MHz channel and PAPR values by resource units according to an eighth embodiment of the present invention. In this drawing, for the purposes of description, illustration of a left/right guard tone and a DC tone is omitted. Also, the same descriptions as those of FIGS. 16 and 17 may be applied to FIG. 24 in the same or similar manner.

Referring to FIG. 24(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the eighth embodiment, PAPR values were measured as illustrated in FIG. 24(b). In FIG. 24(b), values of the respective spaces indicate PAPR measurement values of resource units corresponding to the positions of the respective spaces. Referring to FIG. 24(b), it can be seen that PAPR values of all the resource units were measured to be very low, i.e., 6.02 or lower.

FIG. 25 illustrates a tone plan of a 20 MHz channel and PAPR values by resource units according to a ninth embodiment of the present invention. In this drawing, for the purposes of description, illustration of a left/right guard tone and a DC tone is omitted. Also, the same descriptions as those of FIGS. 16 and 17 may be applied to FIG. 25 in the same or similar manner.

Referring to FIG. 25(a), the 20 MHz channel may include at least one resource unit, six left guard tones, five right guard tones, and three DC tones. In addition, the 20 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 20 MHz channel may be variously derived as an embodiment in which the tone plans illustrated in this drawing are combined with each other, as well as the tone plans illustrated in this drawing.

When the 2× HE-STF sequence defined in Equation 14 is applied to the tone plan of the 20 MHz channel according to the ninth embodiment, PAPR values were measured as illustrated in FIG. 25(b). In FIG. 25(b), values of the respective spaces indicate PAPR measurement values of resource units corresponding to the positions of the respective spaces. Referring to FIG. 25(b), it can be seen that PAPR values of all the resource units were measured to be very low, i.e., 6.02 or lower.

In the aforementioned embodiments, it can be confirmed that application of the 2× HE-STF sequence of Equation 14 to the 20 MHz channel having various tone plans obtains optimal PAPR performance. Hereinafter, a new 2× HE-STF sequence applied to a 40 MHz channel is proposed and PAPR values measured by resource units according to a tone plan of the 40 MHz channel to which the corresponding 2× HE-STF sequence is applied will be described.

2. 2× HE-STF Sequence of 40 MHz Channel

As described above with reference to FIG. 14, the 2× HE-STF sequence of the 40 MHz channel may be configured to have a structure of {c3*M, 0, 0, 0, a1, 0, 0, 0, c4*M, 0, 0, 0, 0, 0, 0, 0, c5*M, 0, 0, 0, a2, 0, 0, 0, c6*M}, and here, an M sequence, a coefficient of the M sequence, and an extra value may be defined as expressed by Equation 16 below.

$$HES_{-248,248}(-248:2:248) = \{M_{-28,28}, 0_3,$$
$$\sqrt{1/2}(1+j), 0_3, -jM_{-28,28}, 0_7, M_{-28,28}, 0_3,$$

$$\sqrt{1/2}(-1+j), 0_3, jM_{-28,28}\}$$

$$HES_{-256,255} = \{0_8, HES_{-248,248}, 0_7\}$$

$$HES_{-256,255}(\pm 248) = 0 \quad \text{[Equation 16]}$$

Referring to Equation 16, the 2× HE-STF sequence (HES_−248,248(−248:2:248)) mapped to tones of the tone indices from −248 to 248 in units of 2 tones may be configured as {M_−28,28, 0_3, $\sqrt{1/2}$(1+j), 0_3, −jM_−28,28, 0_7, M_−28,28, 0_3, $\sqrt{1/2}$(−1+j), 0_3, jM_−28,28}.

Also, the 2× HE-STF sequence (HES −256,255)) mapped to tones of the tone indices from −256 to 255 may be configured as {0_8, HES_−248,248, 0_7}. Also, the 2× HE-STF sequence may be defined such that a value "0" is mapped to guard tones positioned in the tone indices ±248.

Since the 2× HE-STF sequence is generated as described above, the 2× HE-STF tones to which a non-zero value is mapped is configured at 8 tone intervals in the entire data tones without omission.

FIGS. 26 to 35 illustrate various tone plans of the 40 MHz channel and tables of PAPR values measured by tone plans according to an embodiment of the present invention. The 2× HE-STF sequence proposed in Equation 16 can obtain an optimized PAPR value when applied to various tone plans of FIGS. 26 to 35. Hereinafter, various tone plans according to various embodiments and PAPR measurement values when the 2× HE-STF sequence proposed in Equation 16 is applied to each tone plan will be described.

FIG. 26 is a view illustrating a tone plane of a 40 MHz channel according to a first embodiment of the present invention.

Referring to FIG. 26(a), the 40 MHz channel may include eighteen 26-tone resource units, twelve left guard tones, eleven right guard tones, and five DC tones. In addition, the 20 MHz channel may additionally include sixteen leftover tones (first to sixteenth leftover tones) positioned to be adjacent to the resource units.

Here,
the first leftover tone may be positioned on the left of a first 26-tone resource unit,
the second and third leftover tones may be positioned between second and third 26-tone resource units,
the fourth leftover tone may be positioned between the fourth and fifth 26-tone resource units,
the fifth leftover tone may be positioned between the fifth and sixth 26-tone resource units,
the sixth and seventh leftover tones may be positioned between seventh and eighth 26-tone resource units,
the eighth and ninth leftover tones may be positioned between ninth and tenth 26-tone resource units,
the tenth and eleventh leftover tones may be positioned between eleventh and twelfth 26-tone resource units,
the twelfth leftover tone may be positioned between the thirteenth and fourteenth 26-tone resource units,
the thirteenth leftover tone may be positioned between the fourteenth and fifteenth 26-tone resource units,
the fourteenth and fifteenth leftover tones may be positioned between sixteenth and seventeenth 26-tone resource units, and
the sixteenth leftover tone may be positioned on the right of the eighteenth 26-tone resource unit.

Here, resource units of a small tone unit may be classified as one resource unit of a larger tone unit together with a leftover tone. For example, two 26-tone resource units may be classified as one 52-tone resource unit (refer to FIG. 26(b), two 52-tone resource unit and two leftover tones may be classified as one 106-tone resource unit (refer to FIG. 26(c)), two 106-tone resource units, one 26-tone resource unit, and four leftover may be classified as one 242-tone resource unit (refer to FIG. 26(d)), and two 242-tone resource units may be classified as one 484-tone resource unit (refer to FIG. 26(e)). Similarly, resource units of a larger tone unit may be divided into resource units of a smaller tone unit and a leftover tone.

Thus, various tone plans obtained by combining tone plans of FIGS. 26(a) to 26(d), as well as the tone plans of FIGS. 26(a) to 26(d), may be derived.

FIG. 27 illustrates a table of PAPR values measured by resource units when the 2× HE-STF sequence defined in Equation 16 is applied to a tone plan of 40 MHz channel according to the first embodiment. In FIG. 27, the values of the respective spaces indicate PAPR measurement values of resource units corresponding to positions of the spaces.

Referring to FIG. 27, the PAPR values of all the resource units were measured to be very low, i.e., 6.02 or lower. That is, referring to FIG. 27, the PAPR values may be minimized using the 2× HE-STF sequence defined in Equation 16.

FIG. 28 illustrates a tone plan of a 40 MHz channel and PAPR values by resource units according to a second embodiment of the present invention. In FIG. 28, for the purposes of description, illustration of a left/right guard tone and DC tone is omitted. Also, the same descriptions of FIGS. 26 and 27 may be applied to FIG. 28 in the same or similar manner.

Referring to FIG. 28(a), the 40 MHz channel may include at least one resource unit, twelve left guard tones, eleven right guard tones, and five DC tones. In addition, the 40 MHz channel may further include leftover tones positioned to be adjacent to the resource unit.

Also, in this embodiment, as described above, resource units of a small tone unit may be classified as one resource unit of a larger tone unit together with a leftover tone, and resource units of a large tone unit may be divided into resource units of a smaller tone unit and a leftover tone.

For example, two 52-tone resource unit and three leftover tones may be classified as one 107-tone resource unit, and two 107-tone resource units, one 26-tone resource unit, and two leftover tones may be classified as one 242-tone resource unit. Thus, the tone plans of the 40 MHz channel may be variously derived as an embodiment in which the tone plans illustrated in this drawing are combined with each other, as well as the tone plans illustrated in this drawing.

When the 2× HE-SFT sequence defined in Equation 16 is applied to the tone plan of the 40 MHz channel according to the second embodiment, PAPR values illustrated in FIG. 28(b) were measured. In FIG. 28(b), values of the respective spaces indicate PAPR measurement values of resource units corresponding to the positions of the respective spaces. Referring to FIG. 28(b), it can be seen that PAPR values of all the resource units were measured to be very low, i.e., 5.00 or lower.

FIG. 29 illustrates a tone plan of a 40 MHz channel and PAPR values by resource units according to a third embodiment of the present invention. In this drawing, for the purposes of description, illustration of a left/right guard tone and a DC tone is omitted. Also, the same descriptions as those of FIGS. 26 and 27 may be applied to FIG. 29 in the same or similar manner.

Referring to FIG. 29(a), the 40 MHz channel may include at least one resource unit, twelve left guard tones, eleven right guard tones, and five DC tones. In addition, the 40 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the third embodiment, PAPR values were measured as illustrated in FIG. 29(b). In FIG. 29(b), values of the respective spaces indicate PAPR measurement values of resource units corresponding to the positions of the respective spaces. Referring to FIG. 29(b), it can be seen that PAPR values of all the resource units were measured to be very low, i.e., 5.00 or lower.

FIG. 30 illustrates a tone plan of a 40 MHz channel and PAPR values by resource units according to a fourth embodiment of the present invention. In this drawing, for the purposes of description, illustration of a left/right guard tone and a DC tone is omitted. Also, the same descriptions as those of FIGS. 26 and 27 may be applied to FIG. 30 in the same or similar manner.

Referring to FIG. 30(a), the 40 MHz channel may include at least one resource unit, twelve left guard tones, eleven right guard tones, and five DC tones. In addition, the 40 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the fourth embodiment, PAPR values were measured as illustrated in FIG. 30(b). In FIG. 30(b), values of the respective spaces indicate PAPR measurement values of resource units corresponding to the positions of the respective spaces. Referring to FIG. 30(b), it can be seen that PAPR values of all the resource units were measured to be very low, i.e., 5.00 or lower.

FIG. 31 illustrates a tone plan of a 40 MHz channel and PAPR values by resource units according to a fifth embodiment of the present invention. In this drawing, for the purposes of description, illustration of a left/right guard tone and a DC tone is omitted. Also, the same descriptions as those of FIGS. 26 and 27 may be applied to FIG. 31 in the same or similar manner.

Referring to FIG. 31(a), the 40 MHz channel may include at least one resource unit, twelve left guard tones, eleven right guard tones, and five DC tones. In addition, the 40 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the fifth embodiment, PAPR values were measured as illustrated in FIG. 31(b). In FIG. 31(b), values of the respective spaces indicate PAPR measurement values of resource units corresponding to the positions of the respective spaces. Referring to FIG. 31(b), it can be seen that PAPR values of all the resource units were measured to be very low, i.e., 5.00 or lower.

FIG. 32 illustrates a tone plan of a 40 MHz channel and PAPR values by resource units according to a sixth embodiment of the present invention. In this drawing, for the purposes of description, illustration of a left/right guard tone and a DC tone is omitted. Also, the same descriptions as those of FIGS. 26 and 27 may be applied to FIG. 32 in the same or similar manner.

Referring to FIG. 32(a), the 40 MHz channel may include at least one resource unit, twelve left guard tones, eleven right guard tones, and five DC tones. In addition, the 40 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the sixth embodiment, PAPR values were measured as illustrated in FIG. 32(b). In FIG. 32(b), values of the respective spaces indicate PAPR measurement values of resource units corresponding to the positions of the respective spaces. Referring to FIG. 32(b), it can be seen that PAPR values of all the resource units were measured to be very low, i.e., 5.00 or lower.

FIG. 33 illustrates a tone plan of a 40 MHz channel and PAPR values by resource units according to a seventh embodiment of the present invention. In this drawing, for the purposes of description, illustration of a left/right guard tone and a DC tone is omitted. Also, the same descriptions as those of FIGS. 26 and 27 may be applied to FIG. 33 in the same or similar manner.

Referring to FIG. 33(a), the 40 MHz channel may include at least one resource unit, twelve left guard tones, eleven right guard tones, and five DC tones. In addition, the 40 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the seventh embodiment, PAPR values were measured as illustrated in FIG. 33(b). In FIG. 33(b), values of the respective spaces indicate PAPR measurement values of resource units corresponding to the positions of the respective spaces. Referring to FIG. 33(b), it can be seen that PAPR values of all the resource units were measured to be very low, i.e., 5.00 or lower.

FIG. 34 illustrates a tone plan of a 40 MHz channel and PAPR values by resource units according to an eighth embodiment of the present invention. In this drawing, for the purposes of description, illustration of a left/right guard tone and a DC tone is omitted. Also, the same descriptions as those of FIGS. 26 and 27 may be applied to FIG. 34 in the same or similar manner.

Referring to FIG. 34(a), the 40 MHz channel may include at least one resource unit, twelve left guard tones, eleven right guard tones, and five DC tones. In addition, the 40 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the eighth embodiment, PAPR values were measured as illustrated in FIG. 34(b). In FIG. 34(b), values of the respective spaces indicate PAPR measurement values of resource units corresponding to the positions of the respective spaces. Referring to FIG. 34(b), it can be seen that PAPR values of all the resource units were measured to be very low, i.e., 5.00 or lower.

FIG. 35 illustrates a tone plan of a 40 MHz channel and PAPR values by resource units according to a ninth embodiment of the present invention. In this drawing, for the purposes of description, illustration of a left/right guard tone and a DC tone is omitted. Also, the same descriptions as those of FIGS. 26 and 27 may be applied to FIG. 35 in the same or similar manner.

Referring to FIG. 35(a), the 40 MHz channel may include at least one resource unit, twelve left guard tones, eleven right guard tones, and five DC tones. In addition, the 40 MHz channel may further include leftover tones positioned to be adjacent to the resource unit. Here, some leftover tones may be positioned at the center of the channel and classified as DC tones.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 40 MHz channel may be variously derived as an embodiment in which the tone plans illustrated in this drawing are combined with each other, as well as the tone plans illustrated in this drawing.

When the 2× HE-STF sequence defined in Equation 16 is applied to the tone plan of the 40 MHz channel according to the fifth embodiment, PAPR values were measured as illustrated in FIG. 35(b). In FIG. 35(b), values of the respective spaces indicate PAPR measurement values of resource units corresponding to the positions of the respective spaces. Referring to FIG. 35(b), it can be seen that PAPR values of all the resource units were measured to be very low, i.e., 5.00 or lower.

In the aforementioned embodiments, it can be confirmed that application of the 2× HE-STF sequence of Equation 16 to the 40 MHz channel having various tone plans obtains optimal PAPR performance. Hereinafter, a new 2× HE-STF sequence applied to a 80 MHz channel is proposed and PAPR values measured by resource units according to a tone plan of the 80 MHz channel to which the corresponding 2× HE-STF sequence is applied will be described.

3. 2× HE-STF Sequence of 80 MHz Channel

As described above with reference to FIG. 14, the 2× HE-STF sequence of the 80 MHz channel may be configured to have a structure of $\{c7^*M, 0, 0, 0, a3, 0, 0, 0, c8^*M, 0, 0, 0, a4, 0, 0, 0, c9^*M, 0, 0, 0, a5, 0, 0, 0, c10^*M, 0, 0, 0, 0, 0, 0, c11^*M, 0, 0, 0, a6, 0, 0, 0, c12^*M, 0, 0, 0, a7, 0, 0, 0, c13^*M, 0, 0, 0, a8, 0, 0, 0, c14^*M\}$, and here, an M sequence, a coefficient of the M sequence, and an extra value may be defined as expressed by Equation 17 below.

$$HES_{-504,504}(-504:2:504) = \{M_{-28,28}, 0_3,$$
$$\sqrt{\tfrac{1}{2}}(1+j), 0_3, -M_{-28,28}, 0_3, \sqrt{\tfrac{1}{2}}(1+j), 0_3,$$

$$M_{-28,28}, 0_3, \sqrt{\tfrac{1}{2}}(-1-j), 0_3, M_{-28,28}, 0_7, M_{-28,28}, 0_3,$$
$$\sqrt{\tfrac{1}{2}}(-1-j), 0_3, M_{-28,28}, 0_3,$$

$$\sqrt{\tfrac{1}{2}}(1+j), 0_3, M_{-28,28}, 0_3, \sqrt{\tfrac{1}{2}}(-1-j), 0_3, -M_{-28,28}\}$$

$$HES_{-512,511} = \{0_8, HES_{-504,504}, 0_7\}$$

$$HES_{-512,511}(\pm 504) = 0 \qquad \text{[Equation 17]}$$

Referring to Equation 17, the 2× HE-STF sequence ($HES\_-504,504(-504:2:504)$) mapped to tones of the tone indices from −504 to 504 in units of 2 tones may be configured as $\{M\_-28,28, 0\_3, \sqrt{\tfrac{1}{2}}(1+j), 0\_3, -M\_-28,28, 0\_3, \sqrt{\tfrac{1}{2}}(1+j), 0\_3, M\_-28,28, 0\_3, \sqrt{\tfrac{1}{2}}(-1-j), 0\_3, M\_-28, 28, 0\_7, M\_-28,28, 0\_3, \sqrt{\tfrac{1}{2}}(-1-j), 0\_3, M\_-28,28, 0\_3, \sqrt{\tfrac{1}{2}}(1+j), 0\_3, M\_-28,28, 0\_3, \sqrt{\tfrac{1}{2}}(-1-j), 0\_3, -M\_-28, 28\}$.

Also, the 2× HE-STF sequence (HES_–512,511) mapped to tones of the tone indices from –512 to 511 may be configured as {0_8, HES_–504,504, 0_7}. Also, the 2× HE-STF sequence may be defined such that a value "0" is mapped to guard tones positioned in the tone indices ±504.

Since the 2× HE-STF sequence is generated as described above, the 2× HE-STF tones to which a non-zero value is mapped is configured at 8 tone intervals in the entire data tones without omission.

FIGS. 36 to 53 illustrate various tone plans of the 80 MHz channel and tables of PAPR values measured by tone plans according to an embodiment of the present invention. The 2× HE-STF sequence proposed in Equation 17 can obtain an optimized PAPR value when applied to various tone plans of FIGS. 36 to 53. Hereinafter, various tone plans according to various embodiments and PAPR measurement values when the 2× HE-STF sequence proposed in Equation 17 is applied to each tone plan will be described.

FIG. 36 is a view illustrating a tone plane of a 80 MHz channel according to a first embodiment of the present invention.

Referring to FIG. 36(a), the 80 MHz channel may include thirty-seven 26-tone resource units, twelve left guard tones, eleven right guard tones, and seven DC tones. In addition, the 20 MHz channel may additionally include sixteen leftover tones (first to thirty-second leftover tones) positioned to be adjacent to the resource units.

Here,
the first leftover tone may be positioned on the left of a first 26-tone resource unit,
the second and third leftover tones may be positioned between second and third 26-tone resource units,
the fourth leftover tone may be positioned between the fourth and fifth 26-tone resource units,
the fifth leftover tone may be positioned between the fifth and sixth 26-tone resource units,
the sixth and seventh leftover tones may be positioned between seventh and eighth 26-tone resource units,
the eighth and ninth leftover tones may be positioned between ninth and tenth 26-tone resource units,
the tenth and eleventh leftover tones may be positioned between eleventh and twelfth 26-tone resource units,
the twelfth leftover tone may be positioned between the thirteenth and fourteenth 26-tone resource units,
the thirteenth leftover tone may be positioned between the fourteenth and fifteenth 26-tone resource units,
the fourteenth and fifteenth leftover tones may be positioned between sixteenth and seventeenth 26-tone resource units,
the sixteenth leftover tone may be positioned between eighteenth and nineteenth 26-tone resource units,
the seventeenth leftover tone may be positioned between nineteenth and twentieth 26-tone resource units,
the eighteenth and nineteenth leftover tones may be positioned between twenty-first and twenty-second 26-tone resource units,
the twentieth leftover tone may be positioned between twenty-third and twenty-fourth 26-tone resource units,
the twenty-first leftover tone may be positioned between twenty-fourth and twenty-fifth 26-tone resource units,
the twenty-second and twenty-third leftover tones may be positioned between twenty-sixth and twenty-seventh 26-tone resource units,
the twenty-fourth and twenty-fifth leftover tones may be positioned between twenty-eighth and twenty-ninth 26-tone resource units,
the twenty-sixth and twenty-seventh leftover tones may be positioned between thirtieth and thirty-first 26-tone resource units,
the twenty-eighth leftover tone may be positioned between thirty-second and thirty-third 26-tone resource units,
the twenty-ninth leftover tone may be positioned between thirty-third and thirty-fourth 26-tone resource units
the thirtieth and thirty-first leftover tones may be positioned between thirty-fifth and thirty-sixth 26-tone resource units, and
the thirty-second leftover tone may be positioned on the right of the thirty-seventh 26-tone resource unit.

Here, resource units of a small tone unit may be classified as one resource unit of a larger tone unit together with a leftover tone. For example, two 26-tone resource units may be classified as one 52-tone resource unit (refer to FIG. 36(b)), two 52-tone resource unit and two leftover tones may be classified as one 106-tone resource unit (refer to FIG. 36(c)), two 106-tone resource units, one 26-tone resource unit, and four leftover may be classified as one 242-tone resource unit (refer to FIG. 36(d)), two 242-tone resource units may be classified as one 484-tone resource unit (refer to FIG. 36(e)), and two 484-tone resource units, one 26-tone resource unit, and two leftover tones may be classified as one 996-tone resource unit (refer to FIG. 36(f)). Similarly, resource units of a larger tone unit may be divided into resource units of a smaller tone unit and a leftover tone.

Thus, various tone plans obtained by combining tone plans of FIGS. 36(a) to 36(f), as well as the tone plans of FIGS. 36(a) to 36(f), may be derived.

FIG. 37 illustrates a table of PAPR values measured by resource units when the 2× HE-STF sequence defined in Equation 17 is applied to a tone plan of 80 MHz channel according to the first embodiment. In FIG. 37, the values of the respective spaces indicate PAPR measurement values of resource units corresponding to positions of the spaces. In particular, FIG. 37(a) illustrates PAPR measurement values of resource units positioned on the left based on the DC tones, and FIG. 37(b) illustrates PAPR measurement values of resource units positioned on the right based on the DC tones. Also, although not shown, a PAPR value of the 26-tone resource unit (13+13) positioned at the center was measured as 3.01 and a PAPR value of a 996-tone resource unit was measured as 5.52.

Referring to FIG. 37, the PAPR values of all the resource units were measured to be very low, i.e., 5.53 or lower. That is, referring to FIG. 37, the PAPR values may be minimized using the 2× HE-STF sequence defined in Equation 17.

FIG. 38 illustrates a tone plan of a 80 MHz channel according to a second embodiment of the present invention. In FIG. 38, for the purposes of description, illustration of a left/right guard tone and DC tone is omitted. Also, the same descriptions of FIGS. 36 and 37 may be applied to FIG. 38 in the same or similar manner.

Referring to FIG. 38, the 80 MHz channel may include at least one resource unit, twelve left guard tones, eleven right guard tones, and seven DC tones. In addition, the 80 MHz channel may further include leftover tones positioned to be adjacent to the resource unit.

Also, in this embodiment, as described above, resource units of a small tone unit may be classified as one resource unit of a larger tone unit together with a leftover tone, and resource units of a large tone unit may be divided into resource units of a smaller tone unit and a leftover tone.

For example, two 52-tone resource unit and three leftover tones may be classified as one 107-tone resource unit, and two 107-tone resource units, one 26-tone resource unit, two leftover tones may be classified as one 242-tone resource unit, and two 484-tone resource units and one 26-tone resource unit may be classified as one 994-tone resource unit. Thus, the tone plans of the 80 MHz channel may be variously derived as an embodiment in which the tone plans illustrated in this drawing are combined with each other, as well as the tone plans illustrated in this drawing.

FIG. 39 illustrates PAPR values by resource units of a second embodiment.

When the 2× HE-STF sequence defined in Equation 17 is applied to the tone plan of the 80 MHz channel according to the second embodiment, PAPR values were measured as illustrated in FIG. 39. In FIG. 39, values of the respective spaces indicate PAPR measurement values of resource units corresponding to the positions of the respective spaces. Specifically, FIG. 39(*a*) illustrates PAPR measurement values of resource units positioned on the left based on the DC tones, and FIG. 39(*b*) illustrates PAPR measurement values of resource units positioned on the right based on the DC tones.

Although not shown, a PAPR value of the 26-tone resource unit (13+13) positioned at the center was measured as 3.01 and a PAPR value of the 996-tone resource unit was measured as 5.52. Referring to FIG. 39, it can be seen that PAPR values of all the resource units were measured to be very low, i.e., 5.53 or lower.

FIG. 40 illustrates a tone plan of a 80 MHz channel according to a third embodiment of the present invention. In this drawing, for the purposes of description, illustration of a left/right guard tone and a DC tone is omitted. Also, the same descriptions as those of FIGS. 36 and 37 may be applied to FIG. 40 in the same or similar manner.

Referring to FIG. 40, the 80 MHz channel may include at least one resource unit, twelve left guard tones, eleven right guard tones, and seven DC tones. In addition, the 80 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

Figure 41:
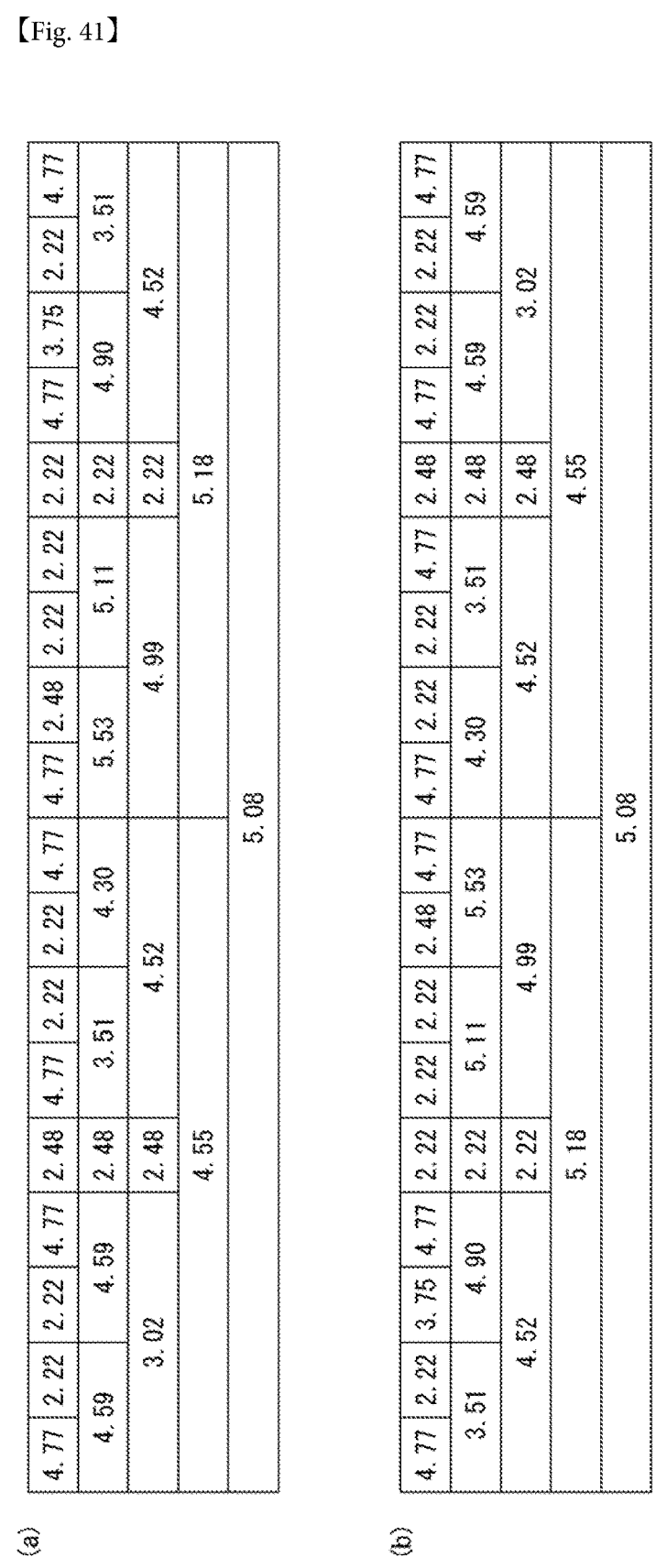

FIG. 41 illustrates PAPR values by resource units of the third embodiment.

When the 2× HE-STF sequence defined in Equation 17 is applied to the tone plan of the 80 MHz channel according to the third embodiment, PAPR values were measured as illustrated in FIG. 41. In FIG. 41, values of the respective spaces indicate PAPR measurement values of resource units corresponding to the positions of the respective spaces. In particular, FIG. 41(*a*) illustrates PAPR measurement values of resource units positioned on the left based on the DC tones, and FIG. 41(*b*) illustrates PAPR measurement values of resource units positioned on the right based on the DC tones.

Also, although not shown, a PAPR value of the 26-tone resource unit (13+13) positioned at the center was measured as 3.01 and a PAPR value of a 996-tone resource unit was measured as 5.52. Referring to FIG. 41, the PAPR values of all the resource units were measured to be very low, i.e., 5.53 or lower.

FIG. 42 illustrates a tone plan of a 80 MHz channel according to a fourth embodiment of the present invention. In FIG. 18, for the purposes of description, illustration of a left/right guard tone and DC tone is omitted. Also, the same descriptions of FIGS. 36 and 37 may be applied to FIG. 42 in the same or similar manner.

Referring to FIG. 42, the 80 MHz channel may include at least one resource unit, twelve left guard tones, eleven right guard tones, and seven DC tones. In addition, the 80 MHz channel may further include leftover tones positioned to be adjacent to the resource unit.

Also, in this embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

FIG. 43 illustrates PAPR values by resource units of a fourth embodiment.

When the 2× HE-STF sequence defined in Equation 17 is applied to the tone plan of the 80 MHz channel according to the fourth embodiment, PAPR values were measured as illustrated in FIG. 43. In FIG. 43, values of the respective spaces indicate PAPR measurement values of resource units corresponding to the positions of the respective spaces. Specifically, FIG. 43(*a*) illustrates PAPR measurement values of resource units positioned on the left based on the DC tones, and FIG. 43(*b*) illustrates PAPR measurement values of resource units positioned on the right based on the DC tones.

Although not shown, a PAPR value of the 26-tone resource unit (13+13) positioned at the center was measured as 3.01 and a PAPR value of the 996-tone resource unit was measured as 5.52. Referring to FIG. 43, it can be seen that PAPR values of all the resource units were measured to be very low, i.e., 5.53 or lower.

FIG. 44 illustrates a tone plan of a 80 MHz channel according to a fifth embodiment of the present invention. In this drawing, for the purposes of description, illustration of a left/right guard tone and a DC tone is omitted. Also, the same descriptions as those of FIGS. 36 and 37 may be applied to FIG. 44 in the same or similar manner.

Referring to FIG. 44, the 80 MHz channel may include at least one resource unit, twelve left guard tones, eleven right guard tones, and seven DC tones. In addition, the 80 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

FIG. 45 illustrates PAPR values by resource units of the fifth embodiment.

When the 2× HE-STF sequence defined in Equation 17 is applied to the tone plan of the 80 MHz channel according to the fifth embodiment, PAPR values were measured as illustrated in FIG. 45. In FIG. 45, values of the respective spaces indicate PAPR measurement values of resource units corresponding to the positions of the respective spaces. In particular, FIG. 45(a) illustrates PAPR measurement values of resource units positioned on the left based on the DC tones, and FIG. 45(b) illustrates PAPR measurement values of resource units positioned on the right based on the DC tones.

Also, although not shown, a PAPR value of the 26-tone resource unit (13+13) positioned at the center was measured as 3.01 and a PAPR value of a 996-tone resource unit was measured as 5.52. Referring to FIG. 45, the PAPR values of all the resource units were measured to be very low, i.e., 5.53 or lower.

FIG. 46 illustrates a tone plan of a 80 MHz channel according to a sixth embodiment of the present invention. In FIG. 46, for the purposes of description, illustration of a left/right guard tone and DC tone is omitted. Also, the same descriptions of FIGS. 36 and 37 may be applied to FIG. 46 in the same or similar manner.

Referring to FIG. 46, the 80 MHz channel may include at least one resource unit, twelve left guard tones, eleven right guard tones, and seven DC tones. In addition, the 80 MHz channel may further include leftover tones positioned to be adjacent to the resource unit.

Also, in this embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

FIG. 47 illustrates PAPR values by resource units of a sixth embodiment.

When the 2× HE-STF sequence defined in Equation 17 is applied to the tone plan of the 80 MHz channel according to the sixth embodiment, PAPR values were measured as illustrated in FIG. 47. In FIG. 47, values of the respective spaces indicate PAPR measurement values of resource units corresponding to the positions of the respective spaces. Specifically, FIG. 47(a) illustrates PAPR measurement values of resource units positioned on the left based on the DC tones, and FIG. 47(b) illustrates PAPR measurement values of resource units positioned on the right based on the DC tones.

Although not shown, a PAPR value of the 26-tone resource unit (13+13) positioned at the center was measured as 3.01 and a PAPR value of the 996-tone resource unit was measured as 5.52. Referring to FIG. 47, it can be seen that PAPR values of all the resource units were measured to be very low, i.e., 5.53 or lower.

FIG. 48 illustrates a tone plan of a 80 MHz channel according to a seventh embodiment of the present invention. In this drawing, for the purposes of description, illustration of a left/right guard tone and a DC tone is omitted. Also, the same descriptions as those of FIGS. 36 and 37 may be applied to FIG. 48 in the same or similar manner.

Referring to FIG. 48, the 80 MHz channel may include at least one resource unit, twelve left guard tones, eleven right guard tones, and seven DC tones. In addition, the 80 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

FIG. 49 illustrates PAPR values by resource units of the seventh embodiment.

When the 2× HE-STF sequence defined in Equation 17 is applied to the tone plan of the 80 MHz channel according to the seventh embodiment, PAPR values were measured as illustrated in FIG. 49. In FIG. 49, values of the respective spaces indicate PAPR measurement values of resource units corresponding to the positions of the respective spaces. In particular, FIG. 49(a) illustrates PAPR measurement values of resource units positioned on the left based on the DC tones, and FIG. 49(b) illustrates PAPR measurement values of resource units positioned on the right based on the DC tones.

Also, although not shown, a PAPR value of the 26-tone resource unit (13+13) positioned at the center was measured as 3.01 and a PAPR value of a 996-tone resource unit was measured as 5.52. Referring to FIG. 49, the PAPR values of all the resource units were measured to be very low, i.e., 5.53 or lower.

FIG. 50 illustrates a tone plan of a 80 MHz channel according to an eighth embodiment of the present invention. In FIG. 50, for the purposes of description, illustration of a left/right guard tone and DC tone is omitted. Also, the same descriptions of FIGS. 36 and 37 may be applied to FIG. 50 in the same or similar manner.

Referring to FIG. 50, the 80 MHz channel may include at least one resource unit, twelve left guard tones, eleven right guard tones, and seven DC tones. In addition, the 80 MHz channel may further include leftover tones positioned to be adjacent to the resource unit.

Also, in this embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

FIG. 51 illustrates PAPR values by resource units of an eighth embodiment.

When the 2× HE-STF sequence defined in Equation 17 is applied to the tone plan of the 80 MHz channel according to the eighth embodiment, PAPR values were measured as illustrated in FIG. 51. In FIG. 51, values of the respective spaces indicate PAPR measurement values of resource units corresponding to the positions of the respective spaces. Specifically, FIG. 51(a) illustrates PAPR measurement values of resource units positioned on the left based on the DC tones, and FIG. 51(b) illustrates PAPR measurement values of resource units positioned on the right based on the DC tones.

Although not shown, a PAPR value of the 26-tone resource unit (13+13) positioned at the center was measured as 3.01 and a PAPR value of the 996-tone resource unit was measured as 5.52. Referring to FIG. 51, it can be seen that PAPR values of all the resource units were measured to be very low, i.e., 5.53 or lower.

FIG. 52 illustrates a tone plan of a 80 MHz channel according to a ninth embodiment of the present invention. In this drawing, for the purposes of description, illustration of a left/right guard tone and a DC tone is omitted. Also, the same descriptions as those of FIGS. 36 and 37 may be applied to FIG. 52 in the same or similar manner.

Referring to FIG. 52, the 80 MHz channel may include at least one resource unit, twelve left guard tones, eleven right guard tones, and seven DC tones. In addition, the 80 MHz channel may further include leftover tones positioned to be adjacent to the resource unit.

Also, in the present embodiment, as described above, resource units of a small tone unit may be classified as one resource unit of a larger tone unit together with a leftover tone, and resource units of a large tone unit may be divided into resource units of a smaller tone unit and a leftover tone. Thus, the tone plans of the 80 MHz channel may be variously derived as an embodiment in which the tone plans illustrated in this drawing are combined with each other, as well as the tone plans illustrated in this drawing.

Figure 53:
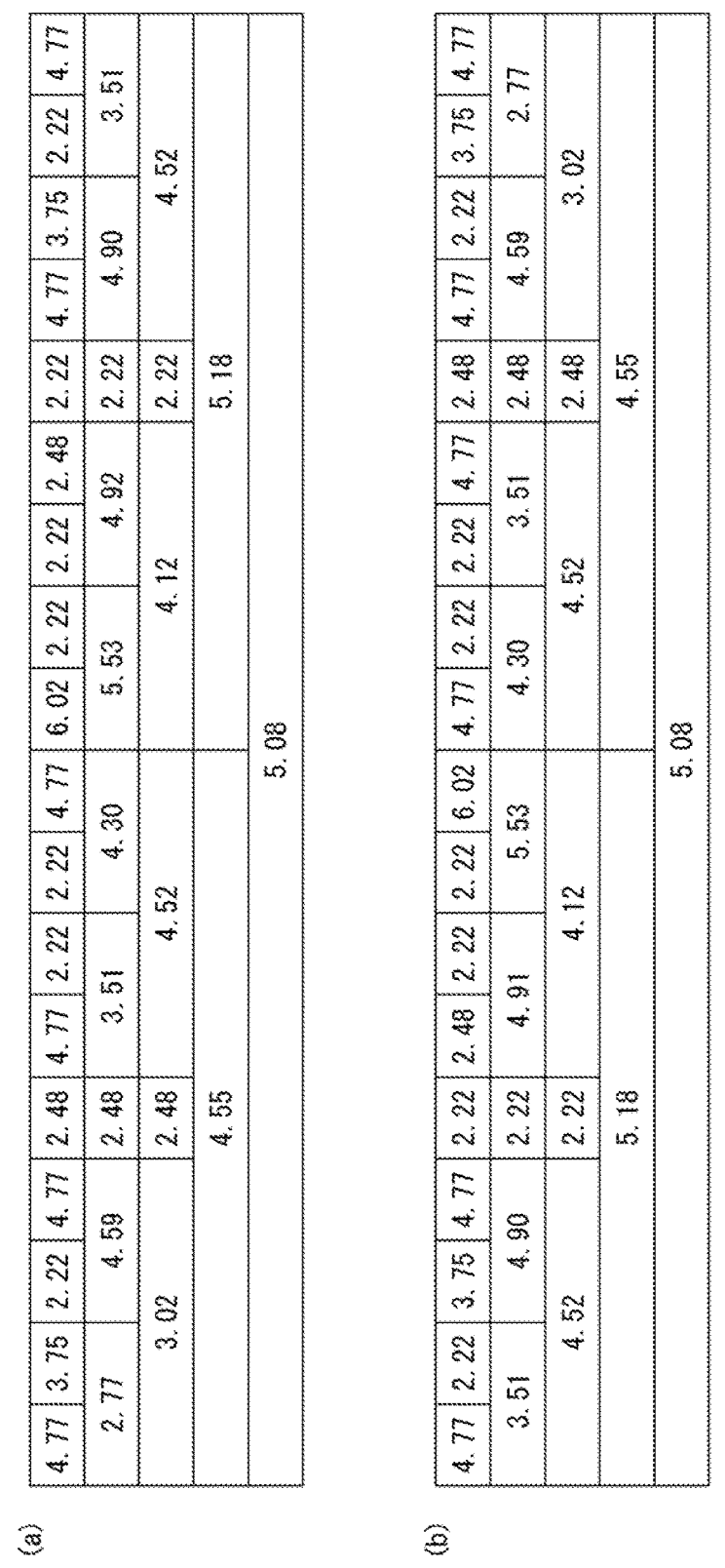

FIG. 53 illustrates PAPR values by resource units of the ninth embodiment.

When the 2× HE-STF sequence defined in Equation 17 is applied to the tone plan of the 80 MHz channel according to the eighth embodiment, PAPR values were measured as illustrated in FIG. 53. In FIG. 53, values of the respective spaces indicate PAPR measurement values of resource units corresponding to the positions of the respective spaces. In particular, FIG. 53(*a*) illustrates PAPR measurement values of resource units positioned on the left based on the DC tones, and FIG. 53(*b*) illustrates PAPR measurement values of resource units positioned on the right based on the DC tones.

Also, although not shown, a PAPR value of the 26-tone resource unit (13+13) positioned at the center was measured as 3.01 and a PAPR value of a 996-tone resource unit was measured as 5.52. Referring to FIG. 51, the PAPR values of all the resource units were measured to be very low, i.e., 5.53 or lower.

In the aforementioned embodiments, it can be confirmed that application of the 2× HE-STF sequence of Equation 17 to the 80 MHz channel having various tone plans obtains optimal PAPR performance.

FIG. 54 is a flow chart illustrating a method for transmitting a PPDU by an STA device according to an embodiment of the present invention. In relation to the flow chart, the aforementioned embodiments may be applied in the same manner. Thus, repeated descriptions of the aforementioned contents will be omitted.

Referring to FIG. 54, first, an STA may generate a (2×) HE-STF sequence (S5410). Here, the generated HE-STF sequence may be generated as a sequence having optimized PAPR performance and include a combination of an M sequence and value 0. Also, an HE-STF sequence transmitted through a channel of a larger band may be configured on the basis of a structure obtained by duplicating and frequency-shifting an HE-STF sequence transmitted through a channel of a smaller band.

For example, in cases where an HE-STF sequence of a 20 MHz channel is configured to have a structure of {M sequence, 0, 0, 0, 0, 0, 0, M sequence}, a 40 MHz channel may be configured on the basis of a structure of {HE-STF sequence of the 20 MHz channel, 0, 0, 0, 0, 0, 0, HE-STF sequence of the 20 MHz channel}. Similarly, a 80 MHz channel may be configured on the basis of a structure of {HE-STF sequence of the 40 MHz, 0, 0, 0, 0, 0, 0, 0, HE-STF sequence of the 40 MHz}

Here, in order to configure 2× HE-STF tones to which a non-zero value is mapped at 8 tone intervals in the entire data tones, an extra value, rather than "0", may be inserted into the middle of the HE-STF sequence. Thus, the 40 MHz channel may be configured to have a structure of {M sequence, 0, 0, 0, a1, 0, 0, 0, M sequence, 0, 0, 0, 0, 0, 0, M sequence, 0, 0, 0, a2, 0, 0, 0, M sequence}, and the 80 MHz channel may be configured to have a structure of {M sequence, 0, 0, 0, a3, 0, 0, 0, M sequence, 0, 0, 0, a4, 0, 0, 0, M sequence, 0, 0, 0, a5, 0, 0, 0, M sequence, 0, 0, 0, 0, 0, 0, 0, M sequence, 0, 0, 0, a6, 0, 0, 0, M sequence, 0, 0, 0, a7, 0, 0, 0, M sequence, 0, 0, 0, a8, 0, 0, 0, M sequence}. Here, any one predefined value among values of $\sqrt{½}(1+j)$, $\sqrt{½}(1-j)$, $\sqrt{½}(-1+j)$, and $\sqrt{½}(-1-j)$ may be allocated to a1 to a8.

Also, any one predefined value among 1, −1, j, and −j may be multiplied to each of the M sequences included in the HE-STF sequences of each channel.

Details of the HE-STF sequence proposed in the present invention are the same as those described above with reference to FIGS. 14 to 53.

Next, the STA may generate a PPDU (S5420). In detail, the STA may generate an HE-STF field on the basis of the HE-STF sequence generated in the previous step and generate a PPDU with the HE-STF field inserted thereto. Here, the generated HE-STF field may have periodicity of 1.6μs.

Finally, the STA may transmit the PPDU (S5430). Here, the HE-STF field inserted into the PPDU may be transmitted through a (frequency, sub) channel (e.g., 20 MHz/40 MHz/80 MHz).

FIG. 55 is a block diagram of each STA device according to an embodiment of the present invention.

In FIG. 55, an STA device 5500 may include a memory 5510, a processor 5520 and an RF unit 5530. And, as described above, the STA device 5500 may be an AP or a non-AP STA as an HE STA device.

The RF unit 5530 may transmit/receive a radio signal with being connected to the processor 5520. The RF unit 5530 may transmit a signal by up-converting the data received from the processor to the transmission/reception band.

The processor 5520 may implement the physical layer and/or the MAC layer according to the IEEE 802.11 system with being connected to the RF unit 4013. The processor 5520 may be constructed to perform the operation according to the various embodiments of the present invention according to the drawings and description. In addition, the module for implementing the operation of the STA 5500 according to the various embodiments of the present invention described above may be stored in the memory 5510 and executed by the processor 5520.

The memory 5510 is connected to the processor 5520, and stores various types of information for executing the processor 5520. The memory 5510 may be included interior of the processor 5520 or installed exterior of the processor 5520, and may be connected with the processor 5520 by a well known means.

In addition, the STA device 5500 may include a single antenna or a multiple antenna.

The detailed construction of the STA device 5500 of FIG. 55 may be implemented such that the description of the various embodiments of the present invention is independently applied or two or more embodiments are simultaneously applied.

The embodiments described above are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment. Also, it will be obvious to those skilled in the art that claims that are not explicitly cited in the appended claims may be presented in combination as an exemplary embodiment of the present invention or included as a new claim by subsequent amendment after the application is filed.

The embodiments of the present invention may be implemented through various means, for example, hardware, firmware, software, or a combination thereof. When implemented as hardware, one embodiment of the present invention may be carried out as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, one embodiment of the present invention may be carried out as a module, a procedure, or a function that performs the functions or operations described above. Software code may be stored in the memory and executed by the processor. The memory is located inside or outside the processor and may transmit and receive data to and from the processor via various known means.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Various embodiments have been described in the best way to implement the present invention.

While a frame transmission scheme in a wireless communication system according to the present invention has been described with respect to its application to an IEEE 802.11 system, it also may be applied to other various wireless communication systems than the IEE 802.11 system.

The invention claimed is:

1. A method for transmitting a physical protocol data unit (PPDU) of a station (STA) device in a wireless local area network (WLAN) system, the method comprising:
   generating a high efficiency-short training field (HE-STF) sequence;
   generating a PPDU configured on the basis of the HE-STF sequence and including an HE-STF having periodicity of 1.6 μs; and
   transmitting the PPDU, wherein the HE-STF included in the PPDU is transmitted via a channel,
   wherein:
   the HE-STF sequence is configured on the basis of an M sequence and is mapped to the channel per 2-tone unit,
   when the channel is a 20 MHz channel, the HE-STF sequence is configured to have a structure of {the M Sequence, 0, 0, 0, 0, 0, 0, 0, the M sequence},
   when the channel is a 40 MHz channel, the HE-STF sequence is configured to have a structure of {the M sequence, 0, 0, 0, a1, 0, 0, 0, the M sequence, 0, 0, 0, 0, 0, 0, 0, the M sequence, 0, 0, 0, a2, 0, 0, 0, the M sequence},
   when the channel is a 80 MHz channel, the HE-STF sequence is configured to have a structure of {the M sequence, 0, 0, 0, a3, 0, 0, 0, the M sequence, 0, 0, 0, a4, 0, 0, 0, the M sequence, 0, 0, 0, a5, 0, 0, 0, the M sequence, 0, 0, 0, 0, 0, 0, 0, the M sequence, 0, 0, 0, a6, 0, 0, 0, the M sequence, 0, 0, 0, a7, 0, 0, 0, the M sequence, 0, 0, 0, a8, 0, 0, 0, the M sequence},
   one predefined value among 1, −1, j, and −j is multiplied to each of the M sequences, and
   $\sqrt{1/2}(-1-j)$ is allocated to the a1, the a2, the a3, the a4 and the a5, and $\sqrt{1/2}(1+j)$ is allocated to the a6, the a7 and the a8.

2. The method of claim 1, wherein:
   the HE-STF sequence is mapped to data tones excluding a guard tone of each channel, and
   a non-zero value is mapped to all the data tones having tone indices that are multiple of 8.

3. The method of claim 1, wherein:
   the M sequence is configured as $\sqrt{1/2}$ {−1−j, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 1+j, 0, 0, 0, −1−j, 0, 0, 0, −1−j, 0, 0, 0, 1+j, 0, 0, 0, 1+j, 0, 0, 0, 1+j, 0, 0, 0, 1+j}.

4. A station (STA) device of a wireless local area network (WLAN) system the STA device comprising:
   a transceiver configured to transmit and receive a wireless signal; and
   a processor configured to control the transceiver,
   wherein the processor is further configured to:
   generate a high efficiency-short training field (HE-SU') sequence,
   generate a physical protocol data unit (PPDU) configured on the basis of the HE-STF sequence and including an HE-STF having periodicity of 1.6 μs, and
   control the transceiver to transmit the PPDU, wherein the HE-STF included in the PPDU is transmitted via a channel,
   wherein:
   the HE-STF sequence is configured on the basis of an M sequence and is mapped to the channel per 2-tone unit,
   when the channel is a 20 MHz channel, the HE-STF sequence is configured to have a structure of {the M Sequence, 0, 0, 0, 0, 0, 0, 0, the M sequence},
   when the channel is a 40 MHz channel, the HE-STF sequence is configured to have a structure of {the M sequence, 0, 0, 0, a1, 0, 0, 0, the M sequence, 0, 0, 0, 0, 0, 0, 0, the M sequence, 0, 0, 0, a2, 0, 0, 0, the M sequence},
   when the channel is a 80 MHz channel, the HE-STF sequence is configured to have a structure of {the M sequence, 0, 0, 0, a3, 0, 0, 0, the M sequence, 0, 0, 0, a4, 0, 0, 0, the M sequence, 0, 0, 0, a5, 0, 0, 0, the M sequence, 0, 0, 0, 0, 0, 0, 0, the M sequence, 0, 0, 0, a6, 0, 0, 0, the M sequence, 0, 0, 0, a7, 0, 0, 0, the M sequence, 0, 0, 0, a8, 0, 0, 0, the M sequence},
   one predefined value among 1, −1j, and −j is multiplied to each of the M sequences, and
   $\sqrt{1/2}(-1-j)$ is allocated to the a1, the a2, the a3, the a4 and the a5, and $\sqrt{1/2}(1+j)$ is allocated to the a6, the a7 and the a8.

5. The STA device of claim 4, wherein:
   the HE-STF sequence is mapped to data tones excluding a guard tone of each channel, and a non-zero value is mapped to all the data tones having tone indices, a multiple of 8.

6. The STA device of claim 4, wherein:
the M sequence is configured as $\sqrt{1/2}$ {1−j, 0, 0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 1+j, 0, 0, 0, −1−j, 0, 0, 0, −1−j, 0, 0, 0, 1+j, 0, 0, 0, 1+j, 0, 0, 0, 1+j, 0, 0, 0, 1+j}.

* * * * *